US012732553B2

(12) United States Patent
Han et al.

(10) Patent No.: US 12,732,553 B2
(45) Date of Patent: Sep. 8, 2026

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventors: Jaeshin Han, Seoul (KR); Jongyeul Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 261 days.

(21) Appl. No.: 18/294,870

(22) PCT Filed: Aug. 3, 2022

(86) PCT No.: PCT/KR2022/011485
§ 371 (c)(1),
(2) Date: Feb. 2, 2024

(87) PCT Pub. No.: WO2023/014085
PCT Pub. Date: Feb. 9, 2023

(65) Prior Publication Data

US 2024/0430318 A1 Dec. 26, 2024

(30) Foreign Application Priority Data

Aug. 3, 2021 (KR) ........................ 10-2021-0101882
Aug. 31, 2021 (KR) ........................ 10-2021-0115316
Aug. 31, 2021 (KR) ........................ 10-2021-0115317

(51) Int. Cl.
*H04L 65/65* (2022.01)
*H04L 65/70* (2022.01)

(52) U.S. Cl.
CPC .............. *H04L 65/65* (2022.05); *H04L 65/70* (2022.05)

(58) Field of Classification Search
CPC ..... H04L 65/65; H04L 65/70; H04L 65/1016; H04L 65/1069; H04L 65/1104;
(Continued)

(56) References Cited

U.S. PATENT DOCUMENTS

2021/0006614 A1* 1/2021 Oyman .................. H04N 19/30
2021/0021664 A1 1/2021 Oyman
(Continued)

FOREIGN PATENT DOCUMENTS

KR 10-2020-0115333 10/2020
KR 10-2020-0130043 11/2020
(Continued)

OTHER PUBLICATIONS

International Search Report and Written Opinion in International Appln. No. PCT/KR2022/011485, mailed on Nov. 24, 2022, 18 pages (with English translation).

*Primary Examiner* — Benjamin M Thieu
(74) *Attorney, Agent, or Firm* — Fish & Richardson P.C.

(57) ABSTRACT

A point cloud service providing method according to embodiments may comprise the steps of: performing a call connection for a call between a first user terminal and a second user terminal; and when the call connection is performed, transmitting point cloud data to the first user terminal by the second user terminal by using at least one real time transport protocol (RTP) packet, wherein the point cloud data is G-PCC data compressed on the basis of G-PCC, and a header of the at least one RTP packet comprises identification information for identification of the G-PCC data.

12 Claims, 40 Drawing Sheets

(58) Field of Classification Search
CPC . H04L 65/1108; H04L 65/403; H04N 21/816; H04N 21/85403; H04N 21/6437; G06T 9/00
See application file for complete search history.

(56) References Cited

U.S. PATENT DOCUMENTS

| | | | | |
|---|---|---|---|---|
| 2021/0105338 | A1 * | 4/2021 | Oyman | H04L 67/61 |
| 2021/0105451 | A1 * | 4/2021 | Oyman | H04N 19/597 |
| 2021/0209806 | A1 * | 7/2021 | Oh | G06T 19/00 |
| 2022/0028172 | A1 * | 1/2022 | Yip | H04L 65/762 |
| 2023/0042078 | A1 * | 2/2023 | Dijkstra-Soudarissanane | H04N 19/70 |
| 2023/0345030 | A1 * | 10/2023 | Rhyu | H04N 21/23605 |

FOREIGN PATENT DOCUMENTS

| | | | | |
|---|---|---|---|---|
| KR | 10-2021-0041528 | | 4/2021 | |
| WO | WO-2021011772 | A1 * | 1/2021 | H04N 19/597 |
| WO | WO 2021/074005 | | 4/2021 | |

* cited by examiner

FIG. 5
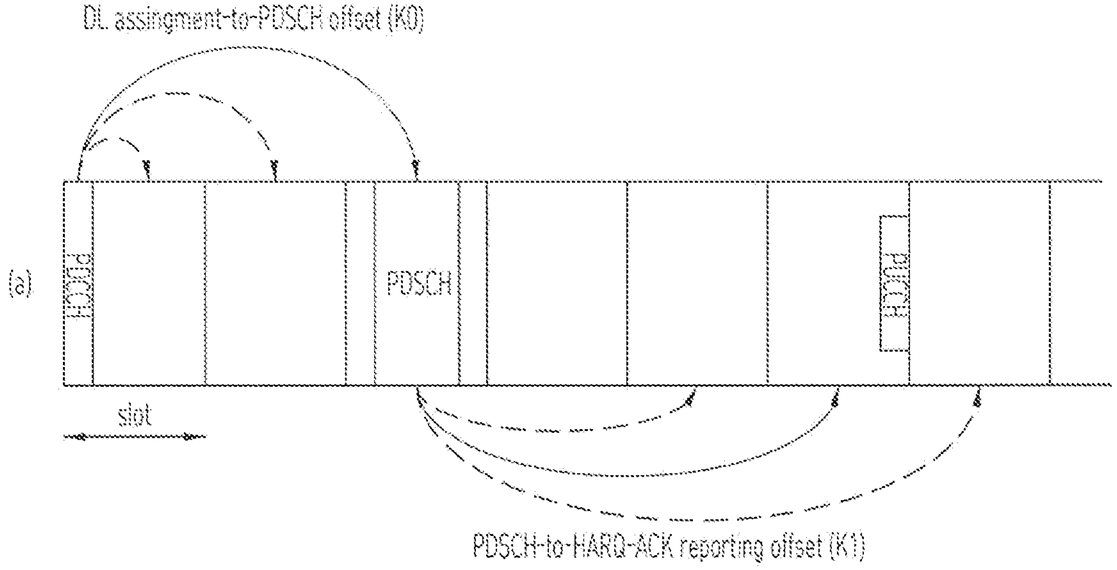
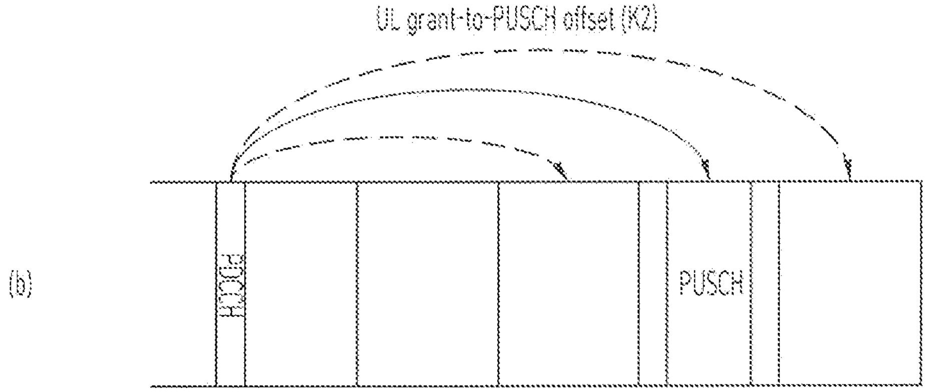

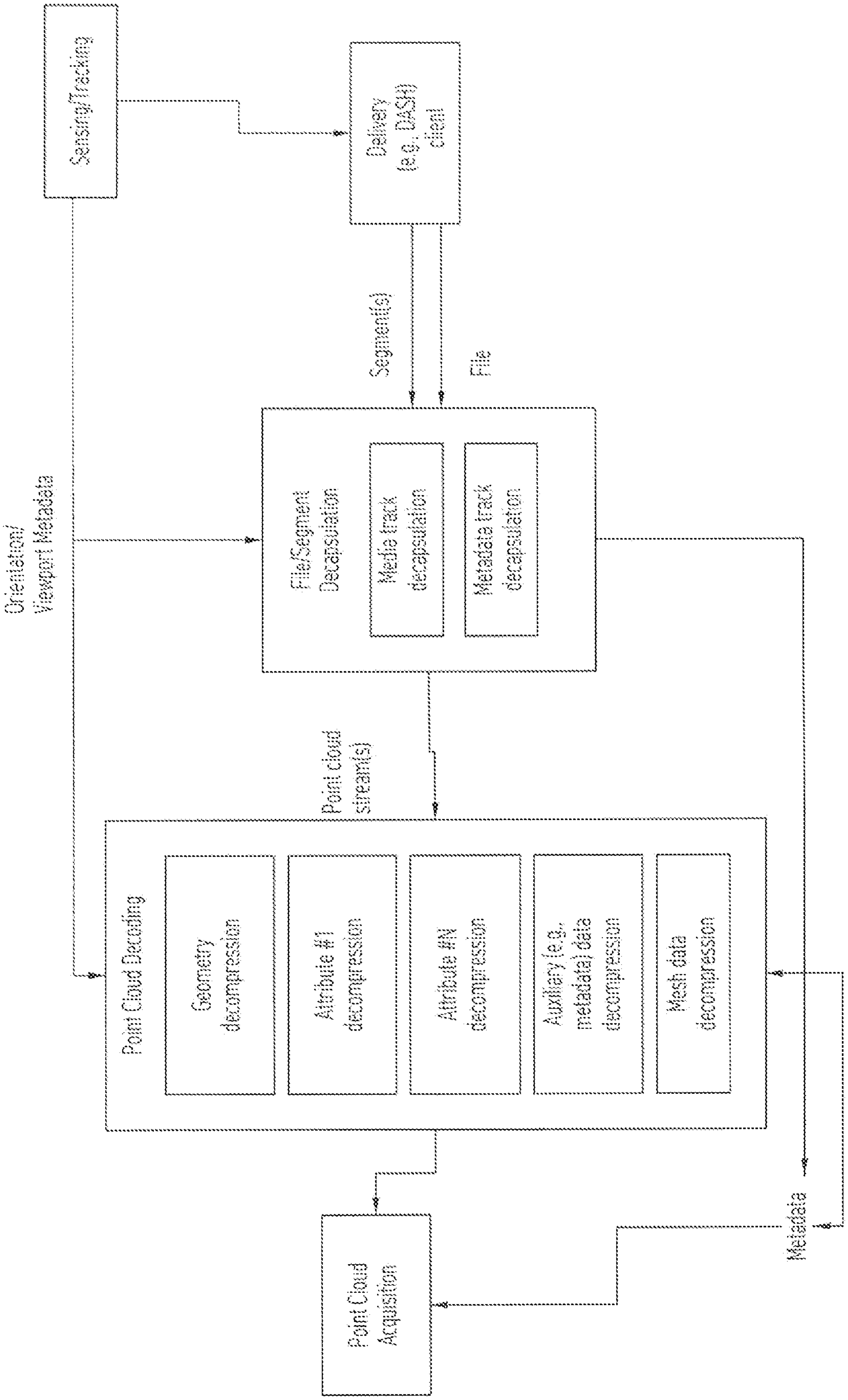

FIG. 10

Sensing/Tracking

Delivery (e.g., DASH) client

Segment(s)

File

Orientation/ Viewport Metadata

File/Segment Decapsulation

Media track decapsulation

Metadata track decapsulation

Point cloud stream(s)

Point Cloud Decoding

Geometry decompression

Attribute #1 decompression

Attribute #N decompression

Auxiliary (e.g., metadata) data decompression

Mesh data decompression

Metadata

Point Cloud Acquisition

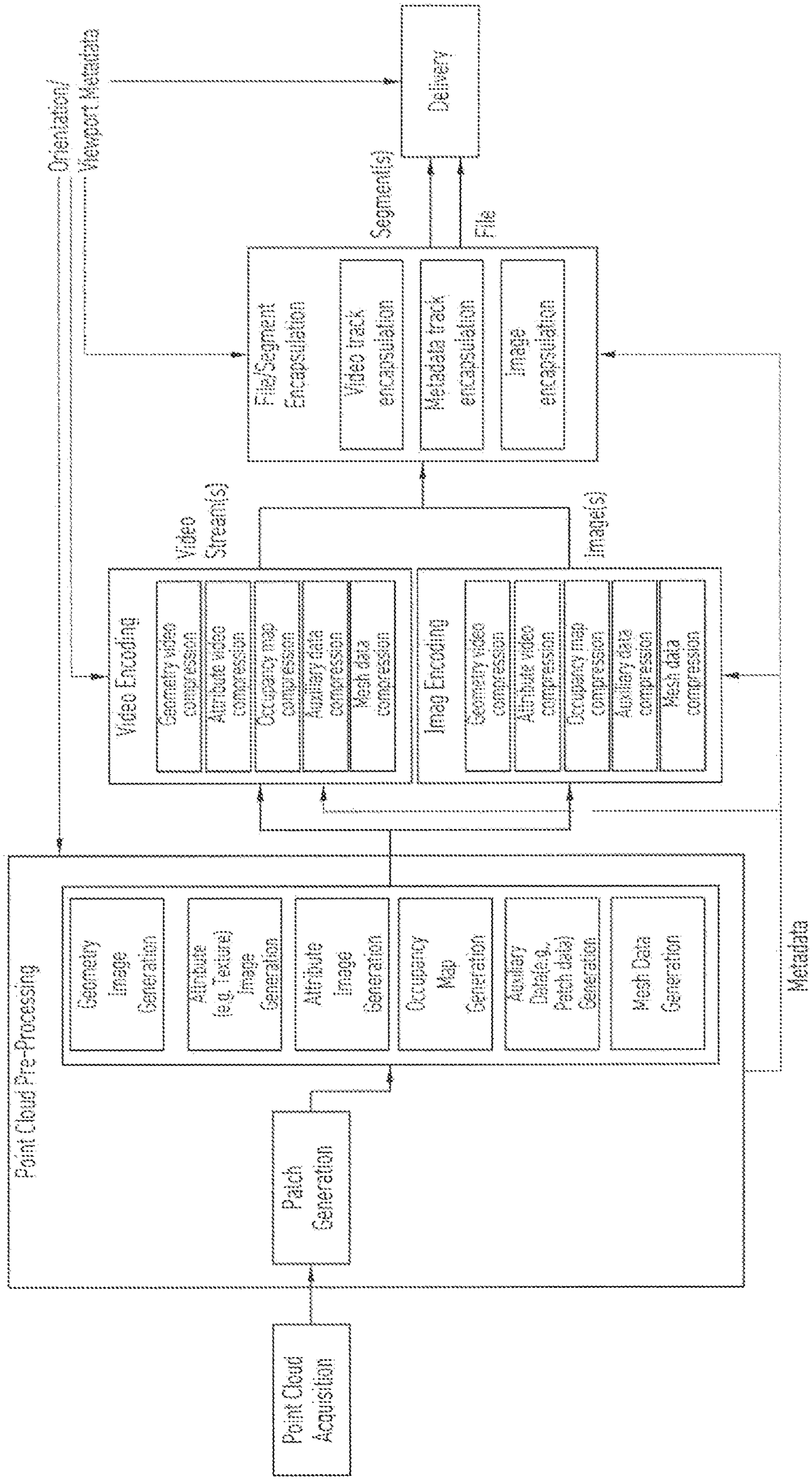

FIG. 11
Point Cloud Acquisition
Point Cloud Pre-Processing
Patch Generation
Geometry Image Generation
Attribute (e.g. Texture) Image Generation
Attribute Image Generation
Occupancy Map Generation
Auxiliary Data(e.g., Patch data) Generation
Mesh Data Generation
Metadata
Video Encoding
Geometry video compression
Attribute video compression
Occupancy map compression
Auxiliary data compression
Mesh data compression
Imag Encoding
Geometry video compression
Attribute video compression
Occupancy map compression
Auxiliary data compression
Mesh data compression
Video Stream(s)
Image(s)
File/Segment Encapsulation
Video track encapsulation
Metadata track encapsulation
Image encapsulation
Segment(s)
File
Delivery
Orientation/ Viewport Metadata

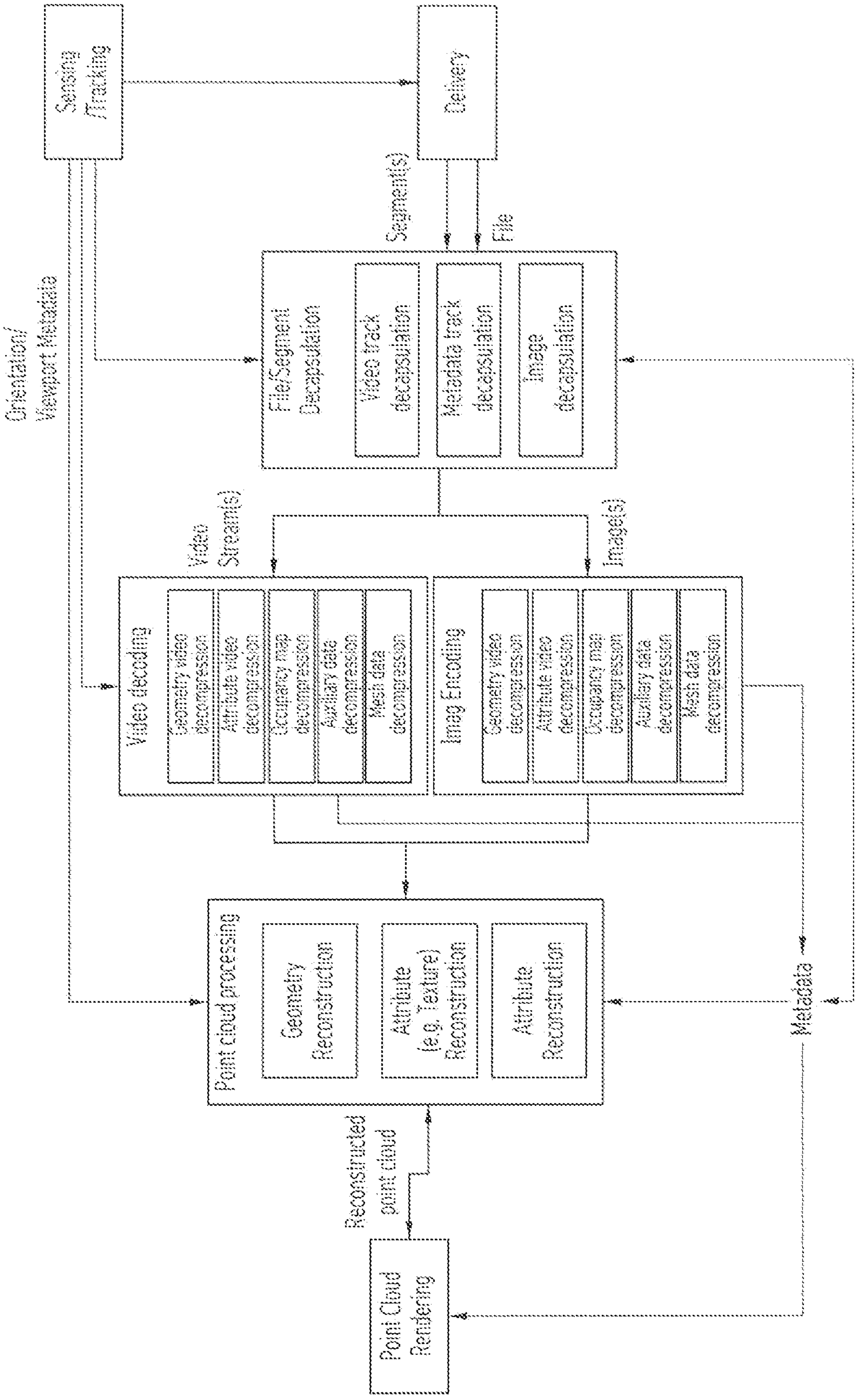

FIG. 12
Sensing /Tracking
Delivery
Orientation/ Viewport Metadata
Segment(s)
File
File/Segment Decapsulation
Video track decapsulation
Metadata track decapsulation
Image decapsulation
Video Stream(s)
Image(s)
Video decoding
Geometry video decompression
Attribute video decompression
Occupancy map decompression
Auxiliary data decompression
Mesh data decompression
Imag Encoding
Geometry video decompression
Attribute video decompression
Occupancy map decompression
Auxiliary data decompression
Mesh data decompression
Point cloud processing
Geometry Reconstruction
Attribute (e.g. Texture) Reconstruction
Attribute Reconstruction
Metadata
Reconstructed point cloud
Point Cloud Rendering (b)

FIG. 29

| PT | encoding name | media type | clock rate (Hz) |
|---|---|---|---|
| 24 | unassigned | V | |
| 25 | CelB | V | 90,000 |
| 26 | JPEG | V | 90,000 |
| 27 | unassigned | V | |
| 28 | nv | V | 90,000 |
| 29 | unassigned | V | |
| 30 | unassigned | V | |
| 31 | H261 | V | 90,000 |
| 32 | MPV | V | 90,000 |
| 33 | MP2T | AV | 90,000 |
| 34 | H263 | V | 90,000 |
| 35-71 | unassigned | ? | |
| 72-76 | reserved | N/A | N/A |
| 77-95 | unassigned | ? | |
| 96-127 | dynamic | ? | |
| dyn | H263-1998 | V | 90,000 |

| 0 1 2 3 4 5 6 7 8 9 1 0 1 2 3 4 5 | 6 7 8 9 2 0 1 2 3 4 5 6 7 8 9 3 0 1 | | |
|---|---|---|---|
| defined by profile | | length | |
| ID | L=3 | Data | Data |
| Data | Data | 0 pad | 0 pad |

FIG. 33

| SPS_Flag | SPS Description |
|---|---|
| 10000 | Simple |
| 01000 | Dense |
| 00100 | Predictive |
| 00010 | Main |
| 00001 | Simple, Predictive, Main |

FIG. 34

| seq_parameter_set_RTP( ) { | Descriptor |
|---|---|
| simple_profile_compatibility_flag | u(1) |
| dense_profile_compatibility_flag | u(1) |
| predictive_profile_compatibility_flag | u(1) |
| main_profile_compatibility_flag | u(1) |
| slice_reordering_constraint_flag | u(1) |
| unique_point_positions_constraint_flag | u(1) |
| level_idc | u(8) |
| sps_seq_parameter_set_id | u(4) |
| bypass_stream_enabled_flag | u(1) |

FIG. 35

| geometry_parameter_set_RTP( ) { | Descriptor |
|---|---|
| geom_tree_type | u(1) |
| inferred_direct_coding_mode | u(2) |
| geom_tree_coded_axis_list_present_flag | u(1) |
| log2_neighbour_avail_boundary_minus1 | u(3) |
| adjacent_child_contextualization_enabled_flag | u(1) |
| log2_intra_pred_max_node_size | ue(v) |
| bitwise_occupancy_coding_flag | u(1) |
| geometry_planar_enabled_flag | u(1) |
| geom_idcm_rate_minus1 | u(5) |
| geometry_angular_enabled_flag | u(1) |
| geom_scaling_enabled_flag | u(1) |

FIG. 36

| attribute_parameter_set_RTP( ) { | Descriptor |
|---|---|
| attr_coding_type | ue(v) |
| aps_slice_qp_offset_present_flag | u(1) |
| raht_prediction_enabled_flag | u(1) |
| last_component_prediction_enabled_flag | u(1) |
| lod_scalability_enabled_flag | u(1) |
| max_nn_range_minus1 | u(2) |
| max_num_detail_levels_minus1 | ue(v) |
| morton_sort_skip_enabled_flag | u(1) |
| lod_decimation_mode | ue(v) |
| lod_dist2_init | ue(v) |
| aps_slice_lod_dist2_offset_present_flag | u(1) |
| max_num_direct_predictors | ue(v) |
| direct_avg_predictor_disabled_flag | u(1) |
| intra_lod_prediction_skip_layers | ue(v) |
| lod_search_range_intra | ue(v) |
| inter_component_prediction_enabled_flag | u(1) |
| neighbour_blending_enabled_flag | u(1) |
| raw_attr_fixed_width_flag | u(1) |
| aps_coord_conv_flag | u(1) |
| aps_extension_flag | u(1) |

FIG. 37

```
INVITE sip : PhoneB@172.20.120.30 SIP/2.0
Via : SIP/2.0/UDP 10.31.101.50:5060
From : PhoneA <sip : PhoneA@10.31.101.20>
To : PhoneB <sip : PhoneB@172.20.120.30>
Call-ID : 314159@10.31.101.20
CSeq : 1 INVITE
Contact : sip : PhoneA@10.31.101.20
Content-Type : application/sdp
Content-Length : 124
v=0
0=PhoneA 5462346 332134 IN IP4 10.31.101.20
s=Let's Talk
t=0 0
c=IN IP4 10.31.101.20
m=audio 49170 RTP 0 3
```

FIG. 38

SIP/2.0 200 OK
Via : SIP/2.0/UDP 10.31.101.50:5060
From : PhoneA <sip : PhoneA@10.31.101.20>
To : PhoneB <sip : PhoneB@172.20.120.30>
Call-ID : 314159@10.31.101.20
CSeq : 1 INVITE
Contact : sip : PhoneB@10.31.101.30
Content-Type : application/sdp
Content-Length : 107
v=0
0=PhoneB 124333 67895 IN IP4 172.20.120.30
s=Hello!
t=0 0
c=IN IP4 172.20.120.30
m=audio 3456 RTP 0

FIG. 39

```
SDP offer
m-video 49154 RTP/AVP 99
a=t cap : 1 RTP/AVPF
a=pcfg : 1 t=1
b=AS : 315
b=RS : 0
b=RR : 2500
a=rtpmap : 99 H264/90000
a=fmtp : 99 packetization-mode-0; profile-level-id-42e00c;\
        sprop-parameter-sets=J0LgDJWgUH6Af1A=, KM46gA==
a-rtcp-fb : * trr-int 5000
a-rtcp-fb : * nack
a-rtcp-fb : * nack pli
a-rtcp-fb : * ccm fir
a-rtcp-fb : * ccm tmmbr
a=extmap : 4 urn : 3gpp : video-orientation
a=extmap : 5 urn : 3gpp : video-orientation : 6
```

(a)

```
SDP answer
m-video 49154 RTP/AVP 99
a=acfg : 1 t=1
b=AS : 315
b=RS : 0
b=RR : 2500
a=rtpmap : 99 H264/90000
a=fmtp : 99 packetization-mode-0; profile-level-id-42e00c;\
        sprop-parameter-sets=J0LgDJWgUH6Af1A=, KM46gA==
a-rtcp-fb : * trr-int 5000
a-rtcp-fb : * nack
a-rtcp-fb : * nack pli
a-rtcp-fb : * ccm fir
a-rtcp-fb : * ccm tmmbr
a=extmap : 5 urn : 3gpp : video-orientation : 6
```

| SDP offer |
|---|
| m-video 49154 RTP/AVP 99<br>a=t cap : 1 RTP/AVPF<br>a=pcfg : 1 t=1<br>a=rtpmap : 100 H265/90000<br>a=3gpp_gpcc : simple_profile_compatibility_flag=1, dense_profile_compatibility_flag=0, predictive_profile_compatibility_flag=0, main_profile_compatibility_flag=0 /*예시 1*/<br>/*예시 2 a=3gpp_gpcc : profile=[simple] */<br><br>a=3gpp_gpcc_mtype : A B HT=1 C HT = 0<br>a=mid : A<br>a=3gpp_gpcc : [header = SPS]<br><br>a=mid : B<br>a=3gpp_gpcc : [header = GPS]<br><br>m=video 49158 RTP/AVP 99 :C<br>a=t cap : 1 RTP/AVPF<br>a=pcfg : 1 t=1 |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATIONS

This application is a National Stage application under 35 U.S.C. § 371 of International Application No. PCT/KR2022/011485, filed on Aug. 3, 2022, which claims the benefit of Korean Application Nos. 10-2021-0115317, filed on Aug. 31, 2021, 10-2021-0115316, filed on Aug. 31, 2021, and 10-2021-0101882, filed on Aug. 3, 2021. The disclosures of the prior applications are incorporated by reference in their entirety.

TECHNICAL FIELD

Embodiments relate to a method and device for processing point cloud content.

BACKGROUND

Point cloud content is represented by a point cloud, which is a set of points belonging to a coordinate system representing a three-dimensional space. The point cloud content may represent three-dimensional media, and may be used to provide various services such as virtual reality (VR), augmented reality (AR), mixed reality (MR), and autonomous driving services. The VR technology is a computer graphic technology that provides an object, a background, or the like of a real world only using a CG image, the AR technology provides a CG image that is virtually made on an actual object image, and the MR technology is a computer graphic technology that mixes and combines virtual objects and provides the same to the real world. The above-described VR, AR, MR, and the like may be simply referred to as extended reality (XR) technology. However, to express the point cloud content, tens of thousands to hundreds of thousands of point data are required. Therefore, there is a need for a method for efficiently processing a huge amount of point data.

DISCLOSURE

Technical Problem

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

Technical Solution

According to an aspect of the present disclosure, a method of providing a point cloud service includes performing a call connection for a call between a first user equipment (UE) and a second UE, based on the call connection being performed, transmitting point cloud data to the first UE based on at least one real time transport protocol (RTP) packet, by the second UE, wherein the point cloud data includes geometry-based point cloud compression (G-PCC) data compressed based on G-PCC, and a header of the at least one RTP packet includes identification information for identifying the G-PCC data.

The header of the at least one RTP packet may further include information for a type of a frame including the point cloud data.

The header of the at least one RTP packet may further include profile information of the point cloud data.

The performing of the call connection may include transmitting a session description protocol (SDP) offer message to the second UE from the first UE, and transmitting an SDP answer message to the first UE from the second UE.

The SDP offer message may include profile information of the point cloud data.

The point cloud data may include video-based point cloud compression (V-PCC) data compressed based on V-PCC, and the identification information may identify whether point cloud data included in the at least one RTP packet is the G-PCC data or the V-PCC data.

According to another aspect of the present disclosure, a device for providing a point cloud service includes a first user equipment (UE), a second UE, and at least one edge enabler located between the first UE and the second UE and configured to perform an initialization process, wherein, based on a call connection for a call between the first UE and the second UE being performed, the second UE transmits point cloud data to the first UE based on at least one real time transport protocol (RTP) packet, the point cloud data includes geometry-based point cloud compression (G-PCC) data compressed based on G-PCC, and a header of the at least one RTP packet includes identification information for identifying the G-PCC data.

The header of the at least one RTP packet may further include information for a type of a frame including the point cloud data.

The header of the at least one RTP packet may further include profile information of the point cloud data.

For the call connection between the first UE and the second UE, a session description protocol (SDP) offer message may be transmitted to the second UE from the first UE, and an SDP answer message may be transmitted to the first UE from the second UE.

The SDP offer message may include profile information of the point cloud data.

The point cloud data may include video-based point cloud compression (V-PCC) data compressed based on V-PCC, and the identification information may identify whether point cloud data included in the at least one RTP packet is the G-PCC data or the V-PCC data.

The first UE may make a discovery request to the at least one edge enabler and perform an initialization process of receiving a discovery response from the edge enabler.

The second UE may make a discovery request to the at least one edge enabler and perform an initialization process of receiving a discovery response from the edge enabler.

An edge enabler configured to perform the discovery request/response with the first UE and an edge enabler configured to perform the discovery request/response with the second UE may be different from each other.

An edge enabler configured to perform the discovery request/response with the first UE and an edge enabler configured to perform the discovery request/response with the second UE may be the same.

Advantageous Effects

Devices and methods according to embodiments may process point cloud data with high efficiency.

The devices and methods according to the embodiments may provide a high-quality point cloud service.

The devices and methods according to the embodiments may provide point cloud content for providing general-purpose services such as a XR service and a self-driving service.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts.

FIG. 5 illustrates an example of an ACK/NACK transmission procedure and a PUSCH transmission procedure.

FIG. 10 illustrates an example of a point cloud data processing device according to embodiments.

FIG. 11 illustrates an example of a point cloud data processing device according to embodiments.

FIG. 12 illustrates an example of a point cloud data processing device according to embodiments.

FIG. 24 is a flowchart illustrating an example of a process of generating a basic telephone network for forming a 1:1 conversation.

FIG. 29 illustrates an example of a payload type allocated to a payload type (PT) field in a header of an RTP packet according to embodiments.

FIG. 33 illustrates an example of values assigned to an SPS_Flag field, according to embodiments.

FIG. 34 illustrates an example of a syntax structure of a seq_parameter_set_RTP( ) (SPS), according to embodiments.

FIG. 35 illustrates an example of a syntax structure of a geometry_parameter_set_RTP( ) (GPS), according to embodiments.

FIG. 36 illustrates an example of a syntax structure of attribute_parameter_set_RTP( ) (APS), according to an embodiment.

FIG. 37 illustrates an actual example of a SIP INVITE and response according to embodiments.

FIG. 38 is a diagram illustrating an example in which a 200 OK message is transmitted in response to the same request, according to embodiments.

FIG. 39(*a*) illustrates an example of an SDP offer message, and FIG. 39(*b*) illustrates an example of an SDP answer message, according to embodiments.

FIG. 40 illustrates an example of an SDP offer message, according to embodiments.

DETAILED DESCRIPTION

Preferred embodiments of the embodiments are described in detail, examples of which are shown in the accompanying drawings. The following detailed description with reference to the accompanying drawings is intended to illustrate a preferred embodiment of the embodiments rather than only showing embodiments that may be implemented in accordance with embodiments of the embodiments. The following detailed description includes details to provide a thorough understanding of the embodiments. However, it will be apparent to those skilled in the art that the embodiments may be practiced without these details.

Most terms used in embodiments are selected in general ones that are widely used in the art, but some terms are arbitrarily selected by the applicant and their meaning is described in detail in the following description as needed. Accordingly, embodiments should be understood based on the intended meaning of terms rather than a simple name or meaning of the term.

Figure 1:
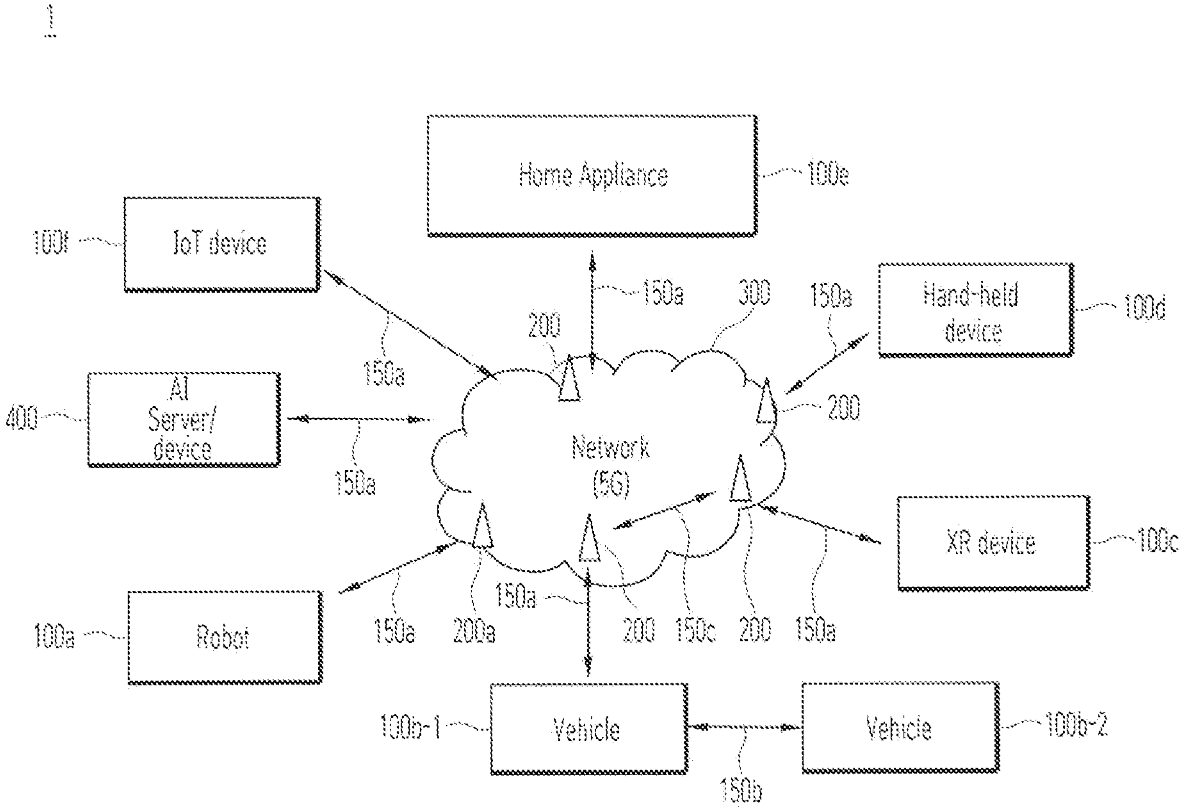
FIG. 1 is a block diagram illustrating an exemplary communication system 1 according to embodiments.

FIG. 1 is a block diagram illustrating an example of a communication system 1 according to embodiments.

Referring to FIG. 1, the communication system 1 includes wireless devices 100*a* to 100*f*, a base station (BS) 200, and a network 300. The BS 200 may be referred to as a fixed station, a Node B, an evolved-nodeb (enb), a next generation nodeb (gnb), a base transceiver system (BTS), an access point (AP), a network or 5th generation (5G) network node, an artificial intelligence (AI) system, a road side unit (RSU), a robot, an augmented reality (AR)/virtual reality (VR) system, a server, or the like. According to embodiments, a wireless device refers to a device that performs communication with a BS and/or another wireless device using a wireless access technology (e.g., 5G New RAT (NR) or Long Term Evolution (LTE)), and may be referred to as a communication/wireless/5G device or a user equipment (UE). The wireless devices are not limited to the above embodiments, and may include a robot 100*a*, vehicles 100*b*-1 and 100*b*-2, an extended reality (XR) device 100*c*, a hand-held device 100*d*, a home appliance 100*e*, an Internet of Thing (IoT) device 100*f*, and an AI device/server 400. The XR device 100*c* represents devices that provide XR content (e.g., augmented reality (AR)/virtual reality (VR)/mixed reality (MR) content, etc.). According to embodiments, the XR device may be referred to as an AR/VR/MR device. The XR device 100*c* may be implemented in the form of a head-mounted device (HMD), a head-up display (HUD) provided in a vehicle, a television, a smartphone, a computer, a wearable device, a home appliance, a digital signage, a vehicle, a robot, and the like, according to embodiments. For example, the vehicles 100*b*-1 and 100*b*-2 may include a vehicle having a wireless communication function, an autonomous vehicle, a vehicle capable of performing vehicle-to-vehicle communication, and an unmanned aerial vehicle (UAV) (e.g., a drone). The hand-held device 100*d* may include a smartphone, a smart pad, a wearable device (e.g., a smart watch, a smart glass), and a computer (e.g., a laptop computer). The home appliance 100*e* may include a TV, a refrigerator, and a washing machine. The IoT device 100*f* may include a sensor and a smart meter. The wireless devices 100*a* to 100*f* may be connected to the network 300 via the BS 200. The wireless devices 100*a* to 100*f* may be connected to the AI server 400 over the network 300. The network 300 may be configured using a 3G network, a 4G network (e.g., an LTE network), a 5G network (e.g., an NR network), a 6G network, or the like. The wireless devices 100*a* to 100*f* may communicate with each other over the BS 200/the network 300. Alternatively, the wireless devices 100*a* to 100*f* may perform direct communication (e.g., sidelink communication) without using the BS/network.

Wireless signals may be transmitted and received between the wireless devices 100*a* to 100*f* and the BS 200 or between the BSs 200 through wireless communications/connections 150*a*, 150*b*, and 150*c*. The wireless communications/connections according to the embodiments may include various radio access technologies (e.g., 5G, NR, etc.) such asw an uplink/downlink communication 150*a*, which is a communication between a wireless device and a BS, a sidelink communication 150*b* (or D2D communication), which is a communication between wireless devices, and a communication 150*c* (e.g., a relay and an integrated access backhaul (IAB) between BSs. The wireless devices 100*a* to 100*f* and the BS 200 may transmit/receive signals on various physical channels for the wireless communications/connections 150*a*, 150*b*, and 150*c*. For the wireless communications/connections 150*a*, 150*b*, and 150*c*, at least one of various configuration information setting procedures for transmitting/receiving wireless signals, various signal processing procedures (e.g., channel encoding/decoding, modulation/demodulation, resource mapping/demapping, etc.), and a resource allocation procedure, and the like may be performed.

According to embodiments, a UE (e.g., an XR device (e.g., the XR device 100*c* of FIG. 1)) may transmit specific information including XR data (or AR/VR data) necessary for providing XR content such as audio/video data, voice data, and surrounding information data to a BS or another UE through a network. According to embodiments, the UE may perform an initial access operation to the network. In the initial access procedure, the UE may acquire cell search and system information to acquire downlink (DL) synchronization. The DL according to the embodiments refers to communication from a base station (e.g., a BS) or a transmitter, which is a part of the BS, to a UE or a receiver included in the UE. According to embodiments, a UE may perform a random access operation for accessing a network. In the random access operation, the UE may transmit a preamble to acquire uplink (UL) synchronization or transmit UL data, and may perform a random access response reception operation. The UL according to the embodiments represents communication from a UE or a transmitter, which is part of the UE, to a BS or a receiver, which is part of the BS. In addition, the UE may perform a UL grant reception operation to transmit specific information to the BS. In embodiments, the UL grant is configured to receive time/frequency resource scheduling information for UL data transmission. The UE may transmit the specific information to the BS through the 5G network based on the UL grant. According to embodiment, the BS may perform XR content processing. The UE may perform a DL grant reception operation to receive a response to the specific information through the 5G network. The DL grant represents receiving time/frequency resource scheduling information to receive DL data. The UE may receive a response to the specific information through the network based on the DL grant.

Figure 2:
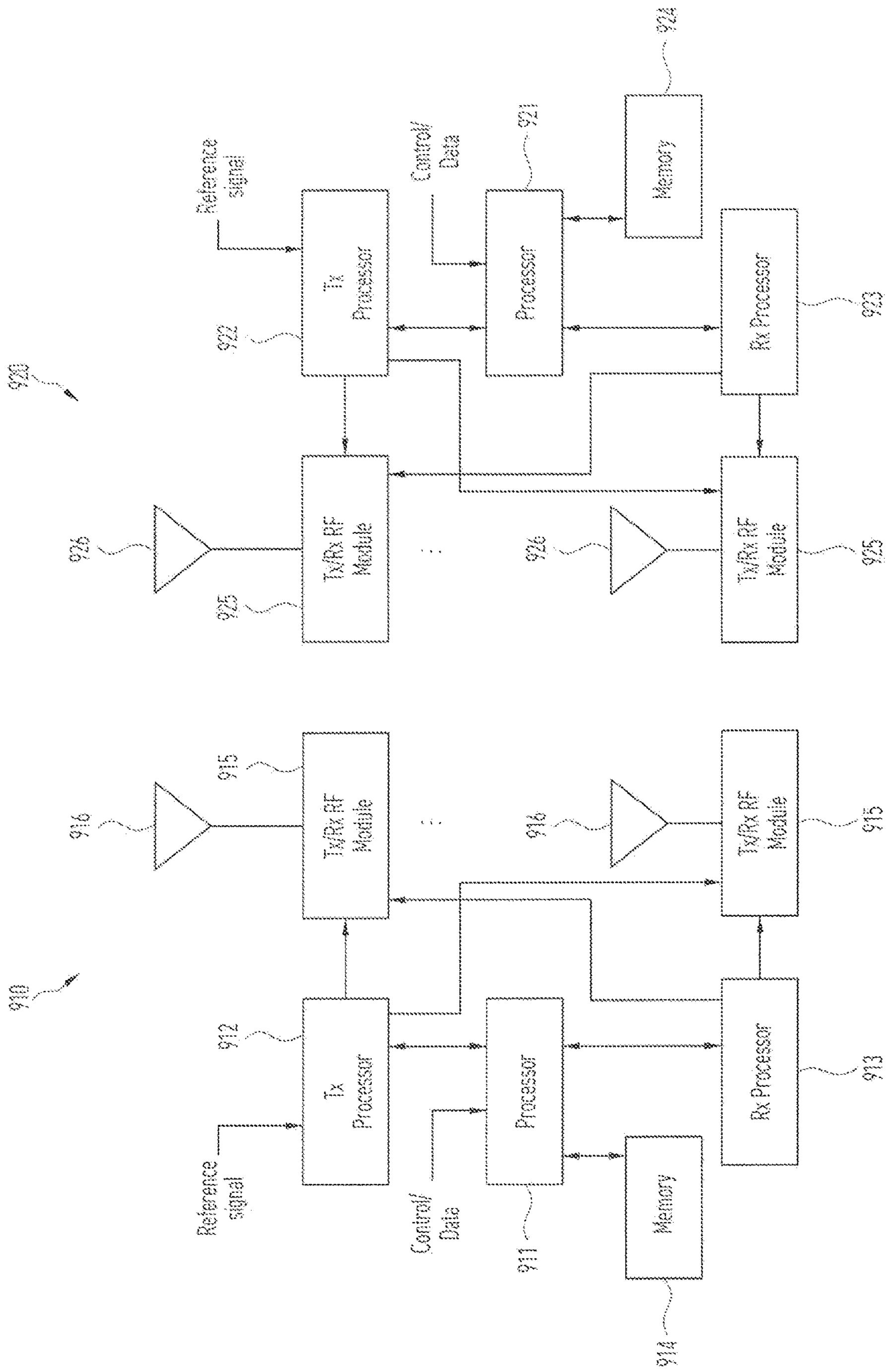
FIG. 2 is a block diagram illustrating a wireless communication system to which methods according to embodiments are applicable.

FIG. 2 is a block diagram illustrating a wireless communication system to which methods according to embodiments are applicable.

The wireless communication system includes a first communication device 910 and/or a second communication device 920. "A and/or B" may be interpreted as having the same meaning as "at least one of A or B." The first communication device may represent the BS, and the second communication device may represent the UE (or the first communication device may represent the UE and the second communication device may represent the BS).

The first communication device and the second communication device include a processor 911, 921, a memory 914, 924, one or more TX/RX RF modules 915, 925, a TX processor 912, 922, an RX processor 913, 923, and an antenna 916, 926. The Tx Tx/Rx modules are also referred to as transceivers. The processor 911 may perform a signal processing function of a layer (e.g., layer 2 (L2)) of a physical layer or higher. For example, in downlink or DL (communication from the first communication device to the second communication device), an upper layer packet from the core network is provided to the processor 911. In the DL, the processor 911 provides multiplexing between a logical channel and a transport channel and radio resource allocation to the second communication device 920, and is responsible for signaling to the second communication device. The first communication device 910 and the second communication device 920 may further include a processor (e.g., an audio/video encoder, an audio/video decoder, etc.) configured to process data from a layer higher than the upper layer packet processed by the processors 911 and 921. The processor according to the embodiments may process video data processed according to various video standards (e.g., MPEG2, AVC, HEVC, VVC, etc.) and audio data processed by various audio standards (e.g., MPEG 1 Layer 2 Audio, AC3, HE-AAC, E-AC-3, HE-AAC, NGA, etc.). Also, according to embodiments, the processor may process XR data or XR media data processed by a Video-Based Point Cloud Compression (V-PCC) or Geometry-Based Point Cloud Compression (G-PCC) scheme. The processor configured to process higher layer data may be coupled to the processors 911 and 921 to be implemented as one processor or one chip. Alternatively, the processor configured to process higher layer data may be implemented as a separate chip or a separate processor from the processors 911 and 921. The TX processor 912 implements various signal processing functions for layer L1 (i.e., the physical layer). The signal processing function of the physical layer may facilitate forward error correction (FEC) in the second communication device. The signal processing function of the physical layer includes coding and interleaving. Signals that have undergone encoding and interleaving are modulated into complex valued modulation symbols through scrambling and modulation. In the modulation, BPSK, QPSK, 16 QAM, 64 QAM, 246 QAM, etc. may be used according to a channel. The complex valued modulation symbols (hereinafter, modulation symbols) are divided into parallel streams. Each stream is mapped to an OFDM subcarrier, multiplexed with a reference signal in the time and/or frequency domain, and combined together using IFFT to generate a physical channel for carrying a time-domain OFDM symbol stream. The OFDM symbol stream is spatially precoded to generate a multi-spatial stream. Each spatial stream may be provided to a different antenna 916 via an individual Tx/Rx module (or transceiver) 915. Each Tx/Rx module may frequency up-convert each spatial stream to an RF subcarrier for transmission. In the second communication device, each Tx/Rx module (or transceiver) 925 receives a signal of the RF subcarrier through each antenna 926 of each Tx/Rx module. Each Tx/Rx module reconstructs a baseband signal from the signal of the RF subcarrier and provides the same to the RX processor 923. The RX processor implements various signal processing functions of L1 (i.e., the physical layer). The RX processor may perform spatial processing on the information to recover any spatial stream directed to the second communication device. If multiple spatial streams are directed to the second communication device, they may be combined into a single OFDMA symbol stream by multiple RX processors. An RX processor converts an OFDM symbol stream, which is a time-domain signal, into a frequency-domain signal using a Fast Fourier Transform (FFT). The frequency-domain signal includes an individual OFDM symbol stream for each subcarrier of the OFDM signal. The modulation symbols on each subcarrier and the reference signal are recovered and demodulated by determining the most likely constellation points transmitted by the first communication device. These soft decisions may be based on channel estimation values. The soft decisions are decoded and deinterleaved to recover the data and control signal originally transmitted by the first communication device on the physical channel. The data and control signal are provided to the processor 921.

The UL (communication from the second communication device to the first communication device) is processed by the first communication device 910 in a manner similar to that described in connection with the receiver function of the second communication device 920. Each TX RX/RX module 925 receives a signal through each antenna 926. Each Tx/Rx module provides RF subcarrier and information to the RX processor 923. The processor 921 may be related to the memory 924 that stores program code and data. The memory may be referred to as a computer-readable medium.

Figure 3:
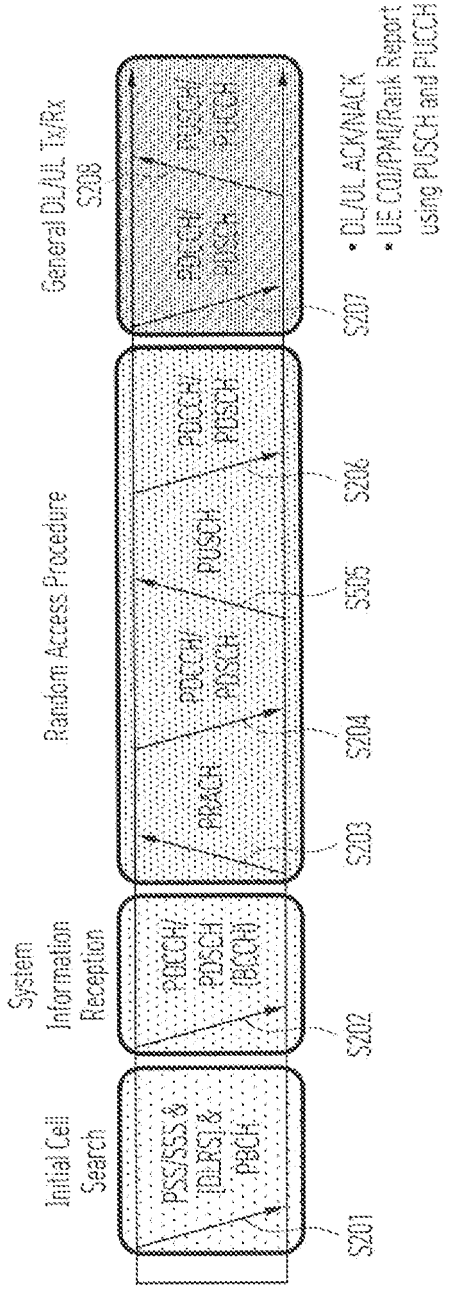
FIG. 3 illustrates an example of a 3GPP signal transmission/reception method.
Figure 4:
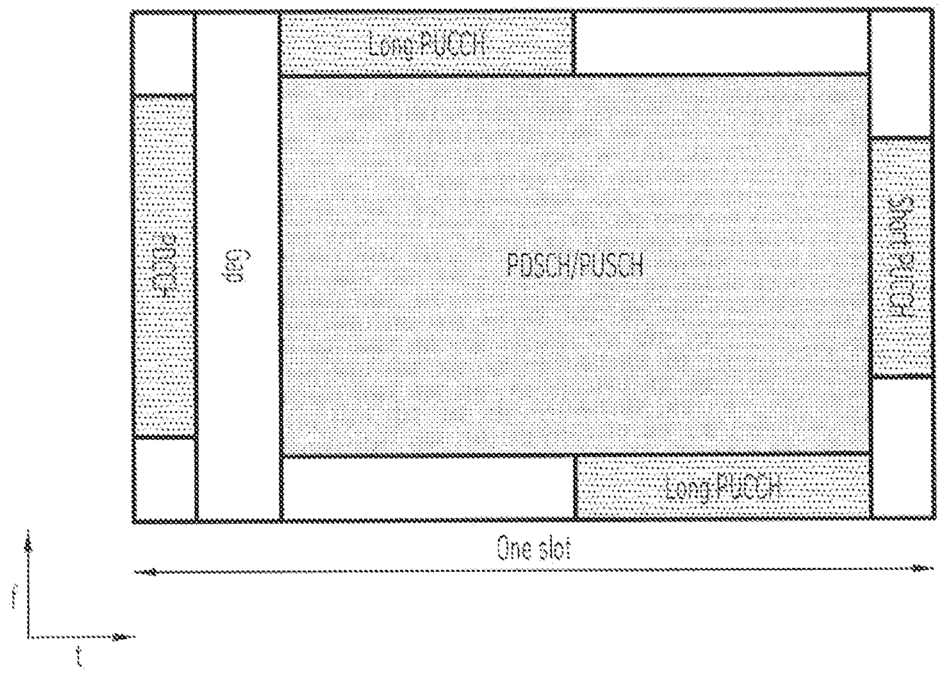
FIG. 4 illustrates an example of mapping a physical channel in a self-contained slot according to embodiments.

FIGS. 3 to 5 illustrate examples of one or more signal processing methods and/or operations for layer L1 (i.e., the physical layer). The examples disclosed in FIGS. 3 to 5 may be the same as or similar to the example of a signal processing method and/or operations performed by the TX processor 912 and/or the TX processor 922 described with reference to FIG. 2.

FIG. 3 illustrates an example of a 3GPP signal transmission/reception method.

According to embodiments, when a UE is turned on or enters a new cell, the UE may perform an initial cell search such as synchronization with a BS (S201). The UE may receive a primary synchronization channel (P-SCH) and a secondary synchronization channel (S-SCH) from the BS to synchronize with the BS and acquire information such as cell ID. In the LTE system and the NR system, the P-SCH and the S-SCH may be referred to as a primary synchronization signal (PSS) and a secondary synchronization signal (SSS), respectively. After the initial cell search, the UE may receive a physical broadcast channel (PBCH) from the BS to acquire broadcast information in the cell. In the initial cell search operation, the UE may receive a DL reference signal (DL-RS) and check the state of the DL channel.

After the initial cell search, the UE may acquire more detailed system information by receiving a PDSCH according to the information carried on the PDCCH and the PDCCH (S202).

When the UE initially accesses the BS or does not have radio resources for signal transmission, the UE may perform a random access procedure for the BS (operations S203 to S206). To this end, the UE may transmit a specific sequence as a preamble through the PRACH (S203 and S205), and receive a random access response (RAR) message for the preamble through the PDCCH and the corresponding PDSCH (S204 and S206). In the case of a contention-based random access procedure, a contention resolution procedure may be additionally performed.

After performing the above-described procedure, the UE may perform PDCCH DL/PDSCH reception (S207) and PUSCH DL/PUCCH transmission (S208) as a general UL/DL signal transmission procedure. In particular, the UE receives DCI through a PDCCH. The UE monitors a set of PDCCH candidates on monitoring occasions configured in one or more control element sets (CORESETs) on a serving cell according to corresponding search space configurations. The set of PDCCH candidates to be monitored by the UE may be defined in terms of search space sets. The search space set according to the embodiments may be a common search space set or a UE-specific search space set. A CORESET consists of a set of (physical) resource blocks having a time duration of 1 to 3 OFDM symbols. The network may configure the UE to have a plurality of CORESETs. The UE monitors PDCCH candidates in one or more search space sets. Here, the monitoring means attempting to decode the PDCCH candidate(s) in the search space. When the UE succeeds in decoding one of the PDCCH candidates in the search space, the UE may determine that the PDCCH has been detected from the corresponding PDCCH candidate, and perform PDSCH reception or PUSCH transmission based on the DCI within the detected PDCCH. The PDCCH according to the embodiments may be used to schedule DL transmissions on the PDSCH and UL transmissions on the PUSCH. The DCI on the PDCCH may include a DL assignment (i.e., a DL grant) including at least a modulation and coding format and resource allocation information related to a DL shared channel, or a UL grant including a modulation and coding format and resource allocation information related to a UL shared channel.

The UE may acquire DL synchronization by detecting an SSB. The UE may identify the structure of the SSB burst set based on the detected SSB (time) index (SSBI), thereby detecting the symbol/slot/half-frame boundary. The number assigned to the frame/half-frame to which the detected SSB belongs may be identified based on the system frame number (SFN) information and half-frame indication information. The UE may acquire, from the PBCH, a 10-bit SFN for a frame to which the PBCH belongs. The UE may acquire 1-bit half-frame indication information and determine whether the PBCH belongs to a first half-frame or a second half-frame of the frame. For example, the half-frame indication equal to 0 indicates that the SSB to which the PBCH belongs to the first half-frame in the frame. The half-frame indication bit equal to 1 indicates that the SSB to which the PBCH belongs to the second half-frame in the frame. The UE may acquire the SSBI of the SSB to which the PBCH belongs, based on the DMRS sequence and the PBCH payload carried by the PBCH.

Table 1 below represents the random access procedure of the UE.

TABLE 1

| Signal type | Acquired operation/information | |
|---|---|---|
| Step 1 | PRACH preamble on UL | * Initial beam acquisition |
| * Random selection of random access preamble ID | | |
| Step 2 | Random access response on PDSCH | * Timing advance information |
| * Random access preamble ID | | |
| * Initial UL grant, Temporary C-RNTI | | |
| Step 3 | UL transmission on PUSCH | * RRC Connection request |
| UE identifier | | |
| Step 4 | Contention resolution on DL | Temporary C-RNTI for initial access |
| C-RNTI on PDCCH for the UE that is in RRC_CONNECTED | | |

The random access procedure is used for various purposes. For example, the random access procedure may be used for network initial access, handover, and UE-triggered UL data transmission. The UE may acquire UL synchronization and UL transmission resources through the random access procedure. The random access procedure is divided into a contention-based random access procedure and a contention free random access procedure.

FIG. 4 illustrates an example of mapping a physical channel in a self-contained slot according to embodiments.

A PDCCH may be transmitted in the DL control region, and a PDSCH may be transmitted in the DL data region. A PUCCH may be transmitted in the UL control region, and a PUSCH may be transmitted in the UL data region. The GP provides a time gap in a process in which the BS and the UE switch from a transmission mode to a reception mode or from the reception mode to the transmission mode. Some symbols at the time of switching from DL to UL in a subframe may be set to the GP.

The PDCCH according to the embodiments carries downlink control information (DCI). For example, the PCCCH (i.e., DCI) carries a transmission format and resource allocation of a downlink shared channel (DL-SCH), resource allocation information about an uplink shared channel (UL-SCH), paging information about a paging channel (PCH), system information on the DL-SCH, resource allocation information about a higher layer control message such as a random access response transmitted on a PDSCH, a transmit power control command, and activation/release of configured scheduling (CS). The DCI includes a cyclic redundancy check (CRC). The CRC is masked/scrambled with various identifiers (e.g., radio network temporary identifier (RNTI)) according to the owner or usage purpose of the PDCCH. For example, when the PDCCH is for a specific UE, the CRC is masked with a UE identifier (e.g., a cell-RNTI (C-RNTI)). When the PDCCH is for paging, the CRC is masked with a paging-RNTI (P-RNTI). When the PDCCH is related to system information (e.g., a system information block (SIB)), the CRC is masked with a system information RNTI (SI-RNTI). When the PDCCH is for a random access response, the CRC is masked with a random access-RNTI (RA-RNTI).

The PDCCH is composed of 1, 2, 4, 8, or 16 control channel elements (CCEs) according to an aggregation level (AL). A CCE is a logical allocation unit used to provide a PDCCH having a predetermined code rate according to a radio channel state. The CCE consists of 6 resource element groups (REGs). An REG is defined as one OFDM symbol and one (P) RB. The PDCCH is transmitted through a control resource set (CORESET). The CORESET is defined as an REG set with a given numerology (e.g., SCS CP length, etc.). Multiple CORESETs for one UE may overlap each other in the time/frequency domain. The CORESET may be configured through system information (e.g., master information block (MIB)) or UE-specific higher layer (e.g., radio resource control (RRC) layer) signaling. Specifically, the number of RBs and the number of OFDM symbols (up to 3 symbols) that constitute a CORESET may be configured by higher layer signaling.

For PDCCH reception/detection, the UE monitors PDCCH candidates. The PDCCH candidates represent the CCE(s) to be monitored by the UE for PDCCH detection. Each PDCCH candidate is defined as 1, 2, 4, 8, and 16 CCEs according to the AL. The monitoring includes (blind) decoding PDCCH candidates. A set of PDCCH candidates monitored by the UE is defined as a PDCCH search space (SS). The SS includes a common search space (CSS) or a UE-specific search space (USS). The UE may acquire the DCI by monitoring PDCCH candidates in one or more SSs configured by the MIB or higher layer signaling. Each CORESET is associated with one or more SSs, and each SS is associated with one CORESET. The SS may be defined based on the following parameters.

controlResourceSetId: Indicates the CORESET related to the SS.

monitoringSlotPeriodicityAndOffset: Indicates the PDCCH monitoring periodicity (in slots) and PDCCH monitoring interval offset (in slots)

monitoringSymbolsWithinSlot: Indicates the PDCCH monitoring symbols within the slot (e.g., first symbol(s) of CORESET)

nrofCandidates: Indicates the number of PDCCH candidates (one of 0, 1, 2, 3, 4, 5, 6, and 8) for AL={1, 2, 4, 8, 16}.

An occasion (e.g., time/frequency resource) on which PDCCH candidates should be monitored is defined as a PDCCH (monitoring) occasion. One or more PDCCH (monitoring) occasions may be configured within the slot.

The PUCCH carries uplink control information (UCI). The UCI includes the following.

Scheduling request (SR): Information used to request UL-SCH resources.

Hybrid automatic repeat request (HARQ)-acknowledgement (ACK): A response to a DL data packet (e.g., a codeword) on a PDSCH. It indicates whether a DL data packet has been successfully received. In response to a single codeword, 1 bit of HARQ-ACK may be transmitted. In response to two codewords, two bits of HARQ-ACK may be transmitted. The HARQ-ACK response includes a positive ACK (simply, ACK), a negative ACK (NACK), DTX or NACK/DTX. The HARQ-ACK, HARQ ACK/NACK and the ACK/NACK may be used interchangeably.

Channel state information (CSI): Feedback information about a DL channel. Multiple Input Multiple Output (MIMO)-related feedback information includes a rank indicator (RI) and a precoding matrix indicator (PMI).

The PUSCH carries UL data (e.g., UL-SCH transport block (UL-SCH TB)) and/or uplink control information (UCI), and is transmitted based on a cyclic prefix-orthogonal frequency division multiplexing (CP-OFDM) waveform or a discrete Fourier transform-spread-orthogonal frequency division multiplexing (DFT-s-OFDM) waveform. When the PUSCH is transmitted based on the DFT-s-OFDM waveform, the UE transmits the PUSCH by applying transform precoding. For example, when the transform precoding is not available (e.g., the transform precoding is disabled), the UE transmits a PUSCH based on the CP-OFDM waveform. When the transform precoding is available (e.g., the transform precoding is enabled), the UE may transmit the PUSCH based on the CP-OFDM waveform or the DFT-s-OFDM waveform. The PUSCH transmission may be dynamically scheduled by a UL grant in the DCI, or may be semi-statically scheduled based on higher layer (e.g., RRC) signaling (and/or Layer 1 (L1) signaling (e.g., PDCCH)). The PUSCH transmission may be performed on a codebook basis or a non-codebook basis.

FIG. 5 illustrates an example of an ACK/NACK transmission procedure and a PUSCH transmission procedure.

FIG. 5-(*a*) illustrates an example of an ACK/NACK transmission procedure.

The UE may detect the PDCCH in slot #n. Here, the PDCCH contains DL scheduling information (e.g., DCI formats 1_0 and 1_1), and the PDCCH indicates DL assignment-to-PDSCH offset (K0) and PDSCH-HARQ-ACK reporting offset (K1). For example, DCI formats 1_0 and 1_1 may include the following information.

Frequency domain resource assignment: Indicates an RB set allocated to the PDSCH Time domain resource assignment: K0, indicates a start position (e.g., an OFDM symbol index) and length (e.g., the number of OFDM symbols) of a PDSCH in a slot PDSCH-to-HARQ_feedback timing indicator: Indicates K1.

HARQ process number (4 bits): Indicates a HARQ process identity (ID) for data (e.g., PDSCH, TB)

Thereafter, the UE may receive the PDSCH in slot #(n+K0) according to the scheduling information of slot #n, and then transmit the UCI through the PUCCH in slot #(n+K1). Here, the UCI includes a HARQ-ACK response for the PDSCH. When the PDSCH is configured to transmit up to 1 TB, the HARQ-ACK response may be configured in 1 bit. In the case where the PDSCH is configured to transmit up to two TBs, the HARQ-ACK response may be configured in 2 bits when spatial bundling is not configured, and may be configured in 1 bit when spatial bundling is configured. When the HARQ-ACK transmission time for a plurality of PDSCHs is designated as slot #(n+K1), the UCI transmitted in slot #(n+K1) includes a HARQ-ACK response for the plurality of PDSCHs. The BS/UE has a plurality of parallel DL HARQ processes for DL transmission. The plurality of parallel HARQ processes allows DL transmissions to be continuously performed while waiting for HARQ feedback for successful or unsuccessful reception for a previous DL transmission. Each HARQ process is associated with a HARQ buffer of a medium access control (MAC) layer. Each DL HARQ process manages state variables related to the number of transmissions of a MAC Physical Data Block (PDU) in a buffer, HARQ feedback for the MAC PDU in the buffer, a current redundancy version, and the like. Each HARQ process is distinguished by a HARQ process ID.

FIG. 5-(*b*) illustrates an example of a PUSCH transmission procedure.

The UE may detect the PDCCH in slot #n. Here, the PDCCH includes UL scheduling information (e.g., DCI formats 0_0 and 0_1). DCI formats 0_0 and 0_1 may include the following information.

Frequency domain resource assignment: Indicates an RB set allocated to a PUSCH

Time domain resource assignment: slot offset K2, indicates a start position (e.g., a symbol index) and length (e.g., the number of OFDM symbols) of a PUSCH in a slot. The start symbol and the length may be indicated through a Start and Length Indicator Value (SLIV), or may be indicated individually. The UE may transmit the PUSCH in slot #(n+K2) according to the scheduling information of slot #n. Here, the PUSCH includes a UL-SCH TB.

Embodiments may be applied to 5G-based media streaming (5GMS) systems. The 5GMS structure is a system that supports a mobile network operator (MNO) and a media DL streaming service of a third party. The 5GMS structure supports a related network or a UE function and API, and provides backward compatibility regardless of supportability of the MBMS and/or the 5G standard and EUTRAN installation. Streaming used in media using 5G is defined by the generation and transfer of temporally continuous media, and the definition of a streaming point indicates that a transmitter and a receiver directly transmit and consume media. The 5GMS structure basically operates in DL and UL environments and has bi-directionality. It is a method for streaming according to a desired scenario and a device capability between the UE and the server, and the functional blocks are technically configured and operated differently. When media is delivered on the DL, the network is an entity that produces the media and the UE is defined as a consumer device that consumes the media. The 5GMS service may use a network such as a 3G, 4G, or 6G network, as well as the 5G network, and is not limited to the above-described embodiment. Embodiments may also provide a network slicing function according to a service type.

Figure 6:
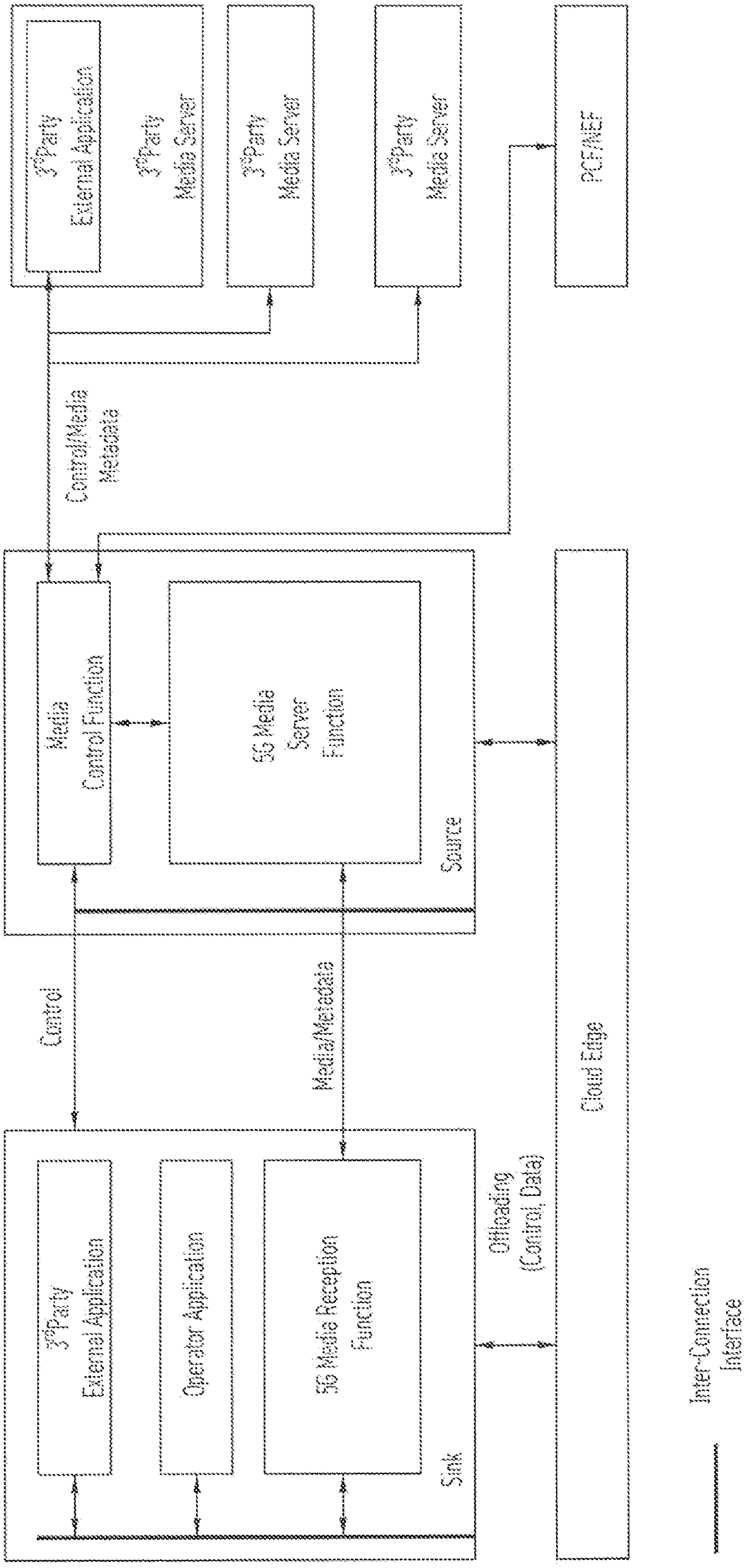
FIG. 6 illustrates a downlink structure for media transmission of a 5GMS service according to embodiments.

FIG. 6 illustrates a DL structure for media transmission of a 5GMS service according to embodiments.

FIG. 6 illustrates a media transmission hierarchy for at least one of 4G, 5G, and 6G networks, and a method for operating a device in a unidirectional DL media streaming environment. Since the system is a DL system, media is produced from the network and the Trusted Media Function. The media is delivered to the UE. Each block diagram is conceptually configured as a set of functions necessary for media transmission and reception. The inter-connection interface represents a link for sharing or adjusting a specific part of functions for each media block and is used when not all necessary element technologies are utilized. For example, the 3rd party external application and the operator application may perform independent application operations. However, they may be communicatively connected through the inter-connection interface when a function such as information share (user data, a media track, etc.) is required. According to embodiments, the media may include both information such as time-continuous, time-discontinuous, image, picture, video, audio, and text, and a medium, and may additionally include a format for transmitting the media, and a size of the format.

In FIG. 6, the sink represents a UE, a processor (e.g., the processor 911 for signal processing of the higher layer described with reference to FIG. 2, etc.) included in the UE, or hardware constituting the UE. According to embodiments, the sink may perform a reception operation of receiving a streaming service in a unicast manner from a source providing media to the sink. The sink may receive control information from the source and perform signal processing based on the control information. The sink may receive media/metadata (e.g., XR data or extended media data) from the source. The sink may include a 3rd Party External Application block, an Operator Application block, and/or a 5G Media Reception Function block. According to embodiments, the 3rd Party External Application block and the Operator Application block of the sink represent UE applications operating at the sink stage. The 3rd Party External Application block is an application operated by a third party present outside the 4G, 5G, and 6G networks, and may drive an API connection of the sink. The 3rd Party External Application block may receive information through the 4G, 5G, or 6G network, or through direct point-to-point communication. Therefore, the UE of the sink may receive an additional service through a native or downloaded installed application. The Operator Application block may manage an application (5G Media Player) associated with a media streaming driving environment including a media application. When the application is installed, the UE of the sink may start accessing the media service through the API using an application socket and transmit and receive related data information. The API allows data to be delivered to a particular end-system by configuring a session using the socket. The socket connection method may be delivered through a general TCP-based Internet connection. The sink may receive control/data information from a cloud edge, and may perform offloading for transmitting control/data information and the like to the cloud edge. Although not shown in the drawings, the sink may include an Offloading Management block. The offloading management according to the embodiments may control operations of the Operator Application block and/or the 3rd Party Application block to control the offloading of the sink.

According to embodiments, the 5G Media Reception block may receive operations related to offloading from the Offloading Management block, acquire media that may be received through the 4G, 5G, or 6G network, and process the media. According to embodiments, the 5G Media Reception Function block may include a general Media Access Client block, a DRM Client block, a media decoder, a Media Rendering Presentation block, an XR Rendering block, and an XR Media Processing block. These blocks are merely an example, and the names and/or operations thereof are not limited to the embodiments.

According to embodiments, the Media Access Client block may receive data, for example, a media segment, through at least one of the 4G, 5G, and 6G networks. According to embodiments, the Media Access Client block may de-format (or decapsulate) various media transmission formats such as DASH, CMAF, and HLS. The data output from the Media Access Client block may be processed and displayed according to each decoding characteristic. The DRM Client block may determine whether the received data is used. For example, the DRM Client block may perform a control operation to allow an authorized user to use the media information within the access range. The Media Decoding block is a general audio/video decoder and may decode audio/video data processed according to various standards (including video standards such as MPEG2, AVC, HEVC, and VVC, and audio standards such as MPEG 1 Layer 2 Audio, AC3, HE-AAC, E-AC-3, HE-AAC, and NGA) among the de-formatted data. The Media Rendering Presentation block may render media so as to be suitable for the reception device. The Media Rendering Presentation block may be included in the Media Decoding block. The XR Media Processing block and the XR Rendering block are configured to process XR data among the de-formatted data (or decapsulated data). The XR Media Processing block (e.g., the processor 911 described with reference to FIG. 2 or a processor for processing higher layer data) may use XR data received from the source or information (e.g., object information, position information, etc.) received from the Offloading Management block to process XR media. The XR Rendering block may render and display XR media data among the received media data. The XR Media Processing block and the XR Rendering block may process and render point cloud data processed according to a Video-Based Point Cloud Compression (V-PCC) or Geometry-Based Point Cloud Compression (G-PCC) scheme. The V-PCC or G-PCC scheme is described in detail below with reference to FIGS. 8 to 14. The XR Media Processing block and the XR Rendering block according to the embodiments may be configured as a single XR decoder.

The source represents a media server or a UE capable of providing media using at least one of the 4G, 5G, or 6G network and may perform the functions of Control Function and Server Function. The Server Function initiates and hosts 4G, 5G, and 6G media services. The 3rd Party Media Server represents various media servers operated by third parties present outside the 4G, 5G, and 6G networks, and may be a Network External Media Application Server. In general, the External Server operated by a third-party service may perform media production, encoding, formatting, and the like in places other than the 4G, 5G, and 6G networks in the same manner. The Control Function represents a network-based application function, and may include a sink and other media servers, as well a control-oriented information delivery function when performing media authentication. Thus, the Source may initiate a connection through API connection of an internal application using the Control Function and may establish a media session or request additional information. The Source may also exchange PCF information with other network functions through the Control Function. Through the Control Function, the Source may identify external network capabilities using the NEF and perform general monitoring and provisioning through the exposure process. Accordingly, the NEF may receive other network information and store the received information as structured data using a specific standardized interface. The stored information may be exposed/re-exposed to other networks and applications by the NEF, and the information exposed in various network environments may be collected and used for analysis. As shown in FIG. 6, when the service configuration connection is established, the API Control Plane is formed. When the session connection is established, tasks such as security (authentication, authorization, etc.) may be included and an environment allowing media to be transmitted is formed. If there are multiple 4G, 5G, and 6G media functions in the source, multiple APIs may be created or one API may be used to create a control plane. Similarly, an API may be created from a third-party media server, and the Media Control Function and the API of the UE may form a media user plane API. The source may generate and deliver media using various methods to perform the Downlink Media Service function, and may include all functions, from simply storing media to playing a media relaying role, to deliver media to the UE corresponding to the sink, which is the final destination. Modules or blocks within the sink and source according to embodiments may deliver and share information via the inter-connection link and inter-connection interface that are bidirectional.

The embodiments describe a UL structure and method for transmitting media content produced in real time in a 5GMS system to social media, users, servers, etc. Uplink is basically defined as creating media and delivering the same to the media server from the UE perspective, rather than as delivering media to the user in the form of distribution. Unlike the downlink system, the uplink system is configured in the form of direct content provision by individual users, and accordingly the system configuration method handled by the UE, use cases to utilize, and the system structure may be different from those for the downlink. The FLUS system consists of a source entity that produces media and a sink entity that consumes media, and delivers services such as voice, video, and text through 1:1 communication. Accordingly, techniques such as signaling, transport protocol, packet-loss handling, and adaptation may be applied, and the FLUS system may provide expectable media quality and flexibility. The FLUS source may be a single UE or multiple distributed UEs, a capture device, or the like. Since the network is assumed to be a 5G network, 3GPP IMS/MTSI services may be supported, and IMS services may be supported through the IMS control plane. Also, services may be supported in compliance with the MTSI service policy. If IMS/MTSI services are not supported, uplink services may be supported by various user plane instantiations through the Network Assistance function.

Figure 7:
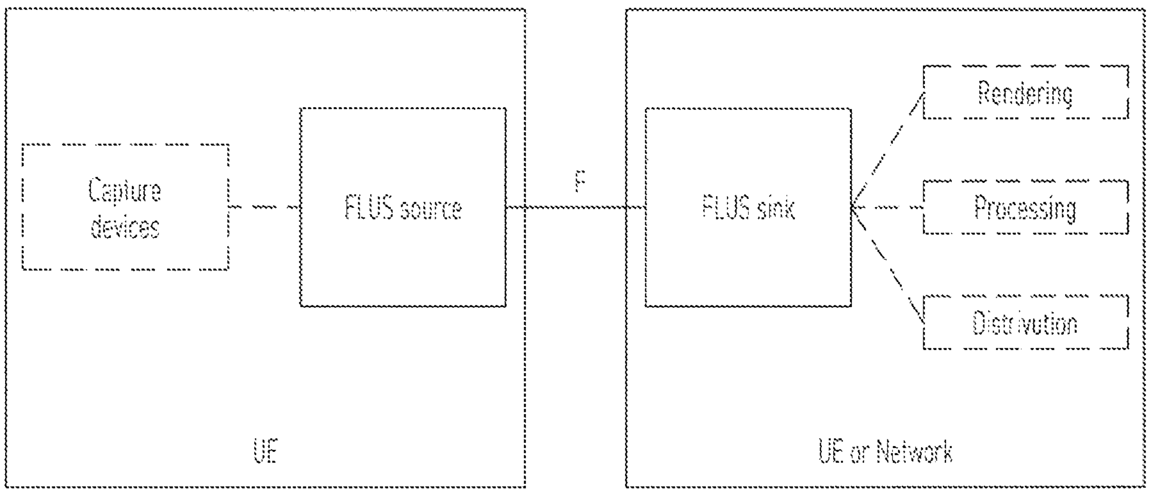
FIG. 7 illustrates an example of a FLUS structure for an uplink service.

FIG. 7 illustrates an example of a FLUS structure for an uplink service.

The FLUS structure may include a source and a sink as described with reference to FIG. 6. The source may correspond to a UE. The sink may correspond to a UE or a network. An Uplink may include a source and a sink according to the goal of generating and delivering media, where the source may be a UE that is a terminal device and the sink may be another UE or a network. The source may receive media content from one or more capture devices. The capture devices may or may not be connected to a part of the UE. If the sink to receive the media is present in the UE and not in the network, the Decoding and Rendering Functions are included in the UE and the received media shall be delivered to those functions. Conversely, if the sink corresponds to the network, the received media may be delivered to the Processing or Distribution Sub-Function. If the sink is positioned in the network, it may include the role of the Media Gateway Function or Application Function, depending on its role. The F link, shown in FIG. 9, serves to connect the source and the sink, and specifically enables the control and establishment of FLUS sessions through this link. Authentication/authorization between the source and the sink through the F link may also be included. More specifically, the F link may be divided into Media Source and Sink (F-U end-points), Control Source and Sink (F-C end-points), Remote Controller and Remote Control Target (F-RC end-points), and Assistance Sender and Receiver (F-A end-points). The source and the sink are distinguished by the Logical Functions. Therefore, the functions may be present in the same physical device, or may be separated and not present in the same device. Each function may also be separated into multiple physical devices and connected by different interfaces. A single FLUS source may have multiple F-A and F-RC points. Each point is independent of the FLUS sink and may be generated according to the offered service. As described earlier, the F link point may assume all F point-specifically present sub-functions and the security function of the link and may include the corresponding authentication process.

Figure 8:
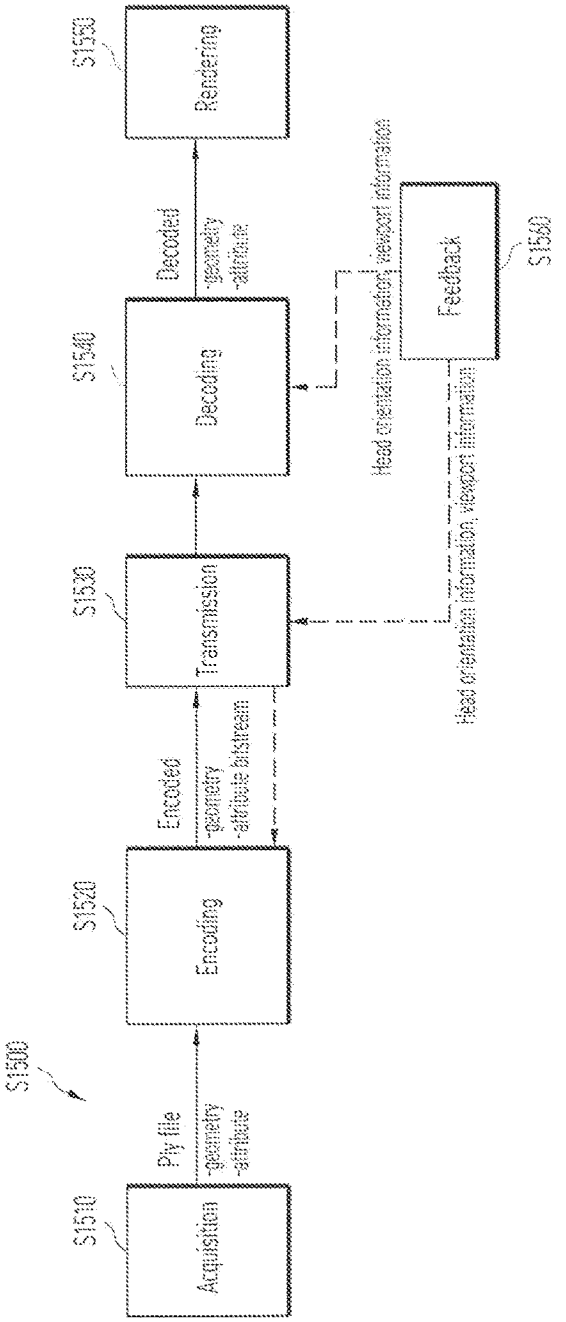
FIG. 8 illustrates a point cloud data processing system according to embodiments.

FIG. 8 illustrates a point cloud data processing system according to embodiments.

The point cloud processing system 1500 illustrated in FIG. 8 may include a transmission device (e.g., a BS or UE described with reference to FIGS. 1 to 7) that acquires, encodes, and transmits point cloud data, and a reception device (e.g., a UE described with reference to FIGS. 1 to 7) that receives and decodes video data to acquire point cloud data. As shown in FIG. 8, the point cloud data according to the embodiments may be acquired through a process of capturing, synthesizing, or generating the point cloud data. In the acquisition operation, 3D position (x, y, z)/attribute (color, reflectance, transparency, etc.) data (e.g., Polygon File format (PLY) (or the Stanford Triangle format) files, etc.) about the points may be generated. For videos having multiple frames, one or more files may be acquired. In the capture operation, metadata related to the point cloud data (e.g., metadata related to the capture) may be generated. A transmission device or encoder according to embodiments may encode the point cloud data using Geometry-based Point Cloud Compression (G-PCC) scheme, and output one or more video streams (S1520). G-PCC is a method of encoding point cloud data by dividing the data into two streams: a geometry (or geometry information) stream and an attribute (or attribute information) stream. The geometry stream may be generated by reconstructing and encoding the position information about points, while the attribute stream may be generated by reconstructing and encoding the attribute information (e.g., color, etc.) related to each point. The one or more output bitstreams, together with related metadata, may be encapsulated in the form of a file or the like (e.g., a file format such as ISOBMFF) and transmitted over a network or digital storage medium (S1530). In some embodiments, the point cloud-related metadata itself may be encapsulated in a file.

A device (UE) or processor (e.g., the processor 911 or processor 921 described with reference to FIG. 2, a higher layer processor, or the sink or XR Media Processing block included in the sink described with reference to FIG. 6) may decapsulate the received video data to acquire one or more bitstreams and related metadata, and decode the acquired bitstreams according to the G-PCC scheme to reconstruct the three-dimensional point cloud data (S1540). The renderer (e.g., the sink or the XR rendering block included in the sink described with reference to FIG. 6) may render the decoded point cloud data and provide the user with content adapted to the VR/AR/MR/service via a display (S1550). As shown in FIG. 8, the device or processor according to the embodiments may perform a feedback process of delivering various kinds of feedback information acquired during the rendering/display process to the transmission device, or to the decoding process (S1560). The feedback information may include head orientation information, and viewport information indicating the area the user is currently viewing. Since an interaction between the user and the service (or content) provider is performed in the feedback process, the devices according to embodiments may provide various services considering greater user convenience, and may provide a faster data processing speed or organize clearer video using the G-PCC scheme described above.

Figure 9:
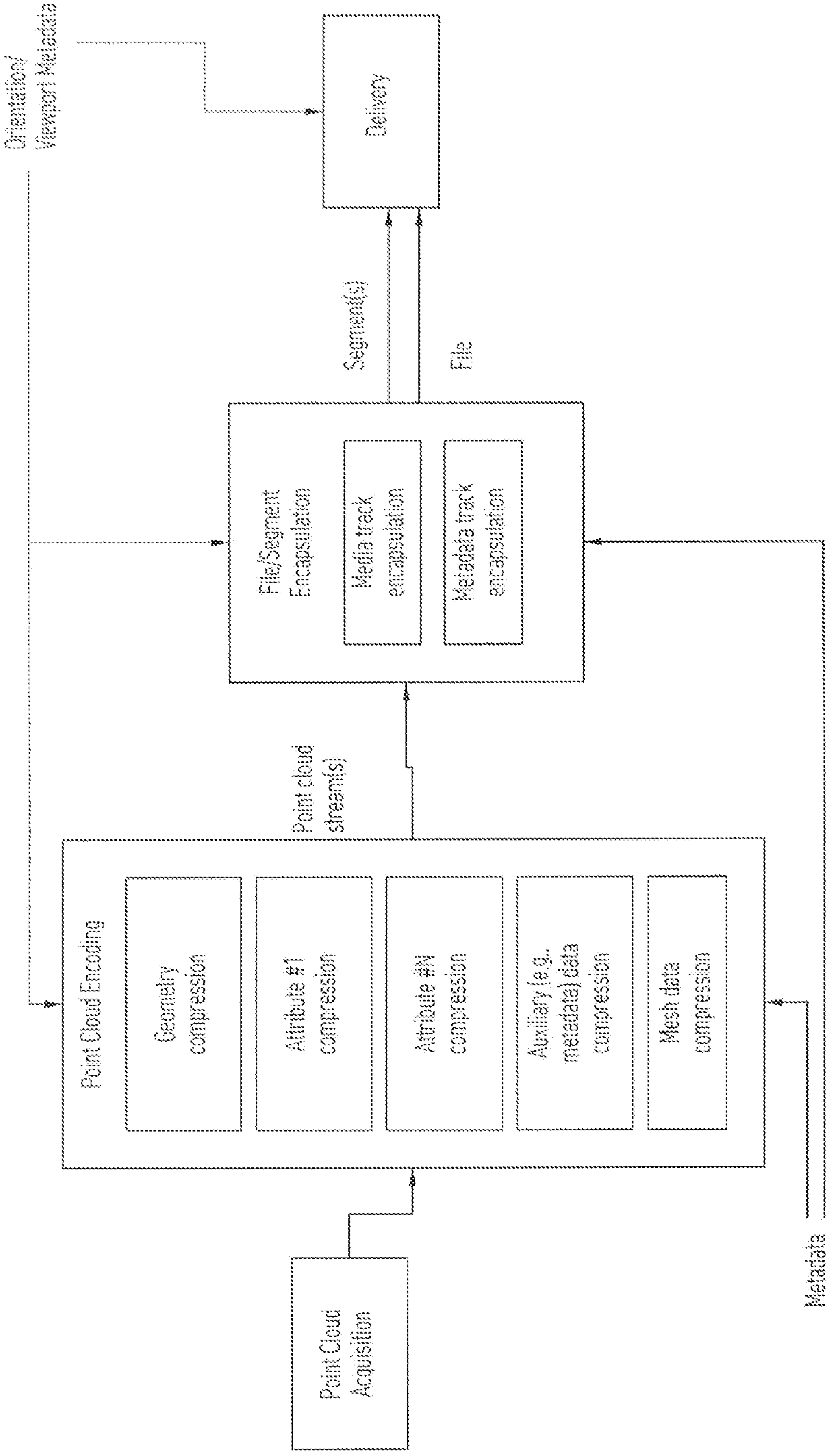
FIG. 9 illustrates an example of a point cloud data processing device according to embodiments.

FIG. 9 illustrates an example of a point cloud data processing device according to embodiments.

FIG. 9 illustrates a device performing point cloud data processing according to the G-PCC scheme. The point cloud data processing device illustrated in FIG. 9 may be included in or correspond to the UE described with reference to FIGS. 1 to 7 (e.g., the processor 911 or processor 921 described with reference to FIG. 2, a processor that processes higher layer data, or the sink or the XR Media Processing block included in the sink described with reference to FIG. 6) or a BS.

The point cloud data processing device according to the embodiments includes a point cloud acquirer (Point Cloud Acquisition), a point cloud encoder (Point Cloud Encoding), a file/segment encapsulator (File/Segment Encapsulation), and/or a deliverer (Delivery). Each element of the processing device may be a module/unit/component/hardware/software/processor, etc. The geometry, attributes, auxiliary data, mesh data, and the like of the point cloud may each be configured in separate streams or stored on different tracks in the file. Furthermore, they may be contained in separate segments.

The point cloud acquirer acquires a point cloud. For example, the point cloud data may be acquired through a process of capturing, synthesizing, or generating a point cloud through one or more cameras. By the acquisition operation, point cloud data including a 3D position (which may be represented by x, y, z position values, etc., hereinafter referred to as geometry) of each point and attributes (color, reflectance, transparency, etc.) of each point may be acquired and generated as, for example, a Polygon File format (PLY) (or Stanford Triangle format) file. In the case of point cloud data having multiple frames, one or more files may be acquired. In the process, metadata related to the point cloud (e.g., metadata related to the capture, etc.) may be generated.

The point cloud encoder may perform a G-PCC procedure, which includes prediction, transformation, quantization, and entropy coding, and output the encoded data (encoded video/image information) in the form of a bitstream. The point cloud encoder may divide the point cloud data into geometry (or geometry information) and attributes (attribute information) to be encoded. The encoded geometry information and attribute information may be output as bitstreams. The output bitstreams may be multiplexed into a single bitstream. The point cloud encoder may receive metadata. The metadata represents metadata related to the content for the point cloud. For example, there may be initial viewing orientation metadata. The metadata indicates whether the point cloud data represents the front or the rear. The point cloud encoder may receive orientation information and/or viewport information. The point cloud encoder may perform encoding based on the metadata, orientation information, and/or viewport information. The bitstream output from the point cloud encoder may contain point cloud related metadata. In some embodiments, the point cloud encoder may perform geometry compression, attribute compression, auxiliary data compression, and mesh data compression. In the geometry compression, geometry information about the point cloud data is encoded. The geometry (or geometry information) represents points (or the position of each point) in three-dimensional space. In the attribute compression, the attributes of the point cloud data are encoded. The attribute (or attribute information) represents a property (e.g., color or reflectance) of each point. In the attribute compression, one or more attributes for one or more points may be processed. In the auxiliary data compression, auxiliary data related to the point cloud is encoded. The auxiliary data represents metadata about the point cloud. In the mesh data compression, mesh data is encoded. The mesh data represents information about connection between point clouds. The mesh data may include mesh data representing a triangular shape.

The point cloud encoder encodes geometry, attributes, auxiliary data, and mesh data about the points, which are information needed to render the points. The point cloud encoder may encode the geometry, attributes, auxiliary data, and mesh data and deliver the same by a single bitstream. Alternatively, the point cloud encoder may encode the geometry, attributes, auxiliary data, and mesh data, respectively, and output one or more bitstreams carrying the encoded data, or output the encoded data (e.g., a geometry bitstream, an attribute bitstream, etc.), respectively. The operations of the point cloud encoder may be performed in parallel.

The file/segment encapsulator may perform media track encapsulation and/or metadata track encapsulation. The file/segment encapsulator creates tracks for delivering the encoded geometry (geometry information), encoded attributes, encoded auxiliary data, and encoded mesh data in a file format. A bitstream containing the encoded geometry, a bitstream containing the encoded attributes, a bitstream containing the encoded auxiliary data, and a bitstream containing the encoded mesh data may be included in one or more tracks. The file/segment encapsulator encapsulates the geometry, attributes, auxiliary data, and mesh data into one or more media tracks. In addition, the file/segment encapsulator adds the metadata in a media track or encapsulates the same into a separate metadata track. The file/segment encapsulator encapsulates the point cloud stream(s) in the form of a file and/or segment. When the point cloud stream(s) are encapsulated and delivered in the form of segment(s), they are delivered in DASH format. When the point cloud stream(s) are encapsulated in the form of a file, the file/segment encapsulator delivers the file.

The deliverer may deliver the point cloud bitstream(s) or a file/segment containing the bitstream(s) to the receiver of the reception device over a digital storage medium or network. Processing according to a transport protocol may be performed for transmission. Once processed for transmission, the data may be delivered over a broadcast network and/or broadband. The data may be delivered to the receiving side in an on-demand manner. The digital storage medium may include various storage media such as USB, SD, CD, DVD, Blu-ray, HDD, and SSD. The deliverer may include an element for generating a media file in a predetermined file format and may include an element for transmission over a broadcast/communication network. The deliverer receives orientation information and/or viewport information from the receiver. The deliverer may deliver the acquired orientation information and/or viewport information (or user-selected information) to the file/segment encapsulator and/or the point cloud encoder. Based on the orientation information and/or the viewport information, the point cloud encoder may encode all the point cloud data or may encode the point cloud data indicated by the orientation information and/or the viewport information. Based on the orientation information and/or the viewport information, the file/segment encapsulator may encapsulate all the point cloud data or may encapsulate the point cloud data indicated by the orientation information and/or the viewport information. Based on the orientation information and/or the viewport information, the deliverer may deliver all the point cloud data or may deliver the point cloud data indicated by the orientation information and/or the viewport information.

FIG. 10 illustrates an example of a point cloud data processing device according to embodiments.

FIG. 10 illustrates an example of a device configured to receive and process point cloud data processed according to the G-PCC scheme. The device of FIG. 10 may process the data using a method corresponding to the method described with reference to FIG. 9. The point cloud data processing device illustrated in FIG. 10 may correspond to or be included in the UE described with reference to FIGS. 1 to 10 (e.g., the processor 911 or processor 921 described with reference to FIG. 2, or the sink or the XR Media Processing block included in the sink described with reference to FIG. 8).

The point cloud data processing device according to the embodiments includes a delivery client, a sensing/tracking part, a file/segment decapsulator (File/Segment Decapsulation), a point cloud decoder (Point Cloud Decoding), and/or a point cloud renderer (Point Cloud Rendering), and a display. Each element of the reception device may be a module/unit/component/hardware/software/processor, or the like.

The delivery client may receive point cloud data, a point cloud bitstream, or a file/segment including the bitstream transmitted by the point cloud data processing device described with reference to FIG. 9. The device of FIG. 10 may receive the point cloud data over a broadcast network or a broadband depending on the channel used for the transmission.

Alternatively, it may receive the point cloud video data through a digital storage medium. The device of FIG. 10 may decode the received data and render the same according to the user viewport or the like. The device of FIG. 10 may include a reception processor (e.g., the processor 911 of FIG. 2, etc.) configured to process the received point cloud data according to a transmission protocol. That is, the reception processor may perform a reverse process to the operation of the transmission processor according to the processing performed for transmission on the transmitting side. The reception processor may deliver the acquired point cloud data to the decapsulation processor and the acquired point cloud related metadata to the metadata parser.

The sensing/tracking part acquires orientation information and/or viewport information. The sensing/tracking part may deliver the acquired orientation information and/or viewport information to the delivery client, the file/segment decapsulator, and the point cloud decoder.

Based on the orientation information and/or the viewport information, the delivery client may receive all point cloud data or the point cloud data indicated by the orientation information and/or the viewport information. Based on the orientation information and/or the viewport information, the file/segment decapsulator may decapsulate all the point cloud data or the point cloud data indicated by the orientation information and/or the viewport information. Based on the orientation information and/or the viewport information, the point cloud decoder may decode all the point cloud data or the point cloud data indicated by the orientation information and/or the viewport information.

The file/segment decapsulator (File/Segment Decapsulation) performs media track decapsulation and/or metadata track decapsulation. The decapsulation processor (file/segment decapsulation) may decapsulate the point cloud data in a file format received from the reception processor. The decapsulation processor (file/segment decapsulation) may decapsulate a file or segments according to ISOBMFF or the like and acquire a point cloud bitstream or point cloud-related metadata (or a separate metadata bitstream). The acquired point cloud bitstream may be delivered to the point cloud decoder, and the acquired point cloud-related metadata (or metadata bitstream) may be delivered to the metadata processor. The point cloud bitstream may contain the metadata (or metadata bitstream). The metadata processor may be included in the point cloud video decoder or may be configured as a separate component/module. The point cloud-related metadata acquired by the decapsulation processor may be in the form of a box or track in a file format. The decapsulation processor may receive metadata necessary for decapsulation from the metadata processor, when necessary. The point cloud-related metadata may be delivered to the point cloud decoder and used in a point cloud decoding procedure, or may be delivered to the renderer and used in a point cloud rendering procedure.

The point cloud decoder (Point Cloud Decoding) performs geometry decompression, attribute decompression, auxiliary data decompression, and/or mesh data decompression. The point cloud decoder may receive a bitstream and perform an operation corresponding to the operation of the point cloud encoder to decode the data. In this case, the point cloud decoder may decode the point cloud data by dividing the same into geometry and attributes, as will be described later. For example, the point cloud decoder may reconstruct (decode) geometry from the geometry bitstream included in the input bitstream, and reconstruct attribute values based on the attribute bitstream included in the input bitstream and the reconstructed geometry. The mesh may be reconstructed (decoded) based on the mesh bitstream included in the input bitstream and the reconstructed geometry. The point cloud may be reconstructed by restoring the position of each 3D point and the attribute information about each point based on the position information according to the reconstructed geometry and a (color) texture attribute according to the decoded attribute value. Operations of the point cloud decoder may be performed in parallel.

In the geometry decompression, geometry data is decoded from the point cloud stream(s). In the attribute decompression, attribute data is decoded from the point cloud stream(s). In the auxiliary data decompression, auxiliary data is decoded from the point cloud stream(s). In the mesh data decompression, mesh data is decoded from the point cloud stream(s).

The point cloud renderer (Point Cloud Rendering) reconstructs the position of each point in the point cloud and the attributes of the point based on the decoded geometry, attributes, auxiliary data, and mesh data, and renders the point cloud data. The point cloud renderer generates and renders mesh (connection) data between point clouds based on the reconstructed geometry, reconstructed attributes, reconstructed auxiliary data, and/or reconstructed mesh data. The point cloud renderer receives metadata from the file/segment encapsulator and/or the point cloud decoder. The point cloud renderer may render the point cloud data based on the metadata according to the orientation or viewport. Although not shown in FIG. 10, the device of FIG. 10 may include a display. The display may display the rendered results.

FIG. 11 illustrates an example of a point cloud data processing device according to embodiments.

FIG. 11 illustrates a device performing point cloud data processing according to the V-PCC (Video based Point Cloud Compression) scheme. V-PCC is a method of compressing point cloud data based on 2D video codec of HEVC, VVC, etc. The point cloud data processing device illustrated in FIG. 11 may be included in or correspond to the UE described with reference to FIGS. 1 to 8 (e.g., the processor 911 or processor 921 described with reference to FIG. 2, or the sink or the XR Media Processing block included in the sink described with reference to FIG. 6) or a BS.

The point cloud data processing device according to the embodiments may include a point cloud acquirer (Point Cloud Acquisition), a patch generator (Patch Generation), a geometry image generator (Geometry Image Generation), an attribute image generator (Attribute Image Generation), an occupancy map generator (Occupancy Map Generation), an auxiliary data generator (Auxiliary Data Generation), a mesh data generator (Mesh Data Generation), a video encoder (Video Encoding), an image encoder (Image Encoding), a file/segment encapsulator (File/Segment Encapsulation), and a deliverer (Delivery). According to embodiments, the patch generation, geometry image generation, attribute image generation, occupancy map generation, auxiliary data generation, and mesh data generation may be referred to as point cloud preprocessing, pre-processor, or controller. The video encoder includes geometry video compression, attribute video compression, occupancy map compression, auxiliary data compression, and mesh data compression. The image encoder includes geometry video compression, attribute video compression, occupancy map compression, auxiliary data compression, and mesh data compression. The file/segment encapsulator includes video track encapsulation, metadata track encapsulation, and image encapsulation. Each element of the transmission device may be a module/unit/component/hardware/software/processor, or the like.

The geometry, attributes, auxiliary data, mesh data, and the like of the point cloud may each be configured in separate streams or stored on different tracks in the file. Furthermore, they may be contained in separate segments.

The point cloud acquirer (Point Cloud Acquisition) acquires a point cloud. For example, the point cloud data may be acquired through a process of capturing, synthesizing, or generating a point cloud through one or more cameras. By the acquisition operation, point cloud data including a 3D position (which may be represented by x, y, z position values, etc., and be hereinafter referred to as geometry) of each point and attributes (color, reflectance, transparency, etc.) of each point may be acquired, and, for example, a Polygon File format (PLY) (or Stanford Triangle format) file containing the same may be generated. In the case of point cloud data having multiple frames, one or more files may be acquired. In this process, metadata related to the point cloud (e.g., metadata related to the capture, etc.) may be generated.

The patch generation, or patch generator, generates patches from the point cloud data. The patch generator generates one or more pictures/frames from the point cloud data or point cloud video. A picture/frame may be a unit that typically represents a single image at a particular time. When dividing the points constituting a point cloud video into one or more patches (a set of points constituting the point cloud, where points belonging to the same patch are adjacent to each other in three-dimensional space and are mapped in the same direction among the six-face bounding box planes during the mapping to a 2D image) and mapping the same to the 2-D plane, an occupancy map picture/frame may be generated, which is a binary map that indicates whether data is present at a position in the 2D plane with a value of 0 or 1. Also, a geometry picture/frame, which is a depth map type picture/frame that represents the position information (geometry) about each point constituting the point cloud video on a patch-by-patch basis, may be generated. A texture picture/frame, which is a picture/frame that represents the color information about each point constituting the point cloud video on a patch-by-patch basis, may be generated. In this process, metadata needed to reconstruct the point cloud from the individual patches may be generated. The metadata may include information about the patches, such as the position of each patch in the 2D/3D space and the size thereof. These pictures/frames may be generated chronologically in succession to configure a video stream or a metadata stream.

Additionally, patches may be used for 2D image mapping. For example, the point cloud data may be projected onto each face of a cube. After the patch generation, a geometry image, one or more attribute images, an occupancy map, auxiliary data, and/or mesh data may be generated based on the generated patches.

The geometry image generation, attribute image generation, occupancy map generation, auxiliary data generation, and/or mesh data generation may be performed by the pre-processor or controller.

In the geometry image generation, a geometry image is generated based on the output of the patch generation. A geometry represents a point in 3D space. Based on the patches, a geometry image is generated using the occupancy map, auxiliary data (patch data), and/or mesh data, which contain information about 2D image packing of the patches. The geometry image is related to information such as a depth (e.g., near, far) of the generated patches after the patch generation.

In the attribute image generation, an attribute image is generated. For example, an attribute may represent a texture. The texture may be a color value matched to each point. In some embodiments, an image of multiple (N) attributes (attributes such as color and reflectance) including the texture may be generated. The plurality of attributes may include material (information about the material) and reflectance. In addition, according to embodiments, the attributes may further include information such as the color that may vary depending on the view and light even for the same texture.

In the occupancy map generation, an occupancy map is generated from the patches. The occupancy map includes information indicating the presence or absence of data in a pixel of a corresponding geometry or attribute image.

In the auxiliary data generation, auxiliary data that includes information about a patch is generated. In other words, the auxiliary data represents metadata about the patch of a point cloud object. For example, it may indicate information such as a normal vector for the patch.

Specifically, according to embodiments, the auxiliary data may include information necessary to reconstruct the point cloud from the patches (e.g., information about the positions, size, and the like of the patches in 2D/3D space, projection plane (normal) identification information, patch mapping information, etc.).

In the mesh data generation, mesh data is generated from the patches. Mesh represents the information about connection between neighboring points. For example, it may represent triangular data. For example, in some embodiments, the mesh data represents connectivity between points.

The point cloud pre-processor or controller generates metadata related to the patch generation, geometry image generation, attribute image generation, occupancy map generation, auxiliary data generation, and mesh data generation.

The point cloud transmission device performs video encoding and/or image encoding in response to the output generated by the pre-processor. The point cloud transmission device may generate point cloud video data as well as point cloud image data. In some embodiments, the point cloud data may include only video data, only image data, and/or both video data and image data.

The video encoder performs geometry video compression, attribute video compression, occupancy map compression, auxiliary data compression, and/or mesh data compression. The video encoder generates video stream(s) containing the respective encoded video data.

Specifically, the geometry video compression encodes point cloud geometry video data. The attribute video compression encodes the point cloud attribute video data. The auxiliary data compression encodes auxiliary data related to the point cloud video data. The mesh data compression encodes mesh data of the point cloud video data. The operations of the point cloud video encoder may be performed in parallel.

The image encoder performs geometry image compression, attribute image compression, occupancy map compression, auxiliary data compression, and/or mesh data compression. The image encoder generates image(s) containing the respective encoded image data.

Specifically, the geometry image compression encodes point cloud geometry image data. The attribute image compression encodes the attribute image data of the point cloud. The auxiliary data compression encodes the auxiliary data related to the point cloud image data. The mesh data compression encodes the mesh data related to the point cloud image data. The operations of the point cloud image encoder may be performed in parallel.

The video encoder and/or the image encoder may receive metadata from the pre-processor. The video encoder and/or the image encoder may perform each encoding process based on the metadata.

The file/segment encapsulator encapsulates the video stream(s) and/or image(s) in the form of a file and/or segment. The file/segment encapsulator may perform video track encapsulation, metadata track encapsulation, and/or image encapsulation.

In the video track encapsulation, one or more video streams may be encapsulated into one or more tracks.

In the metadata track encapsulation, metadata related to the video stream and/or image may be encapsulated into the one or more tracks. The metadata may include data related to the content of the point cloud data. For example, the metadata may include initial viewing orientation metadata. According to embodiments, the metadata may be encapsulated into a metadata track, or may be co-encapsulated in a video track or image track.

In the image encapsulation, one or more images may be encapsulated into one or more tracks or items.

For example, according to embodiments, when four video streams and two images are input to the encapsulator, the four video streams and two images may be encapsulated in a single file.

The file/segment encapsulator may receive metadata from the pre-processor. The file/segment encapsulator may perform encapsulation based on the metadata.

The files and/or segments generated by the file/segment encapsulation are transmitted by the point cloud transmission device or transmitter. For example, the segment(s) may be delivered based on a DASH-based protocol.

The deliverer may deliver a point cloud bitstream or a file/segment containing the bitstream to the receiver of the reception device over a digital storage medium or network. Processing according to a transport protocol may be performed for transmission. Once processed for transmission, the data may be delivered over a broadcast network and/or broadband. The data may be delivered to the receiving side in an on-demand manner. The digital storage medium may include various storage media such as USB, SD, CD, DVD, Blu-ray, HDD, and SSD. The deliverer may include an element for generating a media file in a predetermined file format and may include an element for transmission over a broadcast/communication network. The deliverer receives orientation information and/or viewport information from the receiver. The deliverer may deliver the acquired orientation information and/or viewport information (or user-selected information) to the pre-processor, the video encoder, the image encoder, the file/segment encapsulator, and/or the point cloud encoder. Based on the orientation information and/or the viewport information, the point cloud encoder may encode all the point cloud data or may encode the point cloud data indicated by the orientation information and/or the viewport information. Based on the orientation information and/or the viewport information, the file/segment encapsulator may encapsulate all the point cloud data or may encapsulate the point cloud data indicated by the orientation information and/or the viewport information. Based on the orientation information and/or the viewport information, the deliverer may deliver all the point cloud data or may deliver the point cloud data indicated by the orientation information and/or the viewport information.

For example, the pre-processor may perform the above-described operations on all the point cloud data or on the point cloud data indicated by the orientation information and/or the viewport information. The video encoder and/or the image encoder may perform the above-described operations on all the point cloud data or on the point cloud data indicated by the orientation information and/or the viewport information. The file/segment encapsulator may perform the above-described operations on all the point cloud data or on the point cloud data indicated by the orientation information and/or the viewport information. The transmitter may perform the above-described operations on all the point cloud data or on the point cloud data indicated by the orientation information and/or the viewport information.

FIG. 12 illustrates an example of a point cloud data processing device according to embodiments.

FIG. 12 illustrates an example of a device that receives and processes point cloud data processed according to the V-PCC scheme. The point cloud data processing device illustrated in FIG. 12 may process the data using a method corresponding to the method described with reference to FIG. 11. The point cloud data processing device illustrated in FIG. 12 may correspond to or be included in the UE described with reference to FIGS. 1 to 8 (e.g., the processor 911 or processor 921 described with reference to FIG. 2, a processor that processes higher layer data, or the sink or the XR Media Processing block included in the sink described with reference to FIG. 6).

The point cloud data processing device according to the embodiments includes a delivery client, a sensing/tracking part, a file/segment decapsulator (File/Segment decapsulation), a video decoder (Video Decoding), an image decoder (Image decoding), a point cloud processing and/or point cloud rendering part, and a display. The video decoder includes geometry video decompression, attribute video decompression, occupancy map decompression, auxiliary data decompression, and/or mesh data decompression. The image decoder includes geometry image decompression, attribute image decompression, occupancy map decompression, auxiliary data decompression, and/or mesh data decompression. The point cloud processing includes geometry reconstruction and attribute reconstruction.

Figure 13:
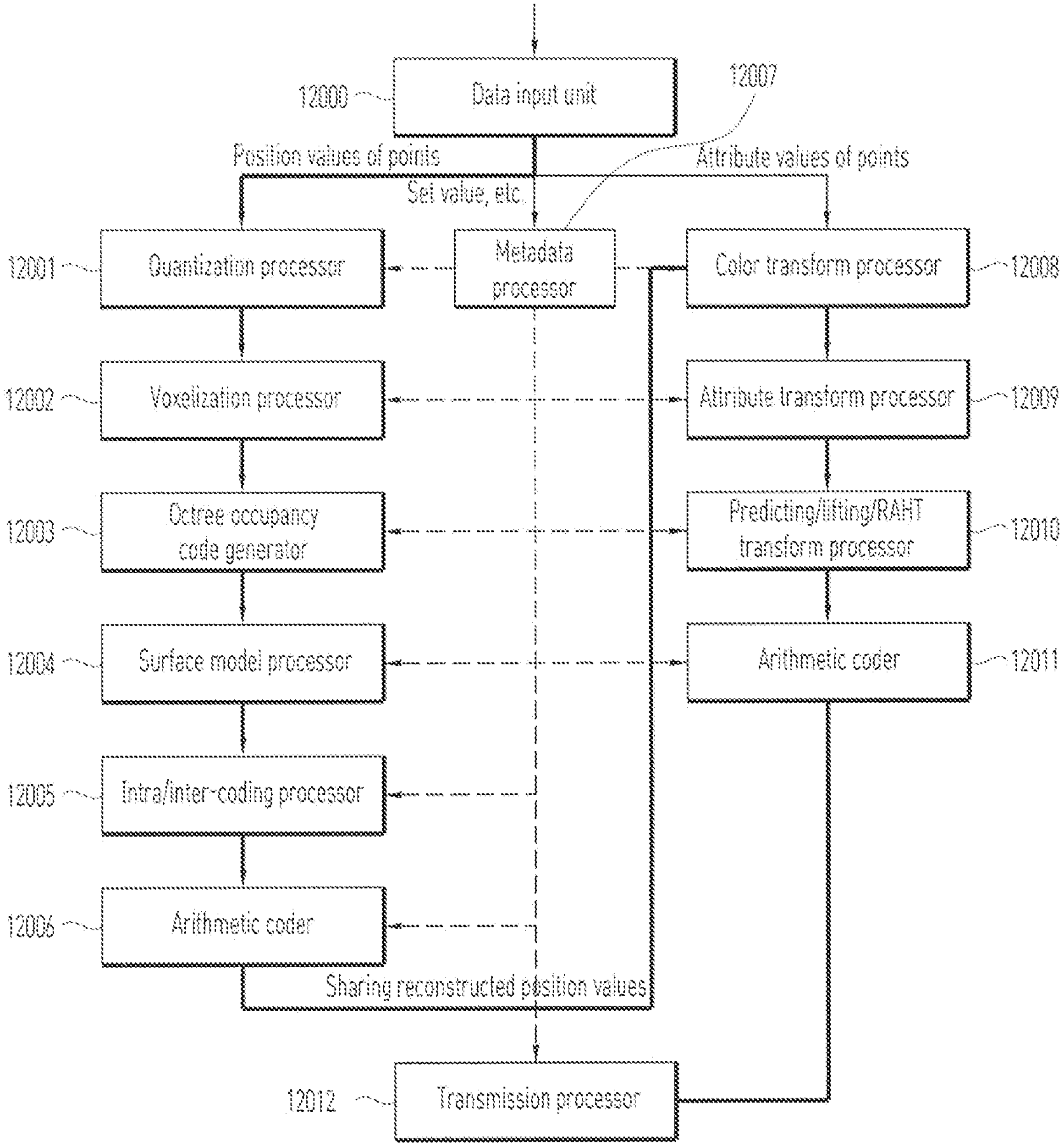
FIG. 13 illustrates an example of a point cloud data processing device according to embodiments.

The delivery client may receive point cloud data, a point cloud bitstream, or a file/segment containing the bitstream transmitted by the point cloud data processing device of FIG. 13. Depending on the channel for the transmission, the device of FIG. 14 may receive the point cloud data over a broadcast network or a broadband. Alternatively, it may receive the point cloud video data over a digital storage medium. The device of FIG. 14 may decode the received data and render the same according to a user's viewport or the like. Although not shown in the figure, the device of FIG. 14 may include a reception processor (e.g., processor 911 of FIG. 2, etc.) not shown. The reception processor may perform processing on the received point cloud data according to a transmission protocol. The reception processor may perform a reverse process to the above-described operation of the transmission processor according to the processing performed for transmission on the transmitting side. The reception processor may deliver the acquired point cloud data to the decapsulation processor and the acquired point cloud related metadata to the metadata parser.

The sensing/tracking part acquires orientation information and/or viewport information. The sensing/tracking part may deliver the acquired orientation information and/or viewport information to the delivery client, the file/segment decapsulator, and the point cloud decoder.

Based on the orientation information and/or the viewport information, the delivery client may receive all point cloud data or the point cloud data indicated by the orientation information and/or the viewport information. Based on the orientation information and/or the viewport information, the file/segment decapsulator may decapsulate all the point cloud data or the point cloud data indicated by the orientation information and/or the viewport information. Based on the orientation information and/or the viewport information, the point cloud decoder (the video decoder and/or the image decoder) may decode all the point cloud data or the point cloud data indicated by the orientation information and/or the viewport information. The point cloud processor may process all the point cloud data or the point cloud data indicated by the orientation information and/or the viewport information.

The file/segment decapsulator (File/Segment Decapsulation) performs video track decapsulation, metadata track decapsulation, and/or image decapsulation. The decapsulation processor (file/segment decapsulation) may decapsulate the point cloud data in a file format received from the reception processor. The decapsulation processor (file/segment decapsulation) may decapsulate a file or segments according to ISOBMFF or the like and acquire a point cloud bitstream or point cloud-related metadata (or a separate metadata bitstream). The acquired point cloud bitstream may be delivered to the point cloud decoder, and the acquired point cloud-related metadata (or metadata bitstream) may be delivered to the metadata processor. The point cloud bitstream may contain the metadata (or metadata bitstream). The metadata processor may be included in the point cloud video decoder or may be configured as a separate component/module. The point cloud-related metadata acquired by the decapsulation processor may be in the form of a box or track in a file format. The decapsulation processor may receive metadata necessary for decapsulation from the metadata processor, when necessary. The point cloud-related metadata may be delivered to the point cloud decoder and used in a point cloud decoding procedure, or may be delivered to the renderer and used in a point cloud rendering procedure. The file/segment decapsulator may generate metadata related to the point cloud data.

In the video track decapsulation, video tracks contained in files and/or segments are decapsulated. Video stream(s) containing geometry video, attribute video, an occupancy map, auxiliary data, and/or mesh data are decapsulated.

In the metadata track decapsulation, a bitstream containing metadata and/or auxiliary data related to the point cloud data is decapsulated.

In the image decapsulation, image(s) including a geometry image, an attribute image, an occupancy map, auxiliary data, and/or mesh data are decapsulated.

The video decoder performs geometry video decompression, attribute video decompression, occupancy map decompression, auxiliary data decompression, and/or mesh data decompression. The video decoder decodes the geometry video, attribute video, auxiliary data, and/or mesh data in response to the process performed by the video encoder of the point cloud transmission device according to embodiments.

The image decoder performs geometry image decompression, attribute image decompression, occupancy map decompression, auxiliary data decompression, and/or mesh data decompression. The image decoder decodes the geometry image, the attribute image, the auxiliary data, and/or the mesh data in response to the process performed by the image encoder of the point cloud transmission device according to embodiments.

The video decoder and/or the image decoder may generate metadata related to the video data and/or the image data.

The point cloud processor (Point Cloud Processing) may perform geometry reconstruction and/or attribute reconstruction.

In the geometry reconstruction, a geometry video and/or a geometry image is reconstructed based on the occupancy map, auxiliary data, and/or mesh data from the decoded video data and/or the decoded image data.

In the attribute reconstruction, the attribute video and/or attribute image is reconstructed based on the occupancy map, the auxiliary data, and/or the mesh data from the decoded attribute video and/or the decoded attribute image. According to embodiments, for example, the attribute may be a texture. In some embodiments, the attribute may represent a plurality of pieces of attribute information. When there are multiple attributes, the point cloud processor performs multiple attribute reconstructions.

The point cloud processor may receive metadata from the video decoder, the image decoder, and/or the file/segment decapsulator, and process the point cloud based on the metadata.

The point cloud renderer (Point Cloud Rendering) renders the reconstructed point cloud. The point cloud renderer may receive metadata from the video decoder, the image decoder, and/or the file/segment decapsulator, and render the point cloud based on the metadata. Although not shown in FIG. 12, the device of FIG. 12 may include a display. The display may display the rendered results.

FIG. 13 illustrates an example of a point cloud data processing device according to embodiments.

FIG. 13 illustrates an example of a device that performs point cloud data processing according to the G-PCC scheme described with reference to FIG. 9. The point cloud data processing device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may correspond to the point cloud acquirer 10001 of FIG. 1 according to embodiments.

The quantization processor 12001 quantizes the geometry of the point cloud data, for example, position value information about the points.

The voxelization processor 12002 voxelizes the position value information about the quantized points.

The octree occupancy code generator 12003 may represent the voxelized position value information about the points as an octree based on the octree occupancy code.

The surface model processor 12004 may process an octree representation for the position value information about the points in the point cloud based on a surface model method.

The intra/inter-coding processor 12005 may intra/inter-code the point cloud data.

The arithmetic coder 12006 may encode the point cloud data based on an arithmetic coding method.

The metadata processor 12007 according to the embodiments processes metadata about the point cloud data, for example, a set value, and provides the same to a necessary process such as a geometry encoding process and/or an attribute encoding process. In addition, the metadata processor 12007 according to the embodiments may generate and/or process signaling information related to the geometry encoding and/or the attribute encoding. The signaling information may be encoded separately from the geometry encoding and/or the attribute encoding. The signaling information may be interleaved.

The color transform processor 12008 may transform the color of the point cloud data based on attributes of the point cloud data, for example, attribute values and/or reconstructed position values of the points.

According to embodiments, the attribute transform processor 12009 may transform the attribute values of the point cloud data.

The prediction/lifting/RAHT transform processor 12010 may perform attribute coding on the point cloud data based on a combination of prediction, lifting, and/or RAHT.

The arithmetic coder 12011 may encode the point cloud data based on the arithmetic coding.

The transmission processor 12012 according to the embodiments may transmit each bitstream containing encoded geometry information and/or encoded attribute information or metadata, or transmit one bitstream configured with the encoded geometry information and/or the encoded attribute information and the metadata. When the encoded geometry information and/or the encoded attribute information and the metadata according to the embodiments are configured in one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10. The TPS according to the embodiments may include information about each tile (e.g., coordinate information and height/size information about a bounding box) for one or more tiles. The geometry bitstream may contain a header and a payload. The header of the geometry bitstream according to the embodiments may contain a parameter set identifier (geom_geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the process for the position values of the points and the process for the attribute values of the points may share data/information with each other to perform each operation.

Figure 14:
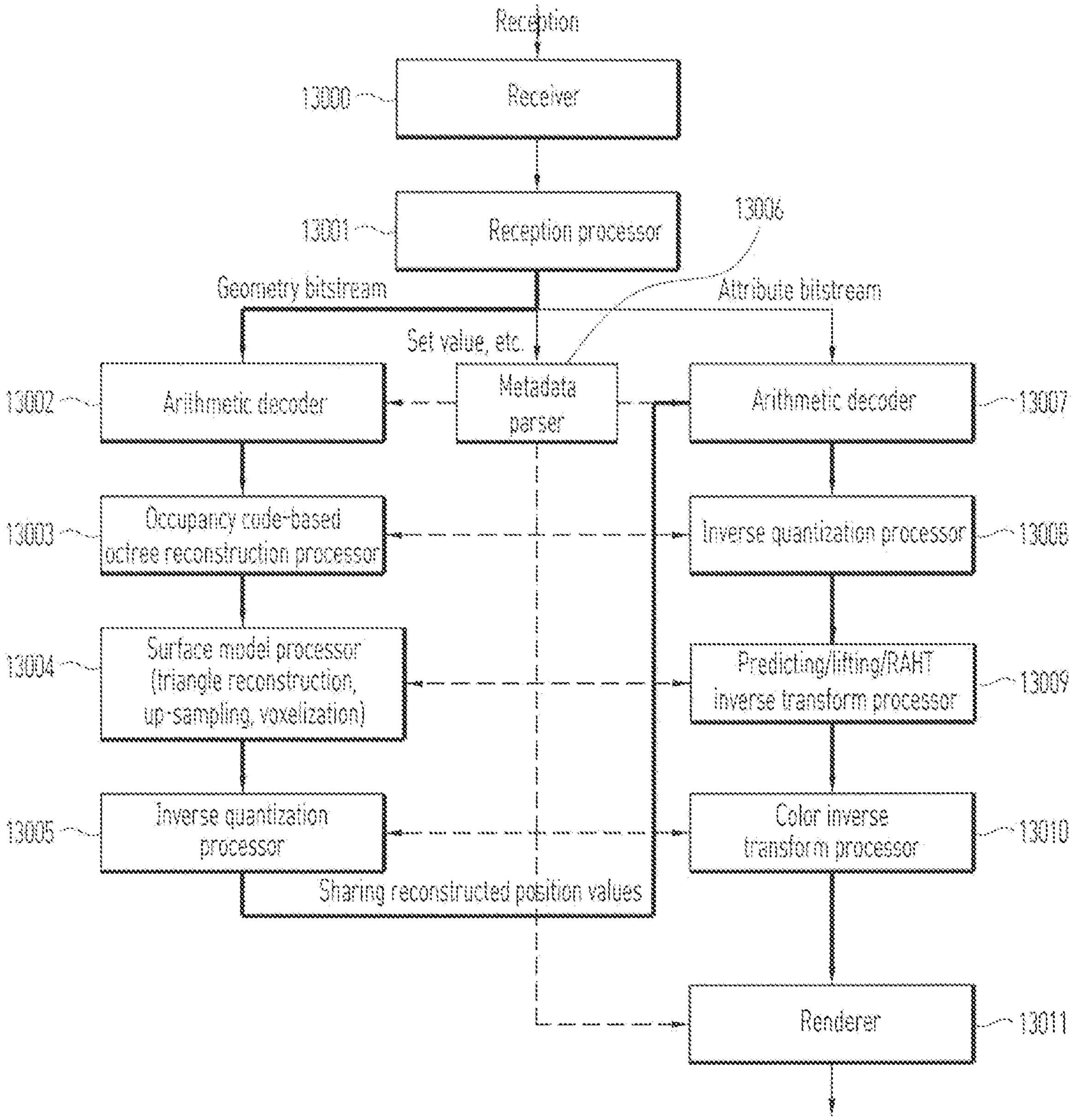
FIG. 14 illustrates an example of a point cloud data processing device according to embodiments.

FIG. 14 illustrates an example of a point cloud data processing device according to embodiments.

FIG. 14 illustrates an example of a device that performs point cloud data processing according to the G-PCC scheme described with reference to FIG. 10. The point cloud data processing device shown in FIG. 14 may perform the reverse process to the operation of the point cloud data processing device described with reference to FIG. 13.

The point cloud data processing device according to the embodiment may include a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011.

The receiver 13000 receives point cloud data. The reception processor 13001 may acquire a geometry bitstream and/or an attribute bitstream included in the received point cloud data, metadata including signaling information, and the like.

The arithmetic decoder 13002 according to the embodiments may decode the geometry bitstream based on an arithmetic method.

The occupancy code-based octree reconstruction processor 13003 may reconstruct an octree from the decoded geometry based on the Occupancy code.

The surface model processor (triangle reconstruction, up-sampling, voxelization) 13004 may perform triangle reconstruction, up-sampling, voxelization, and/or a combination thereof on the point cloud data based on a surface model method.

The inverse quantization processor 13005 may inverse quantize the point cloud data.

The metadata parser 13006 may parse metadata contained in the received point cloud data, for example, a set value. The metadata parser 13006 may pass the metadata to a geometry decoding process and/or an attribute decoding process. Each process according to the embodiments may be performed based on necessary metadata.

The arithmetic decoder 13007 may decode the attribute bitstream of the point cloud data based on the arithmetic method based on the reconstructed position value.

The inverse quantization processor 13008 may inverse quantize the point cloud data.

The prediction/lifting/RAHT inverse transform processor 13009 may process the point cloud data based on a prediction/lifting/RAHT method and/or a combination thereof.

The color inverse transform processor 13010 may inversely transform the color value of the point cloud data. The renderer 13011 may render the point cloud data.

Figure 15:
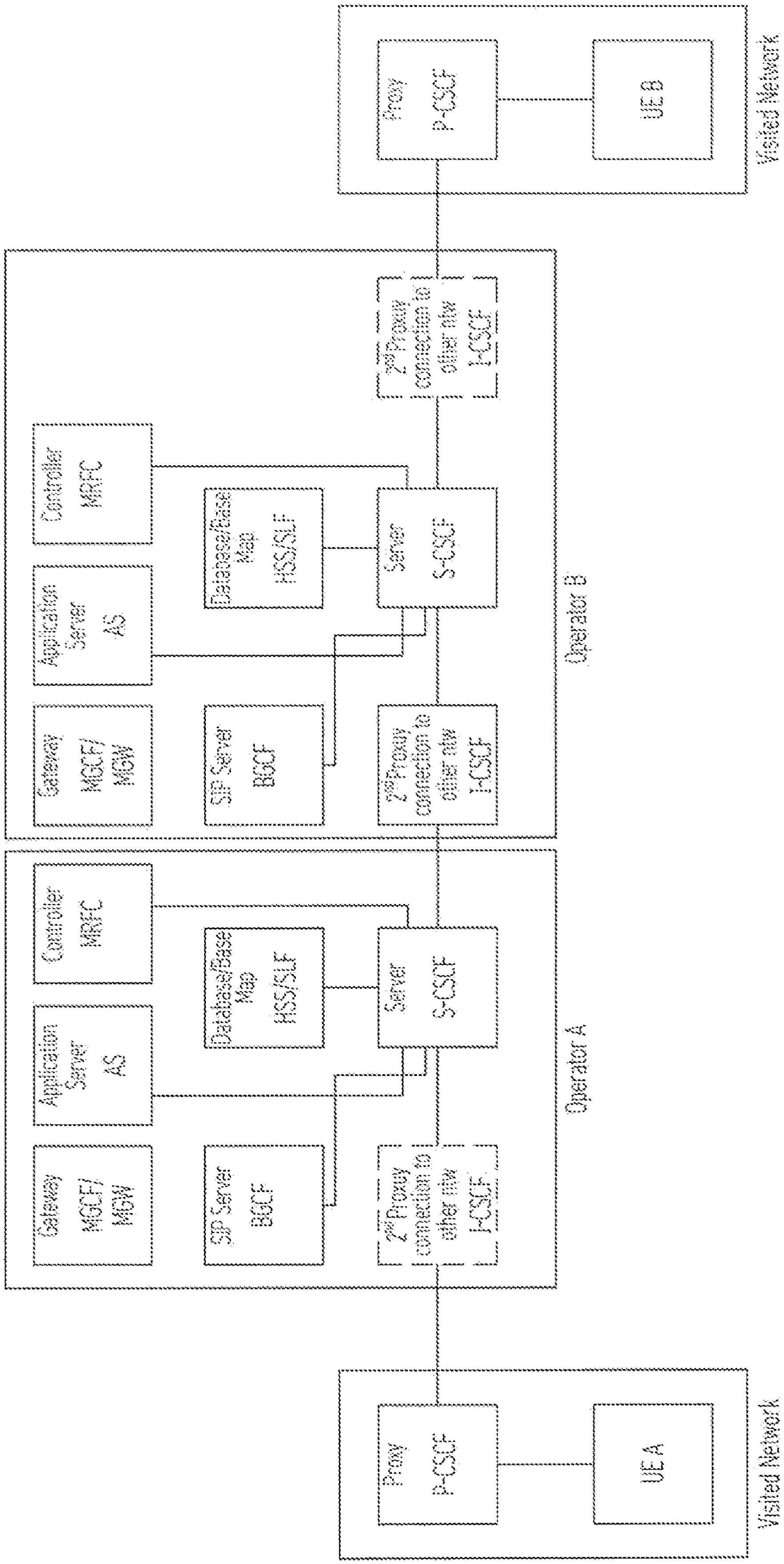
FIG. 15 illustrates a transmission structure for a UE on a visited network according to embodiments.

FIG. 15 illustrates a transmission structure for a UE on a random visited network according to embodiments.

In the 3rd Generation Partnership Project (3GPP), the Multimedia Division establishes and distributes standards for transmitting and receiving media by defining protocols related to media codecs. The definition of media and transmission scenarios cover a wide range. The scenarios include cases where personal computers or portable receivers provide mobile/fixed reception along with radio access and Internet-based technologies. This extensive standardization carried out by 3GPP has enabled ubiquitous multimedia services to cover a variety of users and use cases, allowing users to quickly experience high-quality media anytime, anywhere. In particular, in 3GPP, media services are classified according to their unique characteristics and divided into conversational, streaming, and other services according to the target application. The conversational service extends from the session initiation protocol (SIP)-based phone service network. The multimedia telephony service for the IP multimedia subsystem (MTSI) aims to provide a low-latency real-time conversational service. The streaming service delivers real-time or re-acquired content in a unicast manner based on the packet switched service (PSS). In 3GPP, broadcast services within the PSS system may be available on mobile TVs through the multimedia broadcast/multicast service (MBMS). In addition, the 3GPP provides messaging or reality services. The three base services described above are constantly revising or updating their standards to ensure the high quality user experience, and provides scalability to ensure that they are compatible with available network resources or existing standards. Media includes video codecs, voice, audio, images, graphics, and even text corresponding to each service.

In 3GPP, a standardized platform for mobile multimedia reception was designed to facilitate network extension or mobile reception. The IP multimedia subsystem (IMS) is designed to meet these requirements and enables access to various technologies or roaming services. The IMS is based on the Internet engineering task force (IETF) standard. The IETF standard operates on the Internet platform, and accordingly it may simply extend the Setup, Establishment, and Management functions of the existing Internet protocol. The IMS uses the SIP protocol as its basic protocol and manages multimedia sessions efficiently through this protocol.

In 3GPP standard technology, the service is based on a mobile platform. Accordingly, when a user is connected to a mobile network or platform of a third party or another region, the user must roam to the other network. In this scenario, a method for the client to maintain a session across multiple mobile networks is required. Additionally, as IP-based media service requirements increase, the requirements for high-capacity IP-based data transmission, conversation, and multimedia transmission have increased. Therefore, IP packets have been required to be transmitted in an interchangeable form across 3G, 4G, and 5G networks, rather than using the general IP routing. In order to maintain QoS in a mixed network environment, flexible data information exchange and platforms are needed in the process of exchanging services. In order to integrate the Internet network and wireless mobile network over the past 10 years, the 3GPP standard established the IP-based IP multimedia subsystem (IMS) standard and enabled transmission of IP voice, video, audio, and text in the PS domain. The multimedia telephony service for IMS (MTSI), which is a standard for transmitting conversational speech, video, and text through RTP/RTCP based on the IMS, was established to provide services having efficiency higher than or equal to that of the existing Circuit Switched (CS)-based conversational service for the user through flexible data channel handling. The MTSI includes signaling, transport, jitter buffer, management, packet-loss handling, adaptation, as well as adding/dropping media during call, and is formed to create, transmit, and receive predictable media. Since the MTSI uses the 3GPP network, NR, LTE, HSPA, and the like are connected to the IMS and are also extended and connected to Wi-Fi, Bluetooth, and the like. The MTSI transmits and receives data negotiation messages to and from the existing IMS network. Once the transmission and reception are completed, data is transferred between users. Therefore, the IMS network may be used equally, and the MTSI additionally defines only audio encoder/decoder, video encoder/decoder, text, session setup and control, and data channel. The data channel capable MTSI (DCMTSC) represents a capable channel to support media transmission, and uses the Stream Control Transmission Protocol (SCTP) over Datagram Transport Layer Security (DTLS) and Web Real-Time Communication (WebRTC). The SCTP is used to provide security services between network layers/transport layers of the TCP. Because it is extended from an existing platform, it defines media control and media codec as well as media control data for managing media, and general control is processed through media streaming setup through the SIP/SDP. Since setup/control is delivered between clients, adding/dropping of media is also included. The MTSI also includes IMS messaging, which is a non-conversational service. To transport media through 3GPP layer 2, the packet data convergence protocol (PDCP) is used. The PDCP delivers IP packets from a client to the base station, and generally performs user plane data, control plane data, header compression, and ciphering/protection.

FIG. 15 shows a transmission structure for transmission between two UEs having a call session in any visited network when there are UE A/UE B. UE A/UE B may be present in operator A or B or the same network. To describe the entire MTSI system, it is assumed that there are four other networks. To perform a call, UEs A and B perform session establishment for transmission of media within the IMS system. Once a session is established, UEs A and B transmit media through the IP network. The main function of the IMS is the call state control function (CSCF), which manages multimedia sessions using the SIP. Each CSCF serves as a server or proxy and performs a different type of function depending on its purpose. The proxy CSCF (P-CSCF) serves as a SIP proxy server. It is the first to access the IMS network and is the first block to connect UEs A and B. The P-CSCF serves to internally analyze and deliver SIP messages in order to receive all SIP messages and deliver them to a target UE. The P-CSCF may perform resource management and is closely connected to the network gateway. The gateway is connected to the general packet radio service (GPRS), which is an IP access bearer. Although the GPRS is a second-generation wireless system, it is connected to basic functions configured to support PS services. The P-CSCF and the GPRS should be in the same network. In this figure, UE A is present in a random visited network. UE A and the P-CSCF are present within the network. The serving CSCF (S-CSCF), which is a SIP server, is present in the home network of a subscriber and provides a session control service for the subscriber. If a proxy or visited network is not present, UE A or B may be present in operator A or B, and a UE may be present in the home network. In the IMS system, the S-CSCF serves as a major function in signaling and serves as a SIP register. Thus, it may create a user's SIP IP address or create the current IP address. The S-CSCF may also authenticate users through the home subscriber server (HSS) or acquire profiles of various users present in the HSS. All incoming SIP messages should pass through the S-CSCF. The S-CSCF may receive messages and connect with other nearby CSCFs or the application server (AS) to deliver SIP messages to other ASs. The interrogating CSCF (I-CSCF) performs the same proxy server function as the P-CSCF, but is connected to an external network. It may perform the process of encrypting SIP messages by observing network availability, network configuration, and the like. The HSS is a central data server that contains information related to users. The subscriber location function (SLF) represents an information map linking a user's address to the corresponding HSS. The multimedia resource function (MRF) contains multimedia resources in the home network. The MRF consists of a multimedia resource function controller (MRFC) and a multimedia resource function processor (MRFP). The MRFC is the control plane of MRC and performs a control function in managing stream resources within the MRFP. The breakout gateway control function (BGCF) is a SIP server. It represents a gateway connected to the public-switched telephone network (PSTN) or the communication server (CS) to deliver SIP messages. The media gateway control function (MGWF) and the media gateway (MGW) serve as an interface to deliver media to the CS network and deliver signaling.

Figure 16:
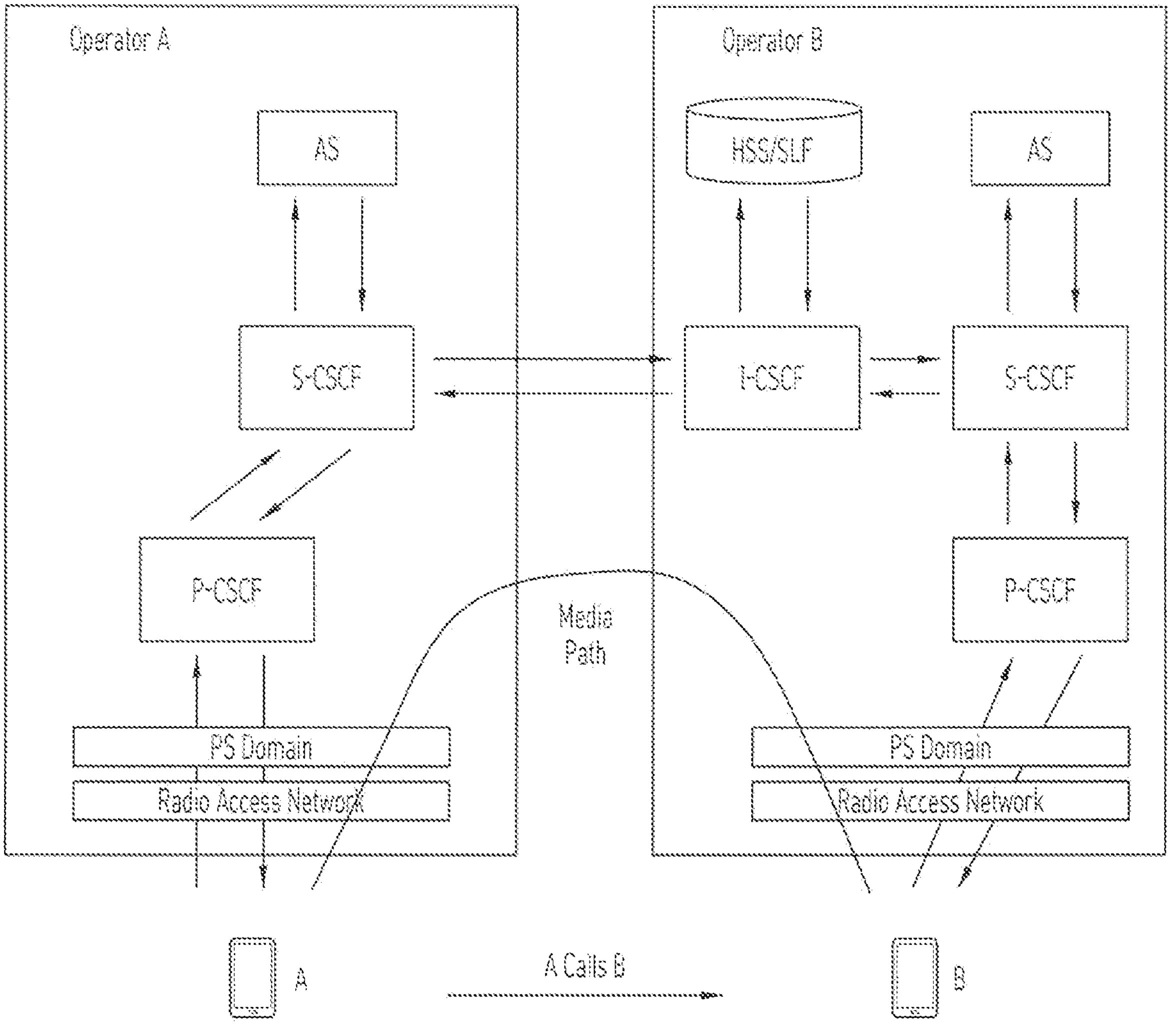
FIG. 16 illustrates a call connection between UEs according to embodiments.

FIG. 16 illustrates a call connection between UEs according to embodiments.

In an IMS-based network, an environment enabling IP connection is required. The IP connection is performed in the home network or visited network. When the IP connection is established, a conversational environment, which is a detailed element of XR, is configured, and information in which virtual reality data such as 360 video/geometry-based point cloud compression (G-PCC)/video-based point cloud compression (V-PCC) is compressed is exchanged or data is delivered. XR data to be delivered may be subdivided into two areas. When it is transmitted based on the MTSI standard, the AS delivers the call/hold/resume method through route control plane signaling using the CSCF mechanism and performs a third-party call connection. When the call connection is performed, the media is simply delivered between UE A/B. When there are two UEs, the MTSI operates within the IMS network as shown in FIG. 16.

Figure 17:
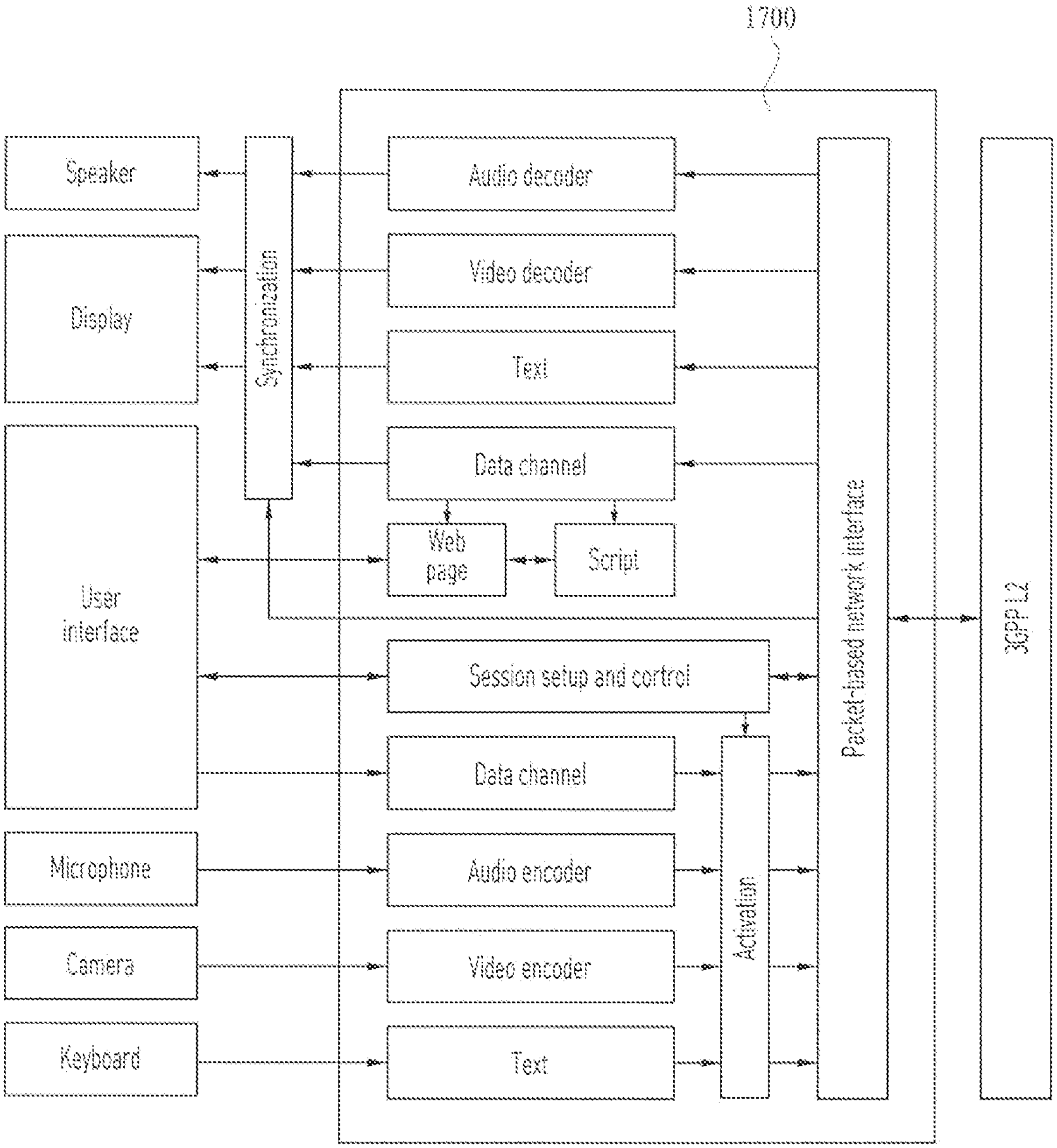
FIG. 17 illustrates devices for transmitting and receiving point cloud data according to embodiments.

FIG. 17 illustrates devices for transmitting and receiving point cloud data according to embodiments.

The video encoder and audio encoder may correspond to the XR device 100*c*, the encoding S1520 of FIG. 8, the point cloud encoder of FIGS. 9, 11, and 13, and the like.

The video decoder and audio decoder may correspond to the XR device 100*c*, the decoding S1540 of FIG. 8, the point cloud decoder FIGS. 10, 12, and 14, and the like.

The MTSI limits the relevant elements and connection points of the client terminal within the IMS network, and thus the scope of the configuration thereof is defined as shown in FIG. 17.

In FIG. 17, decisions about the physical interaction of synchronization related to the speaker, display, user interface, microphone, camera, and keyboard are not discussed in the MTSI. The parts in the box 170 determine the scope of the method to control the media or control related media. In general, the delivery of the SIP falls under the IMS, and thus the control of a specific SIP is not included in the MTSI. Therefore, the structure and delivery of the data and the definition of the service may determine the scope of the MTSI and IMS. If they are defined as in the MTSI, they may be defined as a standard in the following scope.

To support conversational XR services, SDP and SDP capability negotiation based on RFC 4566 and a related streaming setup should be used.

For the setup and control, independent interaction of UE A/B is needed, and media components perform an adding or dropping operation.

The transmission medium for transmitting the media should comply with the packet-based network interface as well as the coded media (applying a transport protocol). transferred between To transmit data, the RTP stream of RFC 3550 may be used, and the SCTP (RFC 4960) or WebRTC data channel may be employed as a data channel.

A device for transmitting and receiving point cloud data according to embodiments may include any device, such as a cell phone, desktop, and AR glass. When it is assumed that the device is a cell phone, it may have a speaker, a display, a user interface, a microphone, a camera, and a keyboard, and the input signal may be transferred to the encoding/decoding block.

The method/operation according to embodiments may be processed by the video encoder of FIG. 17. It may be operatively connected to software.

In the method/operation according to the embodiments, the G-PCC structure call flow may be included in the session setup & control part.

Each component of FIG. 17 may correspond to hardware, software, processors, and/or a combination thereof.

IP Connectivity

The point cloud data transmission/reception device according to embodiments may support IP connectivity.

In the scope of the multimedia subsystem, the XR range is assumed to be present in a radio access network (RAN) such as a universal mobile telecommunications system (UMTS) and a visited network such as a serving GPRS support node (SGSN) or gateway GPRS support note (GGSN), and scenarios for roaming services and IP connectivity should be considered. When IP connectivity needs to be considered, IP services should be provided even in places that are not present in the IMS network, and the general packet radio service (GPRS) roaming should also be connected to the home network. If an IMS-based network is provided, end-to-end quality of service (QOS) should be provided to maintain the IP connectivity. QoS requirements may generally use the session initiation protocol (SIP) to define a session, change a session, or terminate a session, and may convey the following information: type of media, direction of traffic (up or down), bitrate of media, packet size, packet transport frequency, RTP payload, and bandwidth adaptation.

IP Policy Control/Secure Communication

The point cloud data transmission/reception device according to embodiments may perform IP policy control/secure communication.

Negotiation may be performed at the application level. If QoS between UEs is established, the UE or an entity that is to provide XR service compresses and packetize the data and delivers the same over the IP network using a transport protocol such as TCP or UDP using an appropriate transport protocol (such as RTP). In addition, when the IP network is used, the bearer traffic should be controlled and managed, and the following tasks may be performed between the access network and the IMS within the IMS session.

The policy control element may activate the appropriate bearer for the media traffic through a SIP message and prevent the operator from misusing bearer resources. The IP address and bandwidth for transmission and reception may be adjusted at the same bearer level.

The policy control element may be used to set start or stop points for media traffic and to resolve synchronization related issues.

The policy control element may be used to deliver acknowledgment messages over the IP network and to modify, suspend, or terminate the services of the bearer.

The privacy may be requested for the security of the UE.

Internetworking with other networks (Service Control).

The point cloud data transmission/reception device according to embodiments may be operatively connected to other networks.

Because the IMS services provided by 3GPP are not maintained in the same time, connections and terminations of network subscriptions between terminals cannot be communicated quickly. Therefore, for any type of terminals, an IMS network is required to connect as many different users and networks as possible. This may include not only PSTN or ISDN, but also mobile and Internet users. In the case of 2G networks, which are rarely used currently, if roaming is used, the entity visiting the visited network provides services and control information for the user to perform registration/session establishment within the Internet network. When roaming is present in the visited network as in this case, there may be service control constraints, and there are points to consider according to various roaming model scenarios. In addition, when a service is provided, the quality thereof may be degraded due to the service speed on the visited network. If roles such as security or charging are added in the middle, the areas of service control and execution method for the home network/visited network should be considered.

Plane Separation

The 3GPP standard defines a layered architecture within the IMS network. Therefore, the transport/bearer is defined separately. In particular, the application plane may be generally divided into the scope of application servers, the control plane into HSS, CSCF, BGCF, MRFC, MRFP, SGW, SEG, etc., and the user plane into SGSN, GGSN, IM-MGW, etc.

Figure 18:
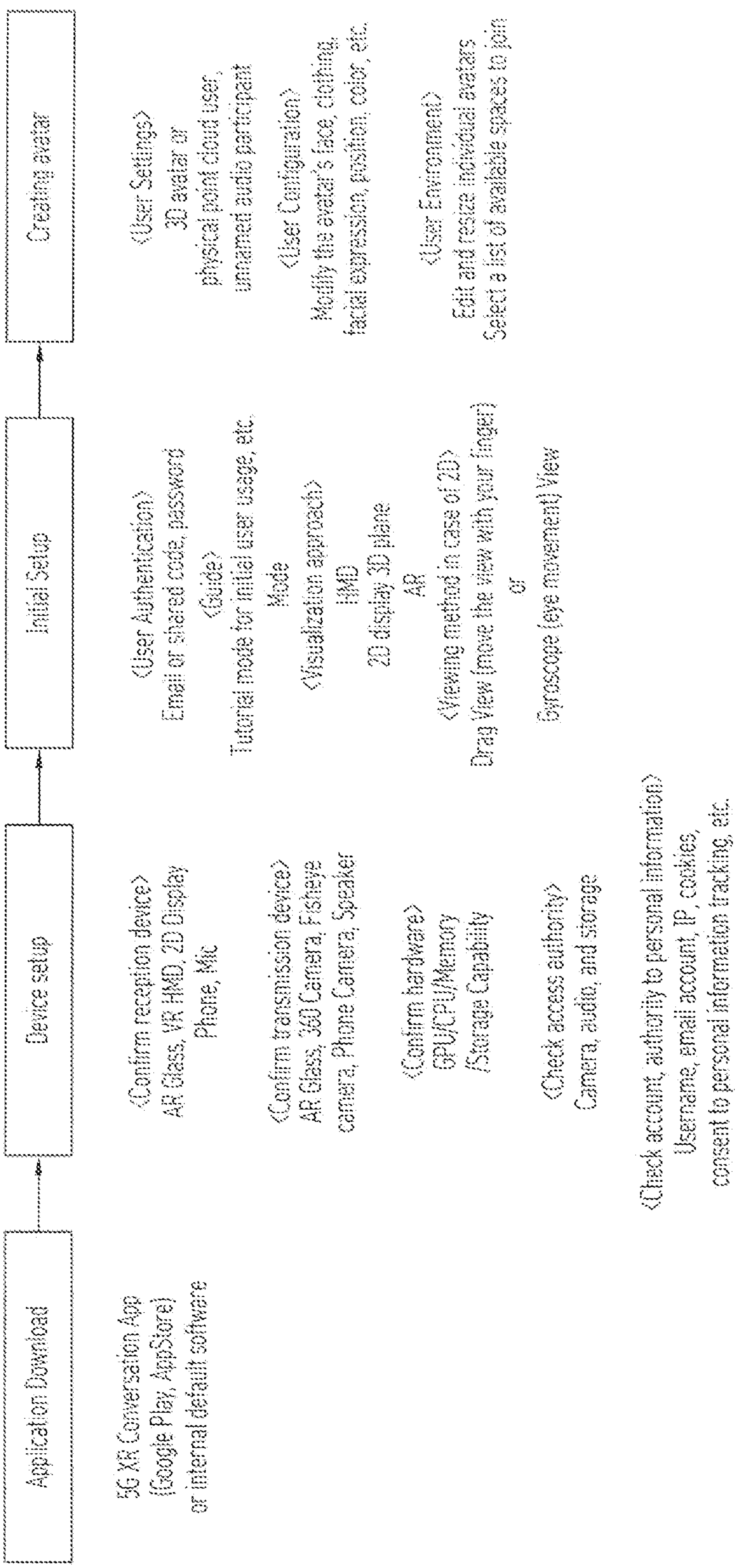
FIG. 18 illustrates a structure for XR communication on a 5G network according to embodiments.

FIG. 18 illustrates a structure for XR communication on a 5G network according to embodiments.

The point cloud data transmission/reception device according to embodiments may efficiently perform XR communication based on a communication network, as shown in FIG. 18.

Real-time point cloud two-way communication using a 5G network may be achieved using three methods: 1) exchange of point cloud data using an IMS telephone network, 2) streaming of point cloud data using a 5GMS media network, and 3) web-based media transmission using WebRTC. Therefore, a definition of an XR conversational service scenario is required to transfer the data. Scenarios may be delivered in various forms and may be divided into processes and scenarios for all end-to-end services using a 5G network, starting from the process of acquiring data.

In order to proceed with XR teleconference, application download should be performed in advance. TO exchange data using a 5G network, an embedded or downloadable application program is required. This program selects the transmission type of data transmitted by 5G from among 1) a telephone network 2) a media network 3) A web network. When the program is installed, the basic environment for sending and receiving data may be checked by checking the general access of the device and permissions to account and personal information. Point cloud equipment, including a reception device and transmission device for receiving data from a counterpart, includes capture equipment, a converter capable of converting dimensional data into three dimensions, or any video input device capable of transmitting or converting data into three dimensions in 360 degrees. For voice data, a built-in microphone or speaker is provided, and hardware capabilities to minimize the processing of point cloud data is also checked. Hardware includes the function of the GPU/CPU capable of performing pre-rendering or post-rendering and may also include the capacity of the hardware to perform the processing, and the size of the memory. The personal information includes account information for accessing the application, IP, cookies, and other things that may additionally carry real-time information about the user, and consent is obtained in advance to transfer the personal information.

Figure 19:
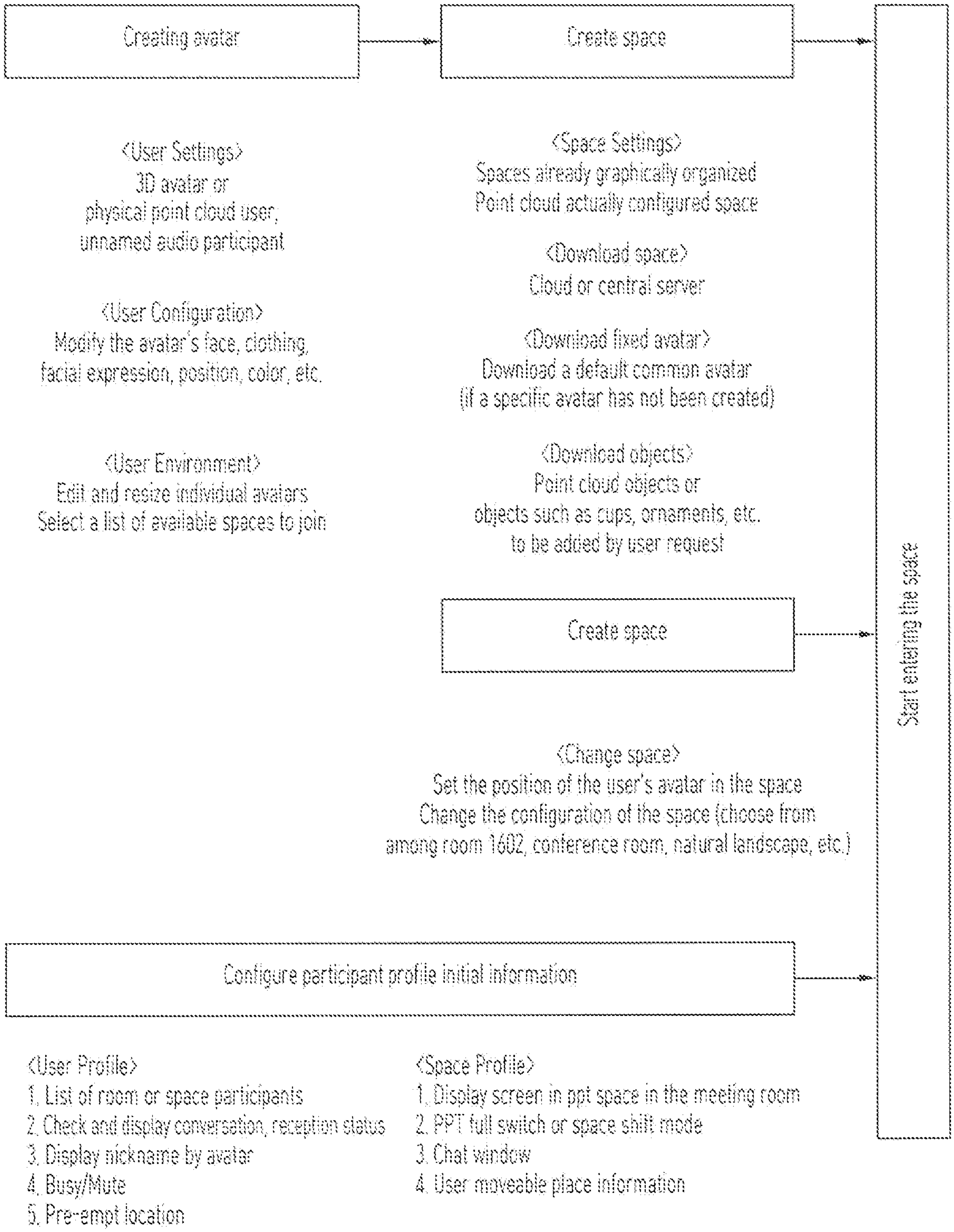
FIG. 19 illustrates a structure for XR communication according to embodiments

FIG. 19 illustrates a structure for XR communication according to embodiments.

After verifying the permissions to obtain the initial data and the state of the device, the user is authenticated and a distinguisher is created to differentiate between users. Generally, an email or a username and password is used to identify the user, and the tag of the authenticated user is formed automatically. In addition, a guide mode may be provided for the initial user to effectively exchange point cloud data or use the system. The state of the user device may determine a method for accessing the field of view. If the device is capable of directly capturing or receiving the point cloud, it may transmit and receive the data as it is. If the point cloud is received using an HMD, it should be scaled or transformed to fit the 360 environment. If the receiving display is not a device that receives three-dimensional data, but a 2D display based on a commonly used cell phone or monitor, it should be able to faithfully represent the data three-dimensionally within the two-dimensional screen. For example, the three-dimensional view may be realized or checked within the two-dimensional display by rotating or zooming the image on the screen with a finger. Alternatively, a gyroscope may be used to check a three-dimensional space on the two-dimensional screen. To represent a user in a three-dimensional space, an avatar should be created. The avatar may be virtual data from a graphic, a three-dimensional transformed form of a person or object directly acquired as a point cloud, or may be audio without any data. If audio data is input, the user does not exist and the data may be organized in the same form as a voice conference. The three-dimensional representation of the avatar may be modified by a user definition or choice. For example, in the case of a human, the avatar may change the shape of its face, wear clothes, hats, accessories, etc. that may express the personality of the human, and may be transformed into various forms to express the personality. In addition, emotions may be expressed through conversations between humans. The emotions may be controlled by changes in the text or the shape of the face in graphics.

The created avatar participates in a virtual space. In the case of a 1:1 conversation, each data is transmitted to the counterpart, but the space in which the counterpart receives the data should be simple. If there are multiple participants, spaces that may be shared by multiple participants should be created. The spaces may be any graphically configured spaces or data spaces acquired directly as point clouds. Depending on the size and context of the data being shared, the data may be stored on individual devices for quick processing, or may be stored and shared in the cloud or on a central server if the data is large. The user's avatar may be pre-generated using a library. A default, common avatar may thus be used, eliminating the need to create a new avatar or capture and send data for the users. Similarly, various objects used in the space may be added at the request from a user, and the data may be graphical or acquired as a point cloud. Assuming a typical meeting room, objects may be easily accessible or familiar objects in the meeting room, such as documents, cups, and laser pointers. When a space is created, it may be populated by users, each with their own avatar, and users may join the meeting by moving their avatar into the created space. The space is determined by the host organizing the meeting and may be changed by the host by selecting the space. Acquiring a familiar meeting place in advance may give the effect of joining a company meeting room at home, while traveling abroad or acquiring a famous historical site abroad may give the effect of meeting at that site from home. Spaces generated from virtual, random graphics rather than point clouds are also subject to the ideas and implementation of the space organizer who creates the space for the user. When a user joins a space, they may enter the space by forming a user profile. The user profile is used to distinguish the list of participants in the room or space. If there are multiple users, it may be checked whether conversations are possible and that the user's reception is working correctly. Also, when an avatar is present, the user's name or nickname should be displayed and it should be indicated whether the user is currently busy or mute. Space constraints may vary depending on the utilization of the applications that make up the host or server. In environments where free movement is restricted, users should be allowed to move where they want to be. In addition to the user's profile, the profile of the space also needs to determined. To share a large number of files in a meeting room, there should be a space to display the PPT in the room. Thus, the effect of viewing the presentation in a virtual room may be obtained, and the screen image may be replaced with a screen image for sharing documents, just like in a normal audio conference. A place for chatting also needs to be provided. If users move around, a definition of how far and where they can move is required.

Figure 20:
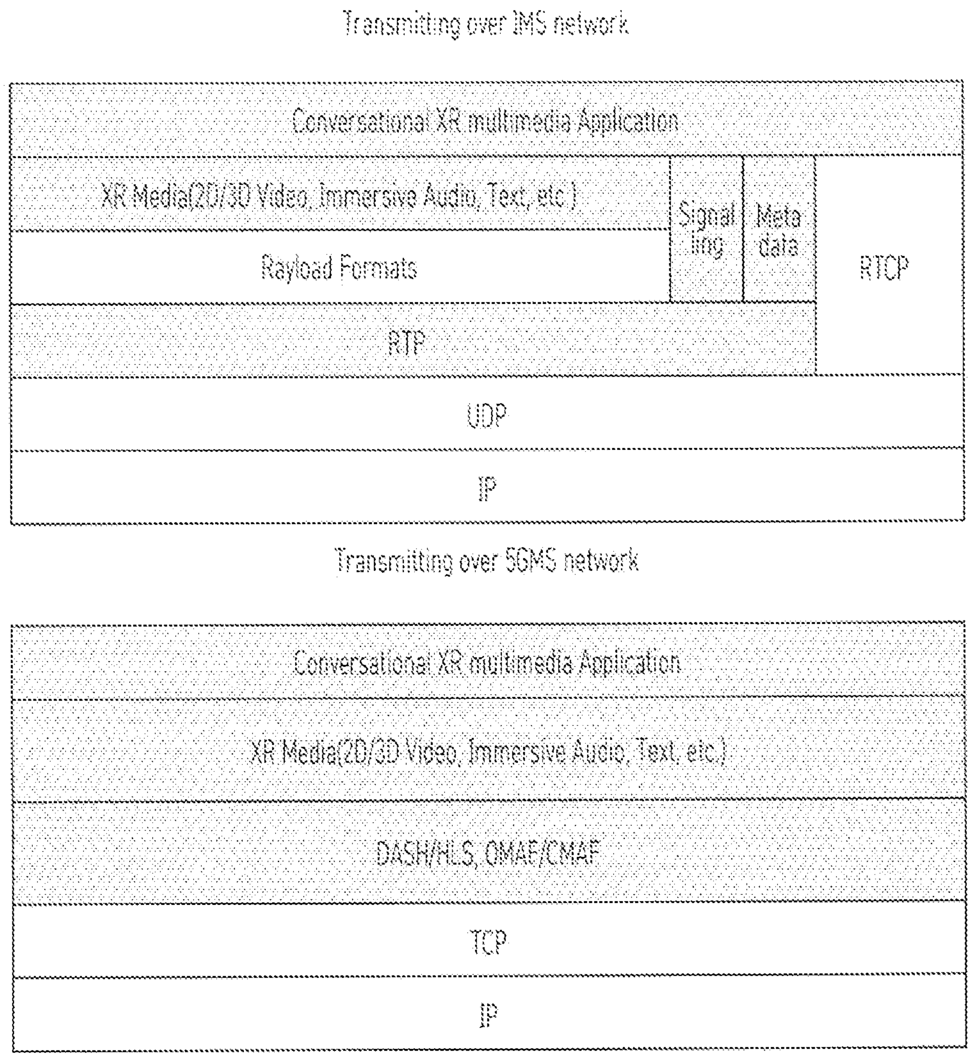
FIG. 20 illustrates a protocol stack of XR interactive service on a 3GPP 5G network according to embodiments.

FIG. 20 illustrates a protocol stack of XR interactive service on a 3GPP 5G network according to embodiments.

5G XR media may be transmitted in various ways including: 1) exchanging point cloud data using an IMS telephone network; 2) streaming point cloud data using a 5GMS media network; and 3) Web-based media transmission using WebRTC. In the WebRTC method, two data are shared at the application level. In addition, IMS and 5GMS have their own transmission protocols and transmission and reception should be performed in accordance with the standards. Unlike the existing two-dimensional or 360 video, the XR conversational service should be delivered with dimensional information and data parameters for monitoring of QoS added. When the service is delivered over the IMS network, fast data processing and low-latency conversational service may be implemented because the data is delivered using a real-time telephone network. However, there is a disadvantage that the conversation should rely on continuous feedback information because there is no protocol for recovering from transmission errors in the middle of transmission. When performing XR conversation services with 5GMS, errors may be corrected and a larger amount of data may be transmitted. However, there may be delays caused by the process of controlling errors. Both methods are technically feasible in current 5G systems, and which one to use may depend on the environment and context in which the service is to be implemented.

Description of Use-Case of MTSI-Based XR Conversational Conference

Real-time two-way video conversations based on point clouds may be categorized into two types: 1:1 conversational transmission, such as a single phone call, and participation in multiple video conferences. However, both scenarios require a processor that processes media rather than directly delivering data and should be provided in an environment that allows for virtual meetings.

Figure 21:
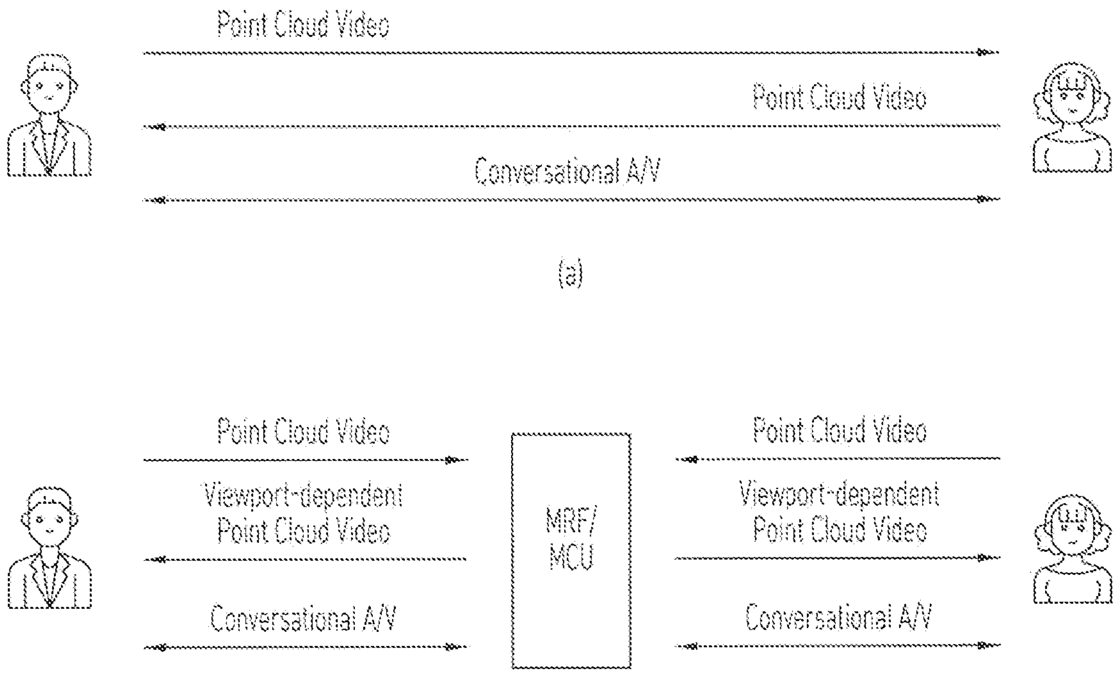
FIG. 21 illustrates a point-to-point XR videoconference according to embodiments.

FIG. 21 illustrates a point-to-point XR videoconference according to embodiments.

Point to Point XR Teleconference.

The basic call request for a conversation is driven by network functions. When using an MTSI network, a media source function (MRF) or media control unit (MCU) may be used to transmit and receive media. The MRF/MCU receives the point cloud compressed data. In the case where the sender intends to send auxiliary information (view of the field of view, camera information, direction of the field of view, etc.) in addition to the compressed data. After acquiring different point cloud data from multiple senders using the MRF, a single video is created through internal processes. The video includes a main video and multiple thumbnails. The processed video is then delivered back to the respective receivers, where processing such as transcoding and resizing may occur. If the MRF requires processes such as transcoding, it may increase the maximum latency by as much as the processing time. In addition, thumbnail data may be sent to each transmitter and receiver in advance to perform preprocessing. In addition to processing media, the MRF performs functions of audio and media analysis, operative connection of the application server and billing server, and resource management. The application server (AS), which is connected to the MRF, provides MRF connection and additional functions, including HSS interworking function for inquiring the status of subscribers in the telephone network. Additional functions include password call service, lettering service, call connecting tone service, and call prohibition service, on the actual phone.

The one-to-one point cloud conversation service requires each user to have a three-dimensional point cloud capture camera. The camera should contain color information, position information, and depth information related to the user. If depth is not represented, a converter may be used to convert a two-dimensional image into a three-dimensional image. The captured information used may include Geometry-based Point Cloud Compression (G-PCC) or Video-based Point Cloud Compression (V-PCC) data. The transmitter should have equipment capable of receiving the other party's data. The reception equipment generally refers to any equipment capable of representing the data of the acquired point cloud. Accordingly, it may be a 2D-based display and may include any equipment capable of visually representing the graphics of the point cloud, such as an HMD or hologram. To represent data, the receiver should receive data from the MRF/MCU, where the data from the transmitter and receiver is processed, and process the received data. The captured point cloud data is delivered to the MRF/MCU and the received data is generated by an internal process to deliver the data to each user. The basic information about the conversation, the virtual space of the conversation where the conversation is required, or the view information from the perspective desired by the other party may be delivered, or compressed data may be delivered.

1. Bonnie (B) and Clyde (C) use a conference call to make an access. Through the access, each other's face may be presented in a plane or a simple virtual space, and the virtual space A allows B and C to see each other's faces from where they arrive.

In a one-on-one conversation, the virtual space is simply used as a space in which the point cloud is projected and simplified. If the projection space is not used, all data captured by the camera is simply sent to the other party.

2. B and C require an application to operate the video conference. The application checks the following basic service operations.

Checking the reception device: AR glass, VR HMD, 2D display, phone speaker, etc.

Checking the transmission device: AR glass, 360 camera, fisheye camera, phone camera, Mic, Kinnect, LiDAR, etc.

Checking hardware performance: GPU, CPU, memory, storage capability

Checking access authority: camera, audio, storage, etc.

Checking permissions to account and personal information: username, email account, IP, cookies, and consent to personal information tracking 3. Before engaging in a conversation, B and C use a point cloud capture camera to acquire point data to be transmitted to the other party. The point data is typically acquired data about the faces or body shapes of B and C, and data acquired using their own equipment may be output.

In the above scenario, a transmission delivery may be implemented based on a simple telephone network in an environment where no media is known. Prior to the creation of the telephone network, the preliminary data needs to be received through the MRF/MCU, which receives all the incoming data from B and C.

The scenario of a video conversation between two people for a point cloud is divided into two scenarios as follows.

In scenario (a), all data is transmitted in a one-to-one conversation. All of B's point cloud information may be delivered directly to C, and C may process all the B's data or partially process the same based on auxiliary information delivered from B. Similarly, B should receive all the point cloud data transmitted by C and process some of the data based on auxiliary information transmitted from C. In scenario (b), the MRF/MCU are located between telephone networks, and B and C deliver point cloud data to the MRF/MCU located therebetween. The MRF/MCU processes the received data and delivers the data to B and C according to the specific conditions required by B and C. Therefore, B and C may not receive all the point cloud that they transmit to each other. In scenario (b), the multiparty video conference function may also be extended to include an additional virtual space A, which may be delivered to B or C. For example, instead of receiving a direct point cloud, B and C may be placed in a virtual meeting space and the entire virtual space may be delivered to B and C in the form of third person or first person. David (D) may also join in, and thus B, C, and D may freely converse with each other in space A.

Figure 22:
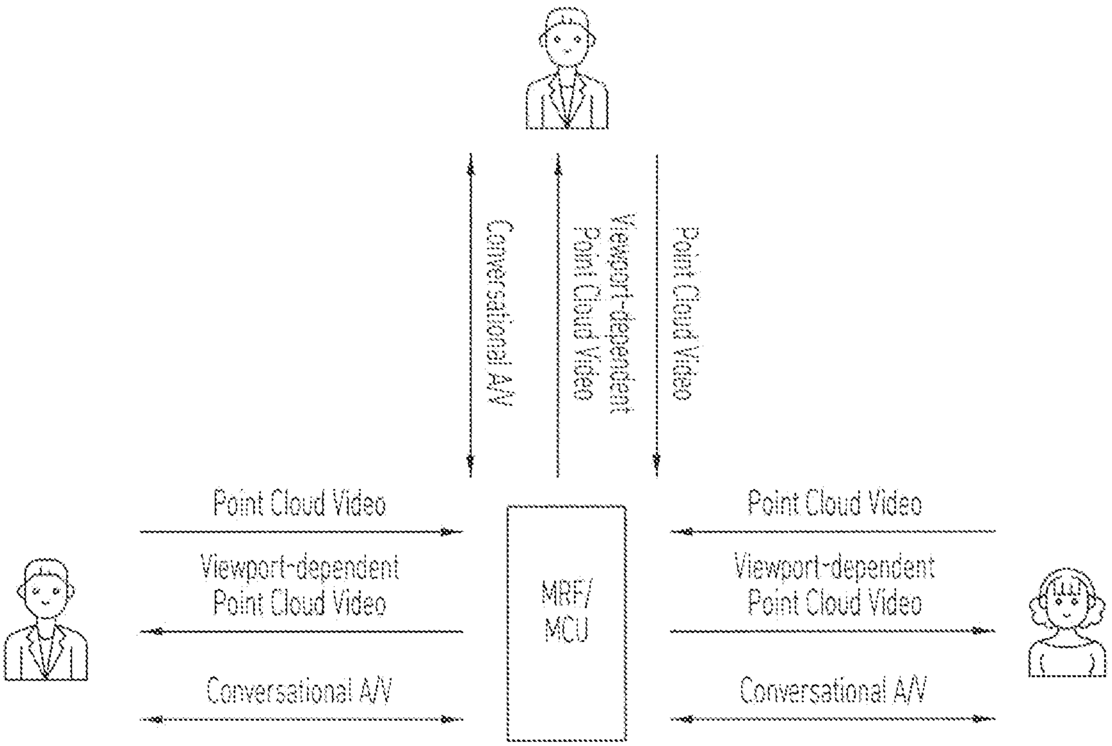
FIG. 22 illustrates an extension of an XR videoconference according to embodiments.

FIG. 22 illustrates an extension of an XR videoconference according to embodiments.

As opposed to a conversation between two persons, a virtual conferencing system involving three or more persons may not allow for direct data transmission. Instead, the MRF/MCU may receive each piece of data and process a single piece of data, which is schematically shown in FIG. 22.

B, C, and D deliver the acquired point cloud data to the MRF/MCU. Each piece of the received data is transcoded to form a unit frame and generate a scene that may organize the data of the aggregated points. The configuration of the scene is given to the person who requests hosting among B, C, and D. In general, various scenes may be formed to create a point space. Depending on the user's location or the location they wish to observe, not all data needs to be delivered, and the MRF/MCU may deliver all or part of the point cloud data based on the received data information and the camera viewpoints and viewports requested by B, C, and D.

Figure 23:
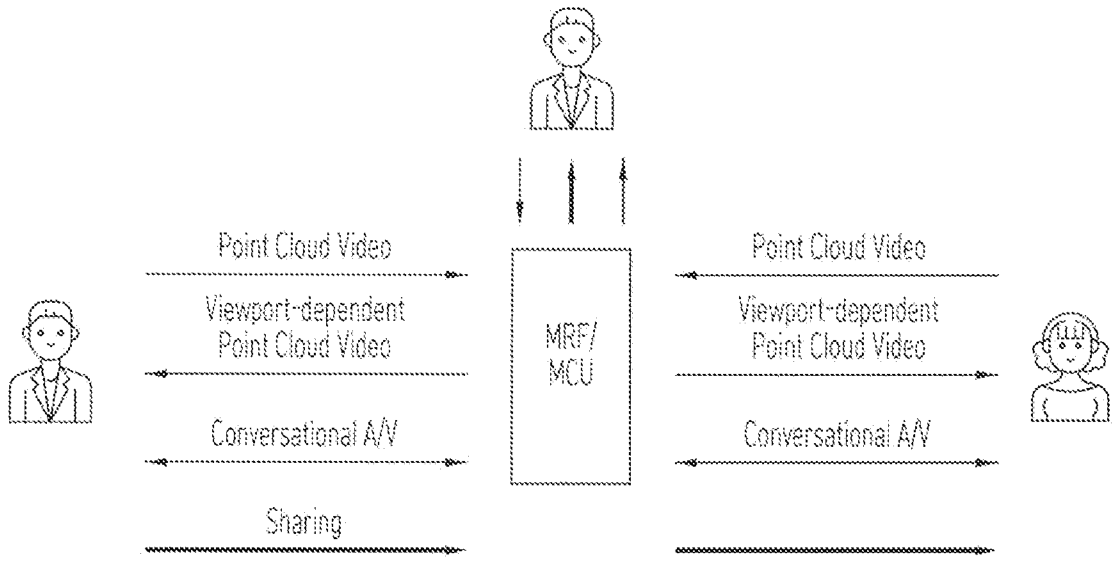
FIG. 23 illustrates an extension of an XR videoconference according to embodiments.

FIG. 23 illustrates an extension of an XR videoconference according to embodiments.

Second, B having the authority of the host may share its own data or screen with the conference participants. The data that may be shared includes media that may be delivered to a third party in addition to the video conversation, such as an overlay, an independent screen, or data. If the sharing function is used, B may transmit data to be shared to the MRF/MCU, and C and D may receive data shared by a request thereof. In order to share the data, the number of overlays or layings may be determined using the SDP. Capability should be measured regarding the ability to receive all the data and the ability to receive all the data to be delivered in the Offer/Answer process. This process may be determined at multiple conference participation initiations. The data processing capability for each user may be checked when a telephone network is created when the data sharing function should be basically provided. The shared data is generally generated to share some or a partial or entire screen of an application operating in the host in a conversation through a presentation file, an excel file, a screen of a desktop, or the like. The generated data is transmitted to a user who desires to receive the data by converting the compression or resolution.

In accordance with embodiments, the present disclosure describes a method of tracking and recognizing an efficient human eye of a realistic virtual conversation and conference system for three-dimensionally obtaining a user face in real-time and bi-directionally and having a conversation in a virtual environment as described above. In this case, to implement a conversation between users, a camera field for recognizing a plurality of people, a point camera for physically obtaining a shape or face of a user, a color camera, and a camera for expressing depth are used. It is important to recognize and classify an object of a person or an object in an environment for recognizing a person. Most of the three-dimensional technology uses a sensor recognition method using a LiDAR, and in particular, uses a method of recognizing point cloud data acquired in real time as an object such as an animal, a person, or a vehicle.

To achieve an interactive service of the real-time point cloud, a service network needs to be deployed. The service network accesses the Internet or a wireless network and transmits information of a bidirectional user and obtains initial data. The obtained data may include about what kind of user the user is and what service the user wants. To obtain a service, the real-time point cloud may perform the service by using the existing network for as a transfer target. However, the service needs to additionally add a rule for implementing a service for each connection point rather than simply operating the service. The rule needs to be determined to be constant and may not be simply used by using the existing system.

Figure 24:
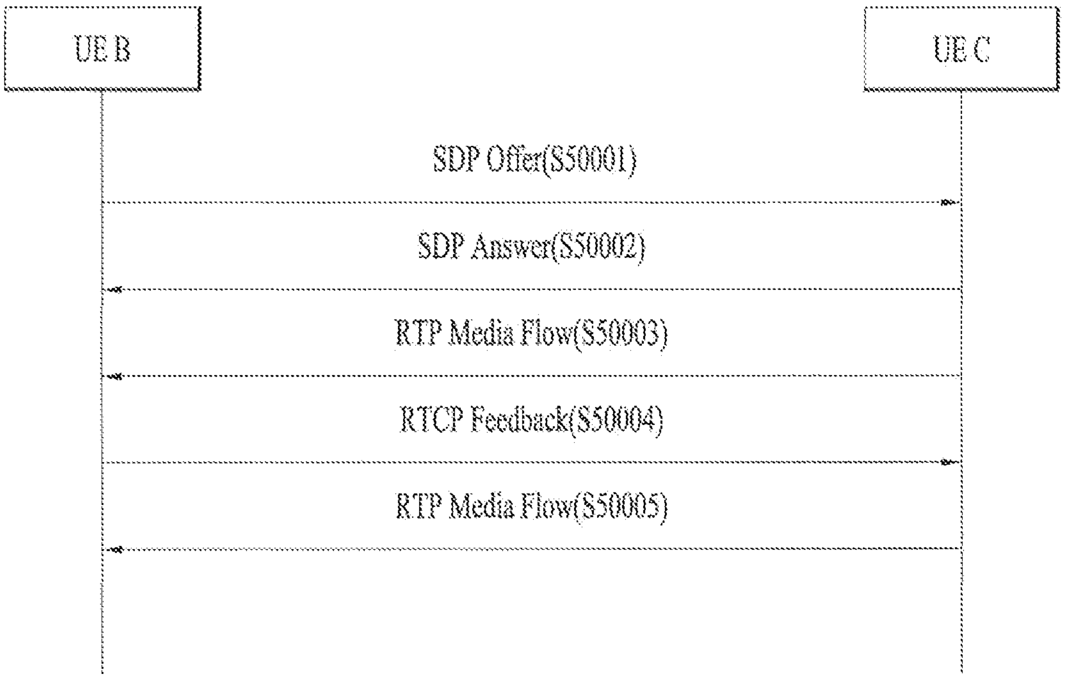
FIG. 24 illustrates an example of a point cloud encoder according to embodiments.
Figure 25:
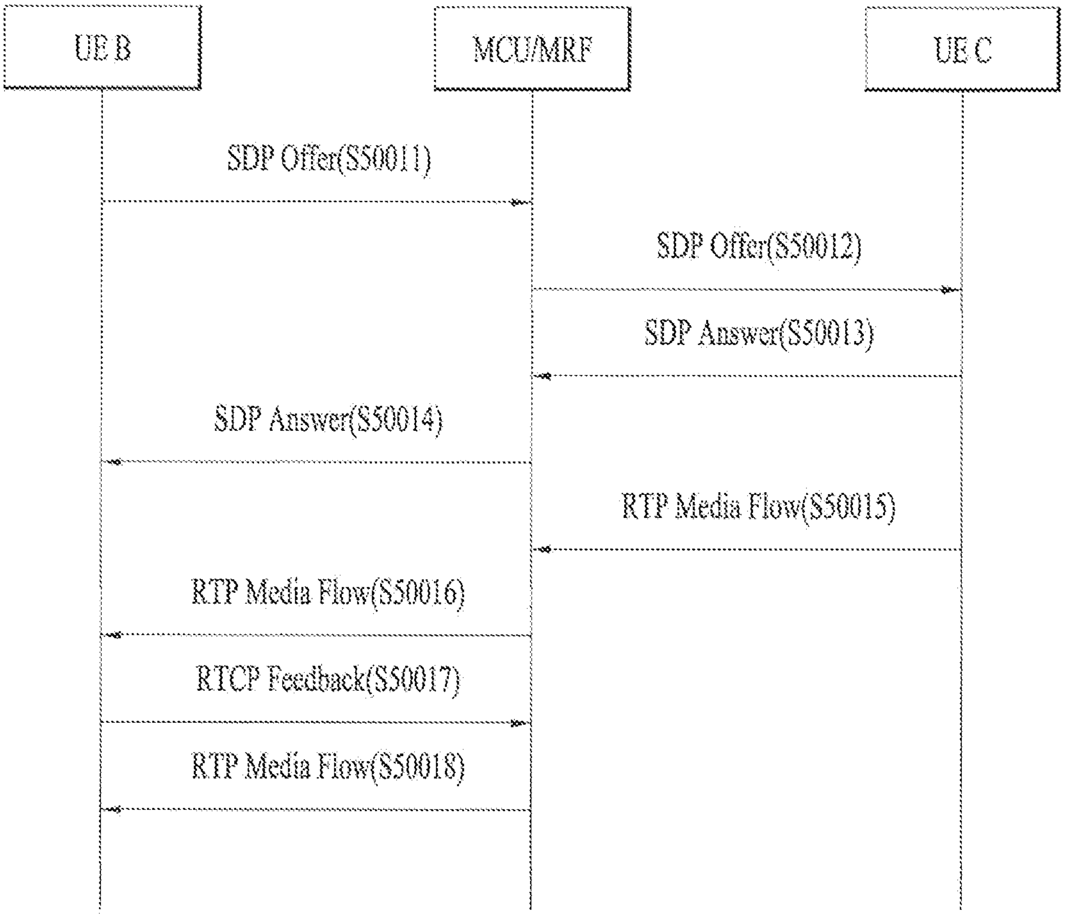
FIG. 25 is a flowchart illustrating another example of a process of generating a basic telephone network for forming a 1:1 conversation.

That is, to transmit the real-time point cloud data by using a 5G network, the existing telephone network is used. In this case, the telephone network generally transmits data based on voice of a conversation and the voice of the conversation is based, and thus a method of protecting the calibration or error of the voice to be transmitted as shown in FIG. 24 or 25 is not proposed. In particular, there is a discussion to transmit high-capacity and high-definition media such as VR to a telephone network, but it is difficult to expand and use the existing method without change.

FIG. 24 is a flowchart illustrating an example of a process of generating a basic telephone network for forming a 1:1 conversation.

According to embodiments, a UE may refer to a device (e.g. a smart phone) that communicates with a BS and/or another UE by using a radio access technology (e.g. 5G new RAT network) and long term evolution (LTE).

For convenience of description, a user of a UE B may be referred to as a user B, and a user of a UE C may be referred to as a user C. Further, is a protocol that negotiates a media type and a format related to a multimedia session between UEs, and operates as offer and answer models.

In FIG. 24, to generate a media-based call, the UE B and the UE C perform five basic transmission processes.

That is, the UE B transmits an SDP offer message to the UE C to know about whether the UE C is capable of performing a corresponding function (S50001). The transmitted SDP offer message (or information of SDP offer) includes basic content about whether a video codec is to be supported or an audio parameter is to be supported.

The UE C may recognize the SDP Offer message for connection with the UE B, determine the same or possible parameter for the actually possible content, and forward an SDP answer message including the parameter to the UE B (S50002). When the SDP offer and the SDP answer are not different in this process, the telephone network is formed.

To transmit media (e.g., XR data) to the UE B, the UE C packetizes media to a real time transport protocol (RTP) and transmits the media through a flow in which the telephone network is formed (S500003). In this case, a video codec to be used for RTP transmission generally includes AVC and HEVC.

Data transmitted through the RTP packet may be selectively received in an optional feedback signal based on a real time transport control protocol (RTCP) (S500004). Here, the feedback signal refers to a parameter that is continuously transferred by the UE to the UE C by a predetermined period.

When S50004, that is, a feedback process is included, the UE C may transfer media to the UE B based on the feedback parameter (S50005). In this case, the retransmitted media may be media optimized to be suitable for each network or UE B in the existing media to be transmitted.

FIG. 25 is a flowchart illustrating another example of a process of generating a basic telephone network for forming a 1:1 conversation.

FIG. 25 illustrates an example for forming a service network when a relay function such as MRF/MCU is included. That is, when a basic call request of the conversation is performed by a network function and an MTSI network is used, transmitting/receiving media uses a media source function (MRF) or a media control unit (MCU).

That is, the UE B transfers the SDP offer message to the UE C, but intermediate data passes through the MCU/MRF present in the IMS network (i.e., telephone network). In other words, the SDP offer message provided by the UE B is transmitted to the MCU/MRF (S50011).

The MCU/MRF transmits the received SDP offer message to the UE C (S50012).

The UE C identifies the SDP offer message for connection with UE B, determines the same or possible parameters for the actually possible content, and forwards the SDP answer message including the parameter to the MCU/MRF (S50013). The SDP answer message returned by the UE C is a message generated between the UE B and the UE C in the same manner as the 1:1 conversation.

The MCU/MRF transfers the received SDP answer message to the UE B without change (S50014). The MCU/MRF may obtain in advance that a telephone network is formed between the UEs through the received SDP offer message/SDP answer message, and prepares a data service in the middle based on the pre-obtained information.

When the contents of the SDP offer and SDP answer are not different in the above process, a telephone network is formed between the UE B and the UE C.

The UE C packetizes the media to an RTP, and then transmits the media to the MCU SCF/MRF through an RTP media flow (S50015). The MCU/MRF transmits the received RTP packet to the UE B through the RTP media flow without change (S50016).

The data transmitted through the RTP packet may be received with an optional feedback signal based on the RTCP (S50017). Here, the feedback signal refers to a parameter that is continuously transmitted by the UE B to the MCU/MRF by a predetermined period.

When operation S50017, that is, the RTCP feedback is performed, the UE B transmits feedback information to the MRF/MCU. The transmitted feedback information is processed within the MRF/MCU, and the MRF/MCU processes data (i.e. media) received from the UE C. The processed media is transferred in the form of an RTP packet to the UE B (S50018). In this case, the retransmitted media may be media optimized to be suitable for each network or UE B in the existing media to be transmitted.

As shown in FIG. 24 or FIG. 25, the existing IMS network transfer type generates and transmits an SDP negotiation message for media transmission. However, the existing method is not suitable for a media process for transmitting high-capacity media such as a point cloud. That is, in the case of one-to-one communication, point cloud data may be transmitted, but a method for processing high-capacity data generated in a telephone network does not exist, and when a plurality of users does a point cloud-type video conference, a method of transferring and processing the content may not be overcome by an existing method. The high-capacity point cloud data is transferred to a single IMS network, and all functions of an internal equipment may not be performed. Lastly, the above function may not define a role of direct transmission and reception of point cloud data to a detailed IMS network.

To resolve this problem, service registration for proceeding a point cloud-based interactive service, a connection flow for basic data exchange, and a service registration process in the existing network will be described.

The present disclosure includes virtual reality (VR) of MTSI of 3GPP TS 26.114 and extended reality (XR) of TR26.928 and includes the 3GPP TS26.223 standard that discusses telepresence based on IMS. Through the corresponding standard, a mobile or separable receiver may participate in a realistic conference by participating in the virtual conference. When interactive data is to be transferred in a media format, the present disclosure includes 5G Media Architecture 3GPP TS26.501, TS26.512, and TS26.511. Additionally, the relevant standard for materialization of the service may include TS26.238, TS26.939, TS24.229, TS26.295, TS26.929, and TS26.247.

Figure 26:
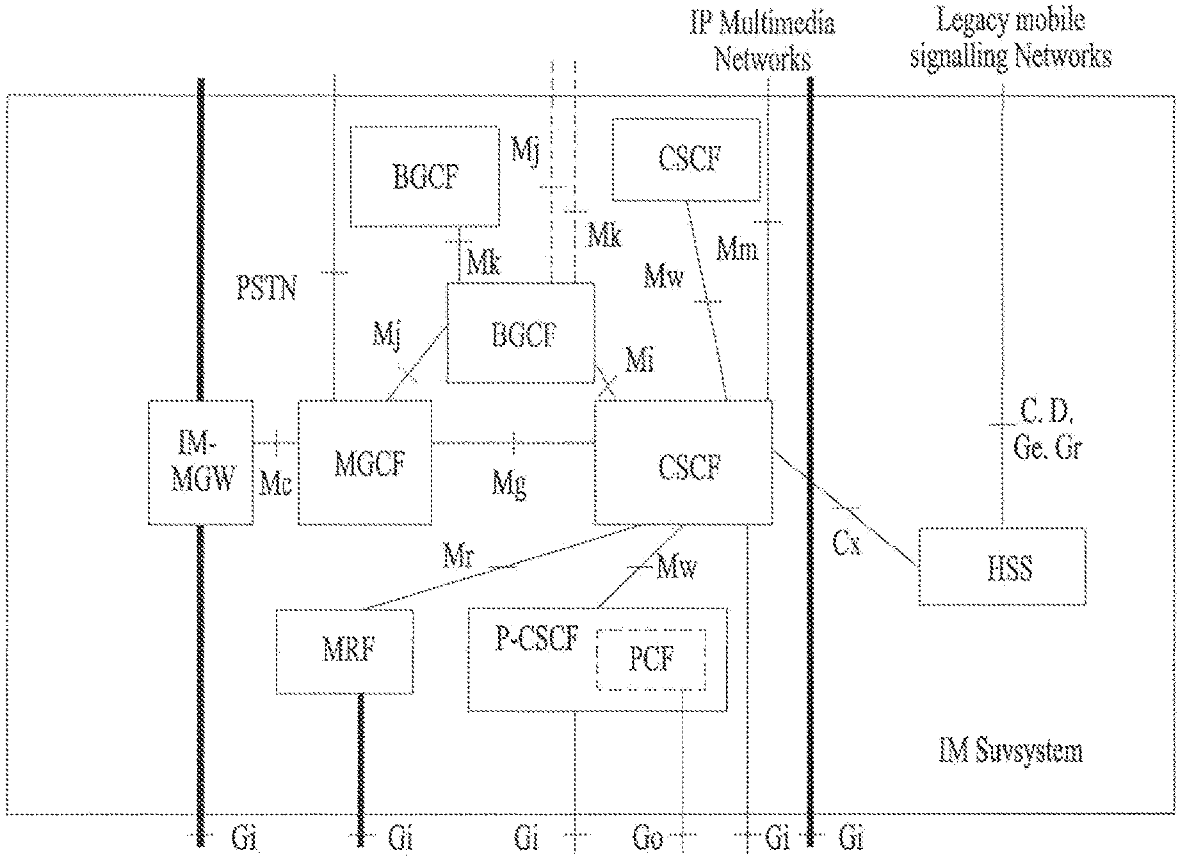
FIG. 26 is a detailed block diagram of an IM subsystem according to embodiments.

FIG. 26 is a detailed block diagram of an IM subsystem according to embodiments. In FIG. 26, a bold line represents traffic delivered to an IP multimedia network and a dotted line represents a portion through which an interface associated with signaling is delivered.

Multimedia may operate interchangeably with both IMS or non-IMS networks, and the present disclosure discloses only the case of the IMS network.

In FIG. 26, an IMS primary function is to manage a multimedia session by using an SIP as a call commit state commit function specification (CSCF). Each CSCF serves as a server or a proxy and performs different types of functions according to each purpose.

A proxy CSCF (P-CSCF) serves as a SIP proxy server. The P-CSCF receives all SIP messages and internally analyzes and delivers a SIP message to transmit the SIP messages to a UE as a transmission target. The P-CSCF may perform resource management and may be closely connected to a gateway of a network.

The HSS is a central data server and includes information related to a user. A multimedia resource function (MRF) includes a multimedia resource in a home network. The MRF includes a multimedia resource function controller (MRFC) and a multimedia resource function processor (MRFP). The MRFC is a control plane of the MRC and serves as a control that manages a stream resource within the MRFP.

A Breakout Gateway Control Function (BGCF) represents a gateway that is connected to a public-switched telephone network (PSTN) or communication server (CS) to transmit a SIP message to the SIP server.

The IM-MGW serves to transfer signaling with an interface for transferring media to a CS network.

BGCF and MRF include a transcoding function of generally known video codec H.264, H.265, and VP8/9, and the MRF integrates all networks and applications to transfer features. The MRF generally controls a media processing unit required for independent media to control a plurality of services, media, control protocols, codecs, and platforms.

According to embodiments, a telephone network for processing high-capacity media includes a method of using the MRF, a method of applying a cloud process at a UE without using the MRF, and a signal transfer system for the method will be described below.

That is, to activate the cloud service, the UE accesses a cloud service rather than the IMS network.

Figure 27:
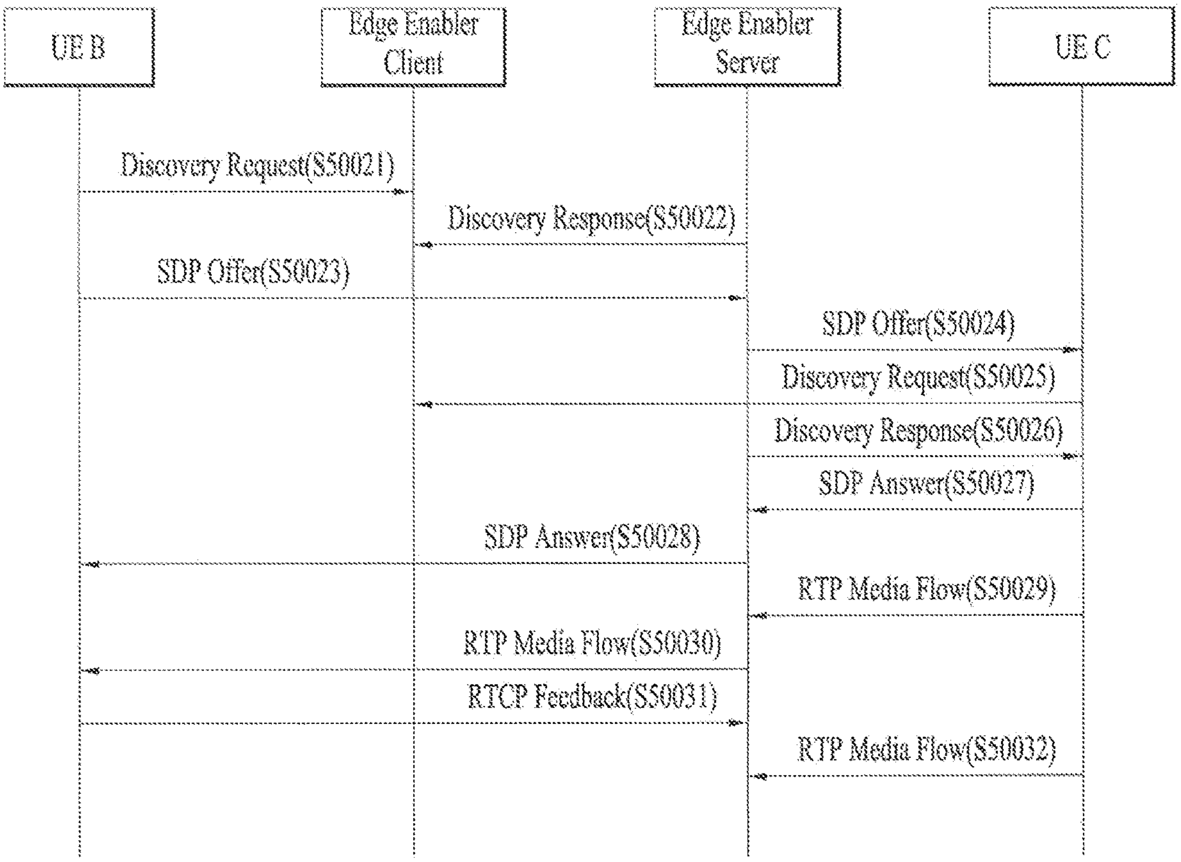
FIG. 27 is a flowchart illustrating an example of a service registration process according to embodiments.
Figure 28:
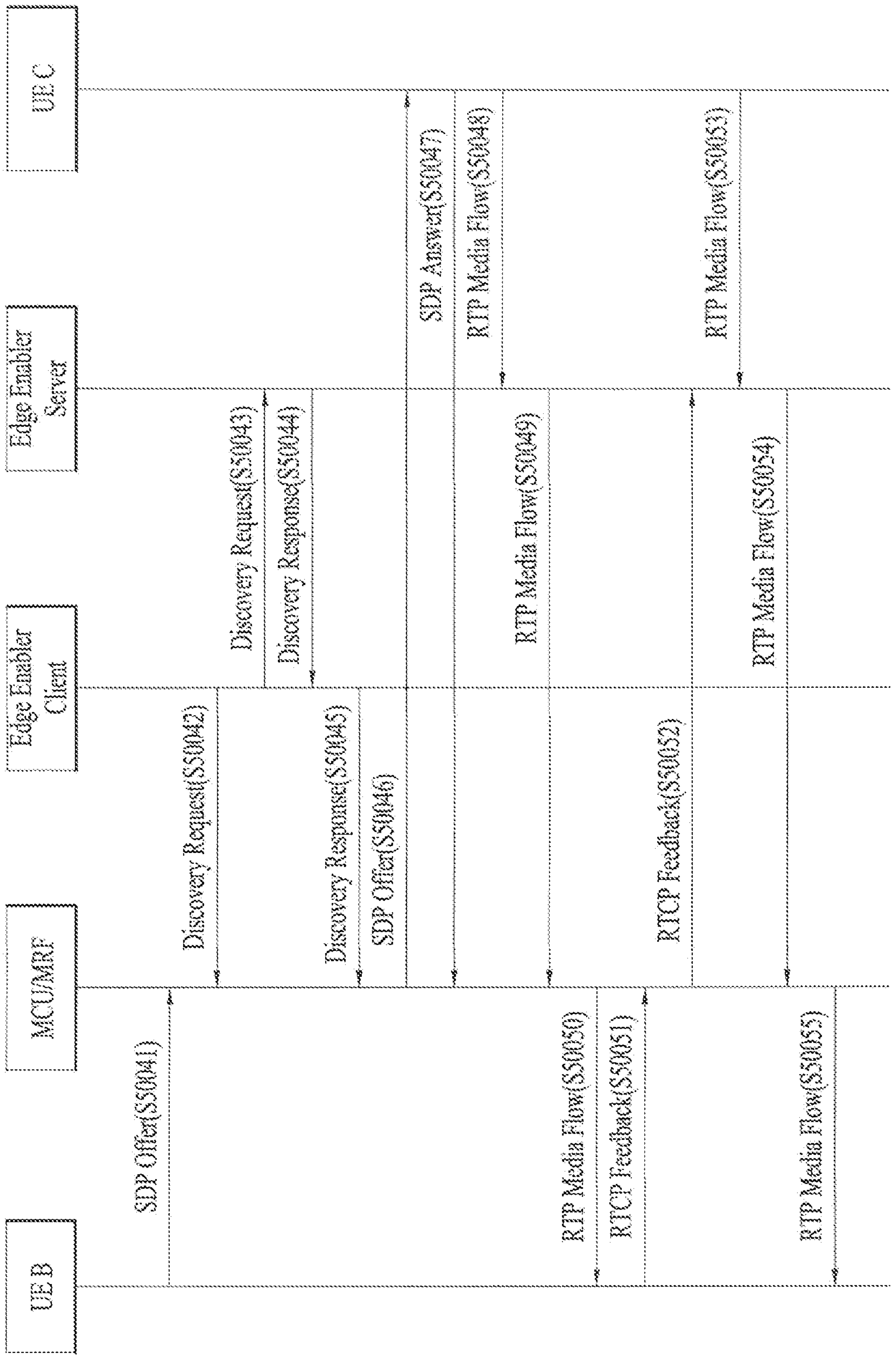
FIG. 28 is a flowchart illustrating another example of a service registration process according to embodiments.

The activated cloud service may be used in two types. One method is an internal data processing method, and another method is an external data processing method. That is, the mass transfer and reception of the point cloud data is left to the MTSI and data obtained in real time is processed in the cloud. To be driven by the UE, the service registration process needs to be connected to the cloud in an SDP negotiation process, and the service registration process is performed as shown in FIG. 27 or 28. That is, FIGS. 27 and 28 define a session flow for transmitting/receiving point cloud data (e.g., G-PCC data or V-PCC data) between UEs. In other words, FIGS. 27 and 28 are to determine a procedure for receiving a discovery request by using an edge enabler when a 1:1 conversation is performed between the UE B and the UE C. The edge enabler client and the edge enabler server constituting the enabler are blocks of functions used during distributed processing. In the present disclosure, this function may be used to allow UE B and UE C to communicate with each other by 1:1 XR. In particular, when the UE B and the UE C are unable to decode with each other (e.g., a low performance phone such as a 2G mobile phone), the edge enabler may instead process data. Therefore, even if the computer is not good, high-capacity computing may be substituted.

The MTSI is a standard for transmitting Conversational Speech, Video, Text through RTP/RTCP based on IMS, and is formulated to provide the same or high efficiency service as compared to the existing circuit switched (CS)-based convergence services through flexible data channel handling. The MTSI is formed to generate, transfer, and receive predictable media such as signaling, transport, jitter buffer, management, packet-loss handling, and adaptation, as well as adding/dropping media during call. The MTSI uses a 3 GPP network, and thus NR, LTE, HSPA, and the like are connected to the IMS, and are connected to Wi-Fi, Bluetooth, and so on. The MTSI transmits and receives a data negotiation message to an existing IMS network, and when transmission and reception is completed, data has a structure transferred between users. Therefore, the MTSI may use an IMS network in the same manner, and the MTSI may additionally define only audio encoder/decoder, video encoder/decoder, text, session setup and control, and data channel.

FIG. 27 is a flowchart illustrating an example of a service registration process according to embodiments. To perform a service registration process, a system may include at least a plurality of UEs, an edge enabler client, and an edge enabler server. In the present disclosure, the edge enabler client may be referred to as an edge enabler, and an edge enabler and an edge enabler server may be collectively referred to as an edge enabler.

In FIG. 27, it is assumed that the UE B and the UE C form a phone network according to a request of the UE B. The UE B and the UE C perform a cloud service initialization process before forming a telephone network.

That is, UE B considers a trigger condition before forming a telephone network with the UE C. In this case, presence of an edge scheduler, formation of a PDU session, geographic location information, and periodic timing inspection are performed. When a cloud service is available, the UE B performs a discovery request by using an application to an edge enabler client nearest to the UE B (S50021). The discovery may include a query value for the purpose of data operation processing and rendering according to a purpose to be used, and a value to be transmitted may be included in a tag, a location, and the like of an application.

The enabler may confirm the authority of a value transmitted by the edge scheduler client to the edge scheduler server. When the received request value is suitable for a requirement to be transmitted, the method may proceed to a next operation. That is, when the suitability is confirmed, information such as an IP address is tracked, and a discovery response is performed by including edge enabler server-related information such as whether the information is connected to the located edge data network (S50022).

After obtaining the available features of the edge scheduler server, the UE B inserts the SDP offer message including a parameter suitable for the requirements, edge availability, and available capabilities into the SDP offer message, and transfer the message to the message to the UE C. When the discovery is obtained, the SDP offer message is transferred to the edge enabler server (S50023) and the edge enabler server transfers the received SDP offer message to the UE C (S50024).

According to embodiments, when the UE C intends to use edge computing, the UE C performs a Service Discovery process by using an edge enabler present therein, that is, the UE C. That is, the UE C performs a discovery request by using an application to the edge enabler client that is closest to the UE C (S50025). Edge computing refers to computing at or near a physical location of a user or data source. When processing a computing service at a location close to a UE of a user, the user may be provided with a faster and stable service and a company may benefit from flexible hybrid cloud computing. Edge computing is one of methods of distributing data and processing data by using a common resource pool at various locations. In other words, edge computing is to reduce processes executed in the cloud and move the corresponding process to a local location, such as a user computer, an IoT device, or an edge server. When computer is brought to an edge of a network, the amount of long-range communication needed between the client and the server is minimized. The present disclosure allows the edge enabler server and the edge enabler client to be used in a telephone network.

According to embodiments, depending on a location of a user (i.e., UE), the UE B and UE C may have different edge enabler clients and different edge enabler servers. In FIG. 27, for understanding, it is assumed that there are one edge enabler client and one edge enabler sever.

The edge enabler server delivers a discovery response to a discovery request of the edge enabler received from the UE C (S50026).

Then, the UE C adjusts an appropriate parameter or possible parameter in response to the SDP offer message received in operation S50024, and delivers the SDP answer message including the parameter to the UE B. When the UE C intends to use edge computing to obtain the value, the UE C delivers the SDP answer message to the edge enabler server and the edge enabler server delivers the received ADP answer message to the UE B (S50028).

The UE C packetizes media to be delivered to the RTP, and then transmits the RTP packet to the edge enabler server through an RTP media flow (S50029). The edge enabler server delivers the received RTP packet to the UE B through the RTP media flow (S50030). Here, the video codec used in the 3 GPP standard to be transmitted through the RTP media flow generally uses AVC, HEVC, and the like. According to embodiments, when the edge enabler server may determine whether to process media received from the UE C in the form of an RTP form. When an additional process such as split rendering is performed using the edge enabler server, the RTP packet after the additional process is performed is delivered to the UE B.

The data transmitted through the RTP packet may be selectively received with an optional feedback signal based on the RTCP (S50031). Here, the feedback signal refers to a parameter that the is continuously transmitted from the UE B to the MCU/MRF by a predetermined period.

When operation S50031, that is, the RTCP feedback is performed, the UE B transmits feedback information to the edge enabler server. The transmitted feedback information is processed in the edge enabler server, and the edge enabler server may also process data (i.e. media) received from the UE B (S50032). That is, when the feedback process is included, the UE C may transfer the media to the UE B again based on the feedback parameter. In this case, the retransmitted media may be media optimized to be suitable for each network or UE B in the existing media to be transmitted.

In FIG. 27, operations S50021 to S50026 are referred to as a cloud service initialization process. In the cloud service initialization process, some of the above operations may be omitted, or some operations may be further included.

In another embodiment, the edge enabler client may directly transmit a configuration provisional request to a data network without passing through the edge enabler server.

FIG. 28 is a flowchart illustrating another example of a service registration process according to embodiments. To perform the service registration process, the system may include at least a plurality of UEs, an MCU/MRF, an edge enabler client, and an edge enabler server.

In FIG. 28, it is assumed that the UE B and the UE C form a telephone network according to a request of the UE B. The UE B and the UE C perform a cloud service initialization process before forming a telephone network.

First, the UE B delivers the SDP offer message to the MCU/MRF (S50041). The MCU/MRF determines whether to use a cloud function according to a profile of the delivered SDP offer message.

When the MCU/MRF determines that the cloud service is to be used according to the data transmission capacity and profile, the MCU/MRF performs a discovery request to the edge enabler client present in a network (S50042). Then, the edge enabler client delivers the discovery request to the edge enabler server connected to a network (S50043).

In this case, a discovery response value responded between the edge enabler client and the edge enabler server is delivered to the MCU/MRF via the edge enabler client. That is, the edge enabler server generates a discovery response to the discovery request and delivers the discovery response to the edge enabler client (S50044), and the edge enabler client delivers the received discovery response to the MCU/MRF (S50045).

When a value of the received discovery response is changed or re-negotiation is needed in the cloud, an SDP offer value may be changed.

When the MCU/MRF confirms determination for the cloud service, the MCU/MRF transmits the SDP offer message to the UE C (S50046).

Then, the UE C adjusts an appropriate parameter or a possible parameter based on the SDP offer message received in operation S50046, and delivers the SDP answer message including the parameter to the MCU/MRF (S50047).

The UE C packetizes the media to be delivered to an RTP, and then transmits the RTP packets to the edge enabler server through an RTP media flow (S50048). The edge enabler server transmits the received RTP packet to the MCU/MRF through the RTP media flow (S50049).

According to embodiments, when distributed processing such as split rendering is activated in the received SDP offer message, the RTP packet packetized in the UE C is transmitted to the edge enabler server. When the edge process is not performed, the RTP packet is delivered to the MCU/MRF.

The MCU/MRF transmits the received RTP packet to the UE B through the RTP media flow (S50050).

The data transmitted through the RTP packet may be received with an optional feedback signal based on the RTCP. Here, the feedback signal refers to a parameter that is continuously transmitted from the UE B to the MCU/MRF by a predetermined period.

If the RTCP feedback is performed, the UE B transmits feedback information to the MRF/MCU (S50051). The transmitted feedback information is processed within the MRF/MCU, and the MRF/MCU processes data (i.e., media) received from the UE C. When the feedback information is applied to the split rendering process, the MCU/MRF transfers the received feedback information to the edge enabler server (S50052).

In this case, the media processed in the UE C is delivered in the form of RTP packets to the edge enabler server (S50053), and the edge enabler server transfers the received RTP packet to the MCU/MRF (S50054). The MCU/MRF transmits the received RTP packet to the UE B (S50055). That is, when the cloud information is previously connected, media included in the RTP packet is transmitted to the MRF/MCU after being processed in the cloud server (i.e., the edge enabler server), and the delivered media is transmitted to the UE B through the process. The retransmitted media may be media that is corrected to some extent and optimized for each network or the UE B in the existing media to be transmitted. A portion not described in FIG. 28 will be described with reference to FIG. 27.

In FIG. 28, operations S50041 to S50047 are referred to as a cloud service initialization process. In the cloud service initialization process, some of the above operations may be omitted, or some operations may be further included.

As described above, before forming a telephone network between two UEs, cloud service initialization such as a discovery request and a discovery response may be performed to obtain the following effects. That is, a signal transmission method for delivering point cloud data may be provided using a 5G mobile communication network. The existing 5G call media network may or may not be used depending on traffic and data processing capability of the telephone network including the case that the cloud network is used or not used. Easy connection with geometry information used in a general G-PCC or V-PCC may be possible.

In FIGS. 24 to 28 above, the media transmitted in the form of the RTP packet may be XR data. The XR data may be point cloud data. The point cloud data may be G-PCC-based compressed data (referred to as G-PCC data) or V-PCC-based compressed data (referred to as V-PCC data).

Hereinafter, a method of transmitting G-PCC data through an RTP packet will be described. The G-PCC data may include geometry information and/or attribute information compressed based on G-PCC. The G-PCC data may include a parameter set such as SPS, GPS, and APS.

That is, a description of a structure in which G-PCC data is formed and delivered when a 5G network is used in a realistic virtual conversation and conference system for three-dimensionally obtaining a user face in real time and in both directions and having a conversation in a virtual environment. In this case, the service system using the 5G network accesses the Internet or a wireless network to transmit information of the bidirectional user and obtains initial data. The obtained data includes obtaining general information about what kind of user the user is and what service the user wants. At this time, depending on a service planning flow, G-PCC data may be transmitted as media data or may be delivered using the telephone network.

The present disclosure proposes a method and a device for delivering realistic point cloud data (e.g. G-PCC data) using a 5G telephone network. In particular, the present disclosure proposes an RTP packet structure for transmitting G-PCC data in an RTP packet.

The present disclosure proposes a session description protocol (SDP)-based real time protocol (RTP) packet structure for G-PCC data, thereby enabling efficient transmission of realistic G-PCC data.

As described above, the point cloud data is classified into V-PCC data or G-PCC data according to a compression method. The present disclosure proposes an RTP packet structure for transmitting real-time point cloud data, in particular, G-PCC data by using a 5G network.

According to embodiments, the V-PCC method is a method of converting realistic three-dimensional point cloud data into a two-dimensional video image and transmitting the video image. When the V-PCC compression scheme is used, a high efficiency video coding (HEVC) bit stream is formed. The HEVC bitstream may be applied and expanded in the form of a NAL unit suitable for the existing RTP protocol. However, when the realistic three-dimensional point cloud data is compressed to the G-PCC, the G-PCC bitstream corresponding to the compressed points is transmitted through the RTP packets, and in this case, the following problem occurs. In the present disclosure, a G-PCC bitstream generated by compressing realistic three-dimensional point cloud data by using a G-PCC method may be referred to as G-PCC data.

That is, the RTP protocol is for the purpose of transmitting a video coding unit or voice data, a specific protocol for transmitting three-dimensional virtual data such as a G-PCC bitstream is not implemented.

Data that is not defined using RTP header extension may be transmitted, but there is a need for the efficiency of a data structure by repeatedly transmitting overlapping data. There is no parameter including a protocol about which part needs to be transmitted, and information of a plurality of headers.

There is no recognition data for recognizing G-PCC data in the RTP packet, that is, there is no indicator indicating G-PCC data, and thus it is not possible to identify that data included in a payload of the RTP packet is G-PCC data. A method or parameter required for the process is not defined.

That is, due to problems in terms of time synchronization and encoding type, a G-PCC codec parameter may not be directly transmitted to the RTP protocol by using an extension method. When G-PCC data is arbitrarily transmitted in a payload of a RTP packet, efficiency is reduced due to existence of a header within a data set, and a third party may not recognize a structure of content within the RTP payload. All data other than real-time data decoding needs to be obtained and a decompression process needs to be performed.

Therefore, when it is assumed that an RTP packet is simply extended through an existing system that does not consider the aforementioned cause, a message delivery definition for transmitting a signal is required.

First, when G-PCC data is transmitted in an RTP packet by simply expanding a nomenclature of a payload type, the existing system in which parameter synchronization is not performed is extended or a new type of transmission driving method needs to be considered. For example, when the three dimension-based video is transmitted in the 2D-based video image, the three dimension-based video may be configured based on a timestamp of 90,000 Hz, and when this method is used, a television frequency such as a HDTV or a NTSC and synchronization may be easily matched. When an error such as resolution or jitter occurs, a receiver needs to be adjusted, and thus a timestamp value is not fixedly used. The video format supported by the current RTP in the above-described form is configured as CelB, JPEG, H.261, H.263, H.263-1998, MPV, or MP2T and may be defined as FIG. 29 with reference to contents of the payload type (PT) value.

FIG. 29 illustrates an example of a payload type allocated to a payload type (PT) field in a header of an RTP packet according to embodiments. That is, the PT field indicates a type of data included in a payload of the corresponding RTP packet, and indicates that CelB, JPEG, H.261, H.263, H.263-1998, MPV, MP2T, and so on are included in the payload.

According to the present disclosure, an arbitrary value (e.g., 72) may be allocated to identify that data included in a payload of the corresponding RTP packet is G-PCC data.

Referring to a value defined in a table of FIG. 29, when an unallocated address is used, three-dimensional video may be transmitted, but three-dimensional information and two-dimensional information may not be defined only by a media type or a clock rate. Therefore, information and configuration of independent or extended headers are required.

Second, in the case of transmission using a protocol and mechanism of an extended header, the payload may be newly or independently inserted and simply extended. The extension scheme may be useful for a 1:1 transmission scheme, but when a plurality of users participates and share RTP packets, necessary element technologies or information may not be transmitted in a 5G network. When a general G-PCC compressed data is transmitted to an existing RTP and a plurality of users considers an environment in which a plurality of users participates, a receiver acquires all data in advance, performs G-PCC decoding, or pre-acquires information of a header, and then additionally requires a process that needs to be re-processed. When the RTP is structured and a new parameter is designed according to the G-PCC stream, the header and the data may be separated, and the plurality of realistic videos may be filtered using the separated information.

Therefore, the present disclosure proposes a delivery structure of G-PCC data transmitted through a 5G network rather than a simple extension, SDP negotiation, and related parameters.

That is, when a header extension function is used by using an RTP format, a header of an RTP packet may be modified or delivery of information may be defined according to a purpose to be added or used. However, definition of delivery is a variable and non-fixed value, and thus the included information and the parameter needs to be re-defined.

According to embodiments, a header of an RTP packet has a size of 12 bytes, and this header is referred to as a fixed header or a basic header.

That is, the basic header includes a version (V) field, a padding (P) field, an extension (X) field, a CSRC count (CC) field, a marker (M) field, a payload type (PT) field, a sequence number field, a timestamp field, and a synchronization source (SSRC) identifier field.

The V field has a 2-bit length and represents a version of RTP.

The P field has a 1-bit length and indicates whether at least one padding byte exists at an end of the packet.

The X field has a 1-bit or 3-bit length and indicates whether an extension header is added after the basic header.

The CC field has a 4-bit length and indicates the number of CSRC identifier fields indicated after a 12-byte basic header.

The M field has a 1-bit length and is used to indicate critical events, such as frame boundaries, within a packet stream.

The PT field has a 7-bit length and indicates a type of payload of the corresponding RTP packet.

The sequence number field has a 16-bit length and is used to check whether a packet is lost at a receiving side. The sequence number field starts from a random number for security reasons, but is incremented by 1 each time the packet increases.

The timestamp field has a 32-bit length and represents a sampling instant of a first byte of a corresponding RTP packet.

The SSRC identifier field has a 32-bit length, represents a synchronization source, and is randomly determined.

According to embodiments, the CSRC identifiers field may be added to the basic header of the RTP packet.

The CSRC identifiers field indicates a 32-bit length and indicates that a plurality of sound sources is integrated into one through an audio mixer.

The RTP provides header extension for transmitting additional information in addition to the basic header. In the present disclosure, the header extension is referred to as an extension header.

In this case, the RTP packet may include a basic header, an extension header, and a payload.

In this case, the extension header may include a defined by profile field (kind of identification information) of 2 bytes (i.e. 16 bits), a length field of 2 bytes, and an extension header body field into which actual data is inserted. That is, one header is extended for each RTP packet, and the extended header includes a 16-bit profile field (i.e., defined by profile or identify), a 16-bit length field, and/or an extended header body field.

In this case, to activate a function of the extended header, a value of the 3-bit X field existing in the basic header needs to be 1. When not set to 1, the RTP packet includes only the basic header and the payload. As described above, the structure of a header that needs to be transmitted is fixed. When a header is extended to additionally transmit data, there needs to be an essential selection protocol as described above. When the header extension value is expressed, the header of the RTP packet may be extended to one or two or more structures.

Figure 30:
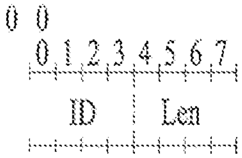
FIG. 30 is a diagram illustrating an example of a minimum extension structure of an RTP packet for transmitting G-PCC data, according to embodiments.

FIG. 30 is a diagram illustrating an example of a minimum extension structure of an RTP packet for transmitting G-PCC data, according to embodiments. That is, an example of an extended header body field in which actual data is transmitted is illustrated.

In FIG. 30, a 4-bit ID field indicates an ID value for distinguishing a type of the G-PCC bitstream. For example, one of 1-14 may be used to identify a type of the G-PCC bitstream. At this time, a value of 15 is stored in a conservative form and is not used by a rule. When the value of 15 is recognized, the corresponding process stops without further proceeding. A length field of 4 bits following the ID field indicates a length of data included in the extension header as bytes. For example, when a value of the length field is 0, the extension header includes 1-byte data, and when the value of the length field is 15, the extension header includes 16-byte data.

Figure 31:
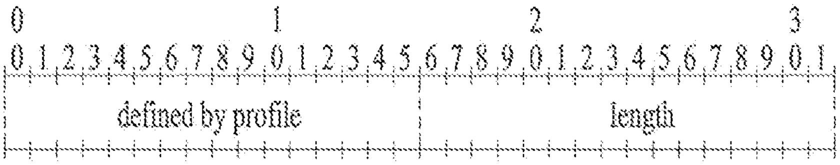
FIG. 31 illustrates an example of a profile and a length value defined before an extension is performed, according to embodiments.

FIG. 31 illustrates an example of a profile and a length value defined before an extension is performed, according to embodiments.

According to an embodiment, in the structure of FIG. 31, a 2-byte profile (i.e. defined by profile) field allocates a fixed value. According to an embodiment of the present disclosure, the profile field is fixed to a value of 0xBEDE. A length field of 2 bytes (i.e. 16 bits) may define the number of actually generated extensions. For example, assuming that data is transmitted in the minimum extension structure, one unit is configured with 8 bits.

Figure 32:
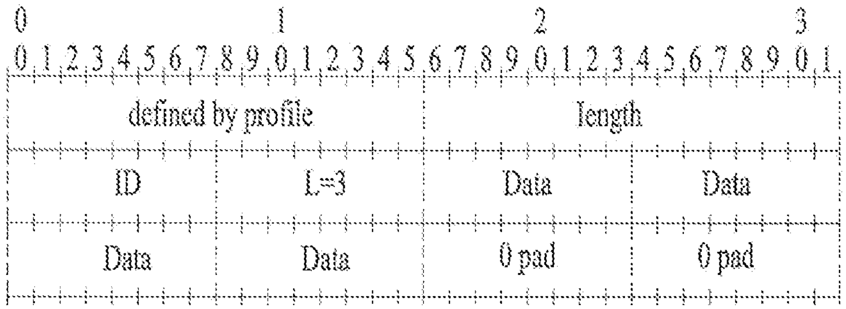
FIG. 32 illustrates an example of an extension header of an RTP packet, according to embodiments.

FIG. 32 illustrates an example of an extension header of an RTP packet, according to embodiments. That is, FIG. 32 illustrates an example of a data field when a value of a length field of an extension header of an RTP packet is set to 1 and a value of an L field of an extended header body field is set to 3. The L octet field indicates a length of a data field. The data field may be referred to as a data chunk field.

Initial data of the header of the extended RTP packet to transmit the G-PCC stream is a parameter (or parameter information or parameters) required as information for synchronizing a plurality of data. In this case, the required parameter is a parameter used for a 5G network and serves as an identifier for efficiently synchronizing and dividing a plurality of transmission parameters. The parameters newly required for the G-PCC data transmission are as follows.

According to an embodiment, the following parameters are assigned to a data field of FIG. 32.

According to embodiments, the parameters may include a type (T) field, a frame type (F) field, a header/data (H) field, a header type (HT) field, a SPS_Flag (5 bit) field, and/or an SPS_atr_bitdepth field.

The T field indicates whether data transmitted in the RTP packet (or the payload of the RTP packet) is V-PCC data (or V-PCC video) or G-PCC data (or G-PCC video). The T field is referred to as a synchronization parameter.

The F field determines a frame type. For example, when a value of the F field is 0, a this indicates pure video compression stream. That is, this indicates a G-PCC stream in which another encapsulation is not performed. When the value of the F field is 1, G-PCC data configured in a type-length-value (TLV) format is indicated, and when the value of the F field is 2, this indicates a stream of an ISO BMFF combined with a PCC system. The value of 3 is maintained in a conservative form.

The H field identifies a header or data. For example, when a value of the H field indicates H, a header portion is combined with the RTP header and transmitted. That is, when the value of the H field indicates H (i.e., 0), the H field is recognized as a header to prevent a duplicate transmission structure or to sequentially transmit data in a profile form. When the value of the H field is 1, there is no data for recognizing as a header, and thus the extended value provides only minimum information.

The HT field indicates an identifier indicating SPS, GPS, and APS. A value of the HT field is determined as a value between 0 and 2.

When the value of the H field is recognized as 0, a main profile value of the G-PCC bitstream is sequentially transmitted, and parameter transmission information related to the SPS is as follows.

The SPS_Flag field has a 5-bit length and each bit represents a binary value representing a flag.

FIG. 33 illustrates an example of values assigned to an SPS_Flag field, according to embodiments.

For example, when a value of the SPS_Flag field is 10000, the G-PCC data transmitted in the corresponding RTP packet is compressed and transmitted in a simple mode, when the value of the SPS_Flag field is 01000, the G-PCC data is compressed and transmitted in a dense (or density) mode, when the value of the SPS_Flag field is 00100, the G-PCC data is compressed and transmitted in a prediction mode, and when the value of the SPS_Flag field is 00010, the G-PCC data is compressed and transmitted in a main mode. In addition, when the value of the SPS_Flag field is 00001, this indicates a set of simple, prediction, and main modes.

The SPS_Flag field is basically configured with 5 bits, but may be configured with 2 bits according to a compression method. When the SPS_Flag field is configured with 2 bits, 0 may indicate a simple mode, 1 may indicate a dense mode, 2 may indicate a prediction, and 3 may indicate a main mode (or a profile mode).

The SPS_atr_bitdepth field has a 4-bit length and represents a value of an attribute_bitdepth_minus1 field.

The following parameters are parameters for transferring the GPS, are determined by the HT field value, and are sequentially configured in a bit combination form.

The Geom_tree_type of 1 bit indicates whether slice point positions are coded using an occupancy tree or coded using a prediction tree.

The Inferred_direct_coding mode field of 1 bit indicates whether a direct_mode_flag field is present in the corresponding geometry node syntax. For example, when a value of the inferred_direct_coding_mode_enabled_flag field is 1, this indicates that the direct_mode_flag field is present in the corresponding geometry node syntax. For example, when the value of the inferred_direct_coding_mode_enabled_flag field is 0, this indicates that the direct_mode_flag field is not present in the corresponding geometry node syntax.

The Bitwise_occupnacy_coding_flag field of 1 bit indicates whether geometry node occupancy is encoded using bitwise contextualization of the syntax element occupancy map. For example, when the value of the bitwise_occupancy_coding_flag field is 1, this indicates that the geometry node occupancy is encoded using bitwise contextualization of the syntax element occupancy map. For example, when the value of the bitwise_occupancy_coding_flag field is 0, this indicates that the geometry node occupancy is encoded using the directory encoded syntax element occupancy_byte.

When a value of the Geom_tree_coded_axis_list_present_ flag field of 1 bit is 1, this indicates that a geometry data unit (GDU) header includes occtree_coded_axis syntax elements used to derive a node size at each occupancy tree level. When the value of the Geom_tree_coded_axis_list_present_flag field is 0, this indicates that occtree_coded_axis syntax elements are not present in the GDU syntax and the occupancy tree indicates a cubic volume.

A log2_neighbour_avail_boundary_minus1 of 4 bits indicates a value of a variable NeighbAvailBoundary used as follows in a decoding process.

$$\text{NeighbAvailBoundary}=2^{log2\_neighbour\_avail\_boundary}$$

For example, when a value of the neighbour_context_restriction_flag field is 1, NeighbAvailabilityMask may be set to 1. For example, when the value of the neighbour_context_restriction_flag field is 0, NeighbAvailabilityMask may be set to 1<<log2_neighbour_avail_boundary.

The log2_intra_pred_max_node_size field of 1 bit indicates an octree node size eligible for occupancy intra prediction.

The adjacent_child_contextualization_enabled_flag field of 1 bit indicates whether adjacent children of neighbouring octree nodes are used for bitwise occupancy contextualization. For example, when a value of the adjacent_child_contextualization_enabled_flag value is 1, this indicates that adjacent children of neighbouring octree nodes are used for bitwise occupancy contextualization. For example, when the value of the adjacent_child_contextualization_enabled_flag field is 0, this indicates that children of neighbouring octree nodes are not used for bitwise occupancy contextualization.

When a value of the geometry_planar_enabled_flag field of 1 bit is 1, this indicates that a planar coding mode is activated. When the value of the geometry_planar_enabled_flag field is 0, this indicates that the planar coding mode is not activated.

The geometry_angular_enabled_flag field of 1 bit indicates whether geometry is coded using a previous set of beams located in an angular origin.

According to embodiments, some of the above-mentioned parameters may be omitted, or other fields may be newly added.

The following parameters are parameters for delivering the APS, are determined by an HT field value, and are sequentially configured in a bit combination form.

The attr_coding_type field of 1 bit indicates a coding type of attribute. According to embodiments, when a value of the attr_coding_type field is 0, the coding type may indicate predicting weight lifting, when the value of the attr_coding_type field is 1, the coding type may indicate RAHT, and when the value of the attr_coding_type field is 2, the coding type may indicate may indicate fix weight lifting.

The num_detail_levels_minus1 of 1 bit indicates the number of LODs for attribute coding. A variable LevelDetailCount for specifying the number of LODs may be obtained by adding 1 to a value of the lifting_num_detail_levels_minus1 field (LevelDetailCount=lifting_num_detail_levels_minus1+1).

The lod_decimation_mode field of 2 bits indicates a decimation method used to generate LODs.

The lod_scalability_enabled_flag field of 1 bit indicates whether an attribute decoding process allows a pruned occupancy tree decode result for input geometry points.

The max_num_direct_predictors field of 2 bits indicates the maximum number of predictors to be used for direct prediction.

The raht_prediction_enabled_flag field of 1 bit indicates whether transform weight prediction from the neighbour points is enabled during a RAHT decoding process. For example, when a value of the raht_prediction_enabled_flag field is 1, this indicates that the transform weight prediction from the neighbour points is enabled in the RAHT decoding process, and when the value of the raht_prediction_enabled_flag field is 0, this indicates that the transform weight prediction from the neighbour points is disabled in the RAHT decoding process.

The aps_coord_conv_flag field of 1 bit indicates whether an angular coordinate conversion process is applied to an attribute decoding process.

A basic table used in the above-described structure is applied as a G-PCC compression technology standard, but all or some of values used in the 5G network are delivered. An actual value used for available tabular SPS, GPS, and APS may be summarized as follows.

FIG. 34 illustrates an example of a syntax structure of a seq_parameter_set_RTP( ) (SPS), according to embodiments.

In FIG. 34, the simple_profile_compatibility_flag field indicates whether the bitstream follows a simple profile.

The dense_profile_compatibility_flag field indicates whether the bitstream follows a dense profile.

The predictive_profile_compatibility_flag field indicates whether the bitstream follows a prediction profile.

The main_profile_compatibility_flag field indicates whether the bitstream follows a main profile.

The slice_reordering_constraint_flag field indicates whether the bitstream is sensitive to rearrangement of the bitstream and removal of slices.

The unique_point_positions_constraint_flag field indicates whether all points in each coded point cloud frame have unique positions.

The level_idc field indicates a level that the bitstream follows.

The sps_seq_parameter_set_id field provides an identifier for an SPS referenced by other syntax elements.

The bypass_stream_enabled_flag field indicates whether a bypass coding mode is to be used to read the bitstream.

FIG. 35 illustrates an example of a syntax structure of a geometry_parameter_set_RTP( ) (GPS), according to embodiments. The description of each field included in a GPS of FIG. 35 is described above, and thus a detailed description thereof will be omitted.

FIG. 36 illustrates an example of a syntax structure of attribute_parameter_set_RTP( ) (APS), according to an embodiment.

The attr_coding_type field indicates a coding type for attribute. According to embodiments, when a value of the attr_coding_type field is 0, a coding type may indicate a predicting weight lifting, when the value of the attr_coding_type field is 1, the coding type may indicate RAHT, and when the value of the attr_coding_type field is 2, the coding type may indicate fix weight lifting.

The aps_slice_qp_offset_present_flag field indicates whether the ash_attr_qp_delta_luma and ash_attr_qp_delta_chroma syntax elements are present in the corresponding attribute slice header ASH).

The raht_prediction_enabled_flag field indicates whether transform weight prediction from the neighbour points is enabled during a RAHT decoding process.

The last_component_prediction_enabled_flag field indicates whether a primary component of multi component attribute is used to predict a reconstructed value of non-primary components.

The lod_scalability_enabled_flag field indicates whether the attribute decoding process allows a pruned occupancy tree decode result for input geometry points.

1 may be added to a value of the max_nn_range_minus1 field to indicate the maximum nearest neighbor range used to limit a distance of a point registered as a neighbor.

The max_num_detail_levels_minus1 field indicates the maximum number of LODs for attribute coding.

The morton_sort_skip_enabled_flag field indicates whether the Morton code alignment process is omitted.

The lod_decimation_mode field indicates a decimation method used to generate LODs.

The lod_dist2_init field indicates a value used to derive an initial slice subsampling factor used generate an LOD.

The aps_slice_lod_dist2_offset_present_flag field indicates whether a spatial subsampling factor offset is present in an attribute data unit.

The max_num_direct_predictors field indicates the maximum number of predictors to be used for direct prediction.

The direct_avg_predictor_disabled_flag field indicates whether neighbor average prediction is to be selected as a direct prediction mode.

The intra_lod_prediction_skip_layers field specifies the number of detail layers in which the intra-layer prediction is disabled.

The lod_search_range_intra field indicates a search range used to determine nearest neighbours for prediction within a detail level.

The inter_component_prediction_enabled_flag field indicates whether a primary component of the multi-component attribute is used to predict a reconstructed value of the non-primary components.

The neighbour_blending_enabled_flag field indicates whether a neighbor weight used for prediction is to be blended based on their associated spatial positions.

The raw_attr_fixed_width_flag field indicates whether the number of bits used for coding of raw attribute values is equal to an attribute component bit depth.

The aps_coord_conv_flag field indicates whether an angular coordinate conversion process is applied to an attribute decoding process.

The aps_extension_flag field indicates whether an aps_extension_data syntax structure is present in a corresponding APS syntax structure.

As described above, a RTP structure for G-PCC data to be transmitted to a 5G core has the following effects.

That is, G-PCC data may be suitably generated and coupled to a payload unit. At this time, a part or all of G-PCC data, a header unit of G-PCC data, and the like may be distributed or combined to a payload of an RTP packet, and thus may be configured in a multiplexed form. To form the RTP format, some or all of the SPS, the APS, and the GPS may be included in the RTP packet.

The G-PCC data may be transmitted using header extension as well as RTP streaming. For example, the SPS, the APS, and the GPS for G-PCC may be transmitted through a header of an RTP packet.

According to embodiments, actual G-PCC data (i.e., compressed geometry information and/or attribute information) may be transmitted through a payload of an RTP packet, and signaling information such as SPS, GPS, and APS, and/or signaling information related to an RTP packet for transmitting actual G-PCC data may be transmitted through an extension header of the corresponding RTP packet. A header (e.g., an extension header) of an RTP packet for transmitting G-PCC data includes information for identifying whether data included in a payload of the corresponding RTP packet is G-PCC data (e.g. a T field). The header (e.g. the extension header) of the RTP packet includes information for identifying whether a parameter set transmitted through the RTP is SPS, APS, or GPS (e.g. HT field).

Accordingly, the G-PCC data may be transmitted by an RTP protocol, and a receiver may identify and process the G-PCC data included in an RTP packet.

According to the present disclosure, G-PCC/V-PCC XR data may be transmitted and received through a real-time telephone network. The RTP data may be transmitted to the telephone network and the external network, and a repeater or a cloud processor may perform scaling, multiplexing, transcoding, and the like. Hereinafter, a real-time realistic virtual conversation data SDP/RTCP transmission method and structure using a 5G network will be described.

That is, as described above, a call flow is formed, and then the SDP negotiation process is performed before data (e.g. G-PCC data) is transmitted through the RTP packet. The SDP negotiation process is a process of checking whether a transmitter and a receiver (i.e. UEs) connected to each other in a telephone network are capable of processing transmitted/received data.

The SDP negotiation process is a process of transmitting an SDP offer message to the UE and receiving an SDP answer message. In addition, in the case of all connection between UEs, data transmitted through an RTP packet discloses that a feedback signal is selectively received based on the RTCP.

However, in the related art, there is no value for configuring the G-PCC in the SDP negotiation parameter. Therefore, a pre-profiling value of the G-PCC data is not capable of being transmitted, and thus there is a problem that a profile value of video data between UEs is not capable of being checked.

According to the present disclosure, an attribute parameter of G-PCC data is configured and parsing information (e.g. profile information of video data) is previously transmitted, and thus a receiver previously checks a profile mode in which data (e.g., G-PCC data) is to be transmitted from among simple, prediction, dense, and main profiles. The receiver may previously determine whether the receives has an ability to process data compressed in the corresponding profile. However, the proposed method may be used in transmission in a dominant manner such as a multi-parameter or a video information parameter, and thus the proposed method may be limited to a G-PCC transmission call. Accordingly, in the SDP negotiation procedure, a parameter indicating a G-PCC may be obtained, and when a previous value is confirmed, the UE may identify a profile of the received video and a processing capability.

According to embodiments, transmission may be easily performed in a reverse direction (uplink) using an RTCP packet. In this method, data may be transferred in the RTCP packet rater than definition of previously configurable attribute, and thus may be used one of network optimization parameters. Thus, information of all data may be transferred in RTP, but distributed over RTCP to exchange information. The RTCP may be basically consistent or utilized as feedback information transmitted to an initial transmitter at regular intervals. The loss of RTCP packet is thus used to measure the quality of the transmitter and receiver or to evaluate the quality by a period corresponding to the period of the receiver.

When the RTP port is defined, a port number of a next higher number is given, and the form such as a=<attribute>: <value>" may be configured. For example, the form such as m-audio 49170 RTP/AVP 0, a=rtcp: 53020 or m=audio 49170 RTP/AVP 0, a=rtcp: 53020 IN IP4 126.16.64.4, or m=audio 49170 RTP/AVP 0, a=rtcp: 53020 IN IP6 2001: 2345:6789:ABCD:EF01:2345:6789: ABCD may be configured.

In the present disclosure, when G-PCC data is transmitted using RTCP, a payload type is determined as 206, and the feedback information may be extended using a parameter used in a generally known 360 video or realistic video.

In the method using the existing manner, to express data related to definition of metadata, reference may be made to transmission of two-dimensional video and use of the two-dimensional video in the VR specification standard. Two standards are used to define a region of interest as a Region Fix of Interest (ROI), thereby defining a part of a sphere expressed in an elevation and an azimuth among 360-degree spheres. When a plurality of ROIs is present, ROI_ID may be defined by defining each identifier. When the ROI_ID is defined, each parameter corresponding to the ROI needs to be defined. The ROI_type is used to define an arbitrary/pre-defined ROI when an initial negotiation is performed. When the arbitrary ROI is defined, the number of ROI_IDs is one, and thus, the decoder does not need to process a plurality of ROI_IDs. Conversely, when the pre-defined ROI is defined, a plurality of ROI_IDs may be input. The UE may select an ID from among the received IDs, transfer the selected ID to the server, and transmit the value as initial data. When a virtual sphere is used, an ROI_Azimuth/ROI_Elevation value may be used. A center value is a position of a point suitable for a focus of a user, and is used as a central value or a reference point of the ROI. The ROI_azimuth_range/ ROI_elevation_range indicates which angle is allowed based on a median value. When this value is small, the size of the ROI is relatively small and the size of the ROI becomes relatively large when the angle is transmitted as a large value. The ROI_Name is used when a character type ROI identifier, which is not an integer type identifier, is desired to be used, and may not be necessarily used. The ROI_Description may transmit a text-type sentence or paragraph when an additional description of metadata is required. A character identifier defined as ROI_name may be expressed using a part thereof, and detailed contents in ROI_description is described to confirm a description of an additional ROI while the user experiences a service in the network. The ROI_expression uses a method for expressing an ROI. To collect information related to the Pre-defined ROI, the receiver collects a plurality of pre-defined ROI information, and the information is transmitted by the MTSI transmitter. The ROI index information determined in the SDP negotiation process is then used when the feedback information of the ROI information is periodically received in the transmitter. The pre-defined ROI may be determined bi-directionally or uni-directionally, and the arbitrary ROI may be selected in a unidirectional environment. Thus, two parameters may be used together or used simultaneously, but the pre-defined ROI is first determined to be ranked. When the pre-defined ROI is not present, it may be determined whether an arbitrary ROI parameter exists. When there are no two parameters, the MTSI-based virtual conference transmission and reception needs to transmit all data without determining a recommendation or any viewport-based ROI. When the received ROI information is acquired, the MTSI transmitter or receiver needs to encode or decode data according to the ROI, and the resolution existing in the ROI is set to be higher than the resolution of an object existing in addition to the background or the viewing angle.

The above concept may be used without change in a G-PCC stream in which a center point is determined or previously known. In addition, even if an azimuth value or an elevation value is not used, a region or a central value of a specific interest may be utilized in a three-dimensional system.

To smoothly perform codec and viewport independent/ dependent processing in such a system environment, an SDP negotiation process needs to be preceded in the 5G network. After the negotiation is completed, the media (e.g. G-PCC data) is transmitted through the RTP and the information requiring the feedback is transmitted through the RTCP. This negotiation process includes VR of MTSI of 3GPP TS 26.114 and include the 3GPP TS26.223 standard that discusses the IMS-based telepresence. Based on the 3GPP VR Teleconference Permanent Document, the following attribute may be defined.

3gpp_360video="a=3gpp_video:" [SP "VDP" SP "Stereo"]

In the above definition, SP represents a space within the ABNF grammar. When the attribute and specific contents that are not defined in the 3gpp_360video are input, it is assumed that the input signal is disregarded and the negotiation parameter is recognized as follows. Like the actual example, the values of G-PCC-based video (or G-PCC data) may be utilized without change and a process of identifying the system may be similarly performed.

The MTSI transmitter/receiver may recognize 3gpp_360video to recognize that the input signal is a virtual reality system in the 5G network in the SDP negotiation process.

The HEVC codec for video may use or include AVC and VVC codec, and an NAL unit as a code component may include decoder information or may include related information.

In the case of using the HEVC codec, HEVC Main 10 Profile, Main Tier, and Level 5.1 need to be supported to the minimum. In the case of using the AVC codec, the AVC Progressive High Profile, Main Tier, Level 5.1 need to be supported to the minimum.

In the process of transmitting the RTP data, viewport information of the user needs to be continuously transmitted through the RTCP feedback, and information related to the arbitrary/pre-defined ROI is also included.

When data needs to be additionally transmitted, the data may be transmitted through an RTP header extension or related data may be transmitted through a data channel.

When a video datagram protocol (VDP) is transmitted, a function and a process for transmitting the VDP are necessary, and the following parameter information is transmitted.

(1) Sub-picture based streaming service: A full maximum resolution video obtained by an omnidirectional camera is configured with a plurality of independent sub-pictures, and this portion covers a portion of the entire content. A user viewport may observe a video configured with one or more sub-pictures, and a high-quality video is transmitted to a viewport viewed by the current user, and a low-quality video is transmitted to other regions. The corresponding parameter may be implemented by transmitting a motion-constrained tile set or a sub-picture-based flag.

(2) Region-wise Quality Ranking: The region-based quality may be emphasized based on a specific region in the panoramic scene, or the corresponding portion may be encoded into a high-quality image. Other regions may be downscaled and transmitted. For example, transmission may be performed in the same manner as a truncated square pyramid.

(3) Overlay Rendering: The entire video is transmitted in a low-quality method with low quality, and the transmitted video is used in the form of a background of a viewing external angle of a user. At the same time, the high quality is transmitted in a dual form by transmitting a viewport transmission part to an overlay on the basis of RTCP information. The video transmitted to the overlay may be configured with one or more sub-pictures and transmitted.

According to embodiments, the MTSI transmitter needs to deliver 3gpp_video in the SDP negotiation process. The video to be transmitted by specifying the VDP in the delivery process needs to indicate that the video to be transmitted is viewport dependent. When the VDP mode is connected, the characteristics of the corresponding VDP may be selected through a mapping function. The VDP characteristic may be a text type, or may be designated as one variable and delivered. Such characteristics may be extendable to G-PCC.

Hereinafter, SDP signaling will be described.

In a SIP-based network, a network announcement, user interaction, conferencing service are provided. The CSCF present in the MTSI is generated between a caller and a media server in the form of a SIP proxy, an application server, and a media gateway, and when a server is assumed to be a proxy, the caller forms an INVITE message and transmits the INVITE message to the SIP proxy.

The SIP proxy responds with 100 TRYING and then delivers the INVITE message to the media server.

The media server delivers a 200 OK message to the caller and the caller delivers an ACK message to the SIP proxy. Upon receiving the ACK message, the SIP proxy delivers the corresponding ACK to the media. A session is formed through the SIP delivery message, and the media server transfers the requested media (e.g. G-PCC data) through the RTP. When media transmission ends and the session ends, the media server delivers a BYE message to the SIP proxy and the SIP proxy delivers the BYE message to the caller.

When reception is completed, the caller transmits a 200 OK message in a reverse direction. Upon transmission of the SIP message, the SDP message is transmitted together with the SDP message. A detailed parameter attribute value included in the media exists in the SDP, and a media type is configured through SDP negotiation. When the SIP proxy does not exist, the SIP message transmission/reception process between the caller and the callee may be simplified as follows.

FIG. 37 illustrates an actual example of a SIP INVITE and response according to embodiments.

In FIG. 37, PhoneB has IP address 172.20.120.30 and indicates INVITE of SIP version 2.0. The Via represents an address and port number of the proxy server, transferred in the middle, and represents transfer of the Phone A to the Phone B in the URI form. The SDP message may be inserted into a value after Contact-Length and delivered.

FIG. 38 is a diagram illustrating an example in which a 200 OK message is transmitted in response to the same request, according to embodiments.

In FIG. 38, the SDP message is a message referred to when an application/SDP is defined in the SIP message and is configured in a text-based format. The name and attribute name of the SDP field are used only as US-ASCII, but the text value of the attribute is sometimes UTF-8-encoded and delivered. The SDP form may be configured with a plurality of types and value values, and the form may be configured with <type>=<value>. In the case of <type>, a value of <value> is configured with a text or a sentence. The type value for configuring the session may include v=(protocol version), o=(originator and session identifier), s=(session name), i=*(session information), u=*(URI of description), e=*(email address), p=*(phone number), c=*(connection information—not required if included in all media descriptions), b=*(zero or more bandwidth information lines), k=*(obsolete), and a=*(zero or more session attribute lines), and a type related to attribute or media representing time may include m=(media name and transport address), i=*(media title), c=*(connection information—optional if included at session level), b=*(zero or more bandwidth information lines), k=*(obsolete), and a=*(zero or more media attribute lines).

The SDP message is configured in the form of an offer/answer form and an example of a message in which two negotiations are made is shown in FIG. 39(*a*) and FIG. 39(*b*).

FIG. 39(*a*) illustrates an example of an SDP offer message, and FIG. 39(*b*) illustrates an example of an SDP answer message, according to embodiments.

Therefore, to transmit G-PCC data by using a media exchange method used in a 5G network, the data may be recognized through an SDP signal between users in advance and is transmitted through an offer/answer scheme. When delivery is performed using SDP, the attribute needs to be defined, G-PCC data (or a G CC-PCC bitstream) may be received, and when information of some headers may be included, information needs to be exchanged. Once the media session is formed, the receiver needs to answer some or supportable parameters presented in the SDP offer message in the form of an SDP answer message.

An attribute parameter of an SDP signal related to G-PCC data according to embodiments is defined as follows.

```
a=3gpp_gpcc: <info1> <info2> <info3> <info4>
a=3gpp_gpcc_mtype: <header> <data> <HT>
```

In the above definition, a value included in <info> may be a parameter that may be an ID value of a media source in the stream or may be preceded. The Mtype concept may be RTP data including a header of media, or may be a scheme in which only the data unit is extracted and transmitted.

In the above definition, <info1>, <info2>, <info3>, and <info4> may be any information related to the G-PCC. For example, <info1> may correspond to simple_profile_compatibility_flag, <info2> may correspond to dense_profile_compatibility_flag, <info3> may correspond to predictive_profile_compatibility_flag, and <info4> may correspond to main_profile_compatibility_flag. This case is illustrated in Example 1 of FIG. 40. That is, assuming that a video (e.g. G-PCC data) is transmitted to apply some simple, predict, dense, and main profiles, an example available is shown in Example 1 or Example 2 of FIG. 40.

As shown in FIG. 40, the above-described method serves as a carrier for transmitting a parameter corresponding to SPS, GPS, and APS through RTP. Accordingly, the additionally inserted parameter may be used to previously deliver parsing information required for G-PCC video profile or decoding.

FIG. 40 illustrates an example of an SDP offer message, according to embodiments.

In FIG. 40, Example 1 indicates that data (e.g. G-PCC data) to be transmitted in an RTP packet is configured with in a simple profile mode using <info1>, <info2>, <info3>, and <info4> as follows.

a=3gpp_gpcc: simple_profile_compatibility_flag=1, dense_profile_compatibility_flag=0, predictive_profile_compatibility_flag=0, main_profile_compatibility_flag=0

In FIG. 40, Example 2 shows that data (e.g., G-PCC data) to be transmitted in an RTP packet is compressed in a simple profile mode using mtype of text type as follows.

a=3gpp_gpcc: profile=[simple]

FIG. 40 illustrates another example in which SPS and/or GPS is transmitted through a header of an RTP packet.

```
a=3gpp_gpcc_mtype: A B HT=1 C HT = 0
a=mid:A
```

-continued

```
a=3gpp_gpcc: [header= SPS]
and/or
a=mid:B
a=3gpp_gpcc: [header= GPS]
```

In the present disclosure, G-PCC related information transmitted through the SDP offer message may be any information.

If the above-described method is used, data may be separately transmitted by separating a header or a data unit of G-PCC video by a profile or a media definition, but a completely different general video stream may be inserted into the data unit and transmitted. To be delivered in the example, the identifier may be included and delivered, and the data and header corresponding to each identifier may be aligned.

Although embodiments have been described with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may also fall within the scope of the appended claims and their equivalents. The devices and methods may not be limited by the configurations and methods of the embodiments described above. The embodiments described above may be configured by being selectively combined with one another entirely or in part to enable various modifications. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term " " and " " should be interpreted as indicating "and/or." For instance, the expression " " may mean "and/or B." Further, "B" may mean "and/or B." Further, " " may mean "at least one of B and/or C." "B, C" may also mean "at least one of B and/or C." Further, in the document, the term "or" should be interpreted as "and/or." For instance, the expression "or B" may mean 1) only "," 2) only "," and/or 3) both "and B." In other words, the term "or" in this document should be interpreted as "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or combinations thereof. The firmware, software, and/or combinations thereof may be stored in the processor or the memory.

The operations according to the above-described embodiments may be performed by the transmission device and/or the reception device according to the embodiments. The transmission/reception device may include a transmitter/receiver configured to transmit and receive media data, a memory configured to store instructions (program code, algorithms, flowcharts and/or data) for the processes according to the embodiments, and a processor configured to control the operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

MODE FOR DISCLOSURE

As described above, related details have been described in the best mode for carrying out the embodiments.

INDUSTRIAL APPLICABILITY

As described above, the embodiments are fully or partially applicable to a point cloud data transmission/reception device and system.

Those skilled in the art may change or modify the embodiments in various ways within the scope of the embodiments.

Embodiments may include variations/modifications within the scope of the claims and their equivalents.

The invention claimed is:

1. A method of providing a point cloud service, the method comprising:

performing a call connection for a call between a first user equipment (UE) and a second UE;

performing, by at least one edge enabler located between the first UE and the second UE, perform an initialization process, wherein the initialization process comprises transmitting a discovery request from the first UE to the at least one edge enabler and receiving a discovery response from the at least one edge enabler, and transmitting a discovery request from the second UE to the at least one edge enabler and receiving a discovery response from the at least one edge enabler;

transmitting point cloud data based on at least one real time transport protocol (RTP) packet from one of the first UE and the second UE to an other one of the first UE and the second UE, wherein the point cloud data includes geometry-based point cloud compression (G-PCC) data compressed based on G-PCC, and wherein a header of the at least one RTP packet includes identification information for identifying the G-PCC data.

2. The method of claim 1, wherein the header of the at least one RTP packet further includes information for a type of a frame including the point cloud data.

3. The method of claim 1, wherein the header of the at least one RTP packet further includes profile information of the point cloud data.

4. The method of claim 1, wherein the performing of the call connection includes:

transmitting a session description protocol (SDP) offer message to the second UE from the first UE; and transmitting an SDP answer message to the first UE from the second UE.

5. The method of claim 4, wherein the SDP offer message includes profile information of the point cloud data.

6. A device for providing a point cloud service, the device comprising:

a first user equipment (UE);

a second UE; and at least one edge enabler located between the first UE and the second UE and configured to perform an initialization process, wherein the first UE performs the initialization process by transmitting a discovery request to the at least one edge enabler and receiving a discovery response from the at least one edge enabler, and the second UE performs the initialization process by transmitting a discovery request to the at least one edge enabler and receiving a discovery response from the at least one edge enabler, wherein one of the first UE and the second UE transmits point cloud data based on at least one real time transport protocol (RTP) packet to an other one of the first UE and the second UE, wherein the point cloud data includes geometry-based point cloud compression (G-PCC) data compressed based on G-PCC, and wherein a header of the at least one RTP packet includes identification information for identifying the G-PCC data.

7. The device of claim 6, wherein the header of the at least one RTP packet further includes information for a type of a frame including the point cloud data.

8. The device of claim 6, wherein the header of the at least one RTP packet further includes profile information of the point cloud data.

9. The device of claim 6, wherein a session description protocol (SDP) offer message is transmitted to the second UE from the first UE, and an SDP answer message is transmitted to the first UE from the second UE.

10. The device of claim 9, wherein the SDP offer message includes profile information of the point cloud data.

11. The device of claim 6, wherein an edge enabler configured to perform the discovery request/response with the first UE and an edge enabler configured to perform the discovery request/response with the second UE are different from each other.

12. The device of claim 6, wherein an edge enabler configured to perform the discovery request/response with the first UE and an edge enabler configured to perform the discovery request/response with the second UE are the same.

* * * * *